(12) United States Patent
Paxton

(10) Patent No.: US 9,370,753 B2
(45) Date of Patent: Jun. 21, 2016

(54) APPARATUS FOR SEPARATION AND PROCESSING OF MATERIALS

(71) Applicant: CYDAF TECHNOLOGIES LIMITED, Sutton Coldfield West Midlands (GB)

(72) Inventor: Richard George Paxton, Sutton Coldfield (GB)

(73) Assignee: Cydaf Technologies Limited, Sutton Coldfield, West Midlands (GB)

( * ) Notice: Subject to any disclaimer, the term of this patent is extended or adjusted under 35 U.S.C. 154(b) by 187 days.

(21) Appl. No.: 14/346,672

(22) PCT Filed: Sep. 21, 2012

(86) PCT No.: PCT/IB2012/055035
§ 371 (c)(1),
(2) Date: Mar. 21, 2014

(87) PCT Pub. No.: WO2013/042084
PCT Pub. Date: Mar. 28, 2013

(65) Prior Publication Data
US 2014/0225286 A1   Aug. 14, 2014

(30) Foreign Application Priority Data
Sep. 22, 2011   (GB) .................................. 1116366.4

(51) Int. Cl.
| | | |
|---|---|---|
| *B01D 45/16* | (2006.01) | |
| *B01D 47/00* | (2006.01) | |
| *B01F 3/04* | (2006.01) | |
| *B04C 5/10* | (2006.01) | |
| *B04C 5/06* | (2006.01) | |
| *B04C 5/103* | (2006.01) | |
| *B04C 5/13* | (2006.01) | |
| *B04C 5/14* | (2006.01) | |
| *B04C 5/28* | (2006.01) | |
| *B01D 21/24* | (2006.01) | |
| *B01D 21/26* | (2006.01) | |
| *B03D 1/14* | (2006.01) | |
| *B01D 17/02* | (2006.01) | |
| *B01D 19/00* | (2006.01) | |

(52) U.S. Cl.
CPC .......... *B01F 3/0446* (2013.01); *B01D 17/0217* (2013.01); *B01D 19/0057* (2013.01); *B01D21/2411* (2013.01); *B01D 21/267* (2013.01); *B01D 45/16* (2013.01); *B01D 47/00* (2013.01); *B03D 1/1418* (2013.01); *B04C 5/06* (2013.01); *B04C 5/10* (2013.01); *B04C 5/103* (2013.01); *B04C 5/13* (2013.01); *B04C 5/14* (2013.01); *B04C 5/28* (2013.01)

(58) Field of Classification Search
CPC ........ B01D 21/26; B01D 21/265; B03D 1/24; B03D 1/245
USPC ........................................ 210/512.1; 209/164
See application file for complete search history.

(56) References Cited

U.S. PATENT DOCUMENTS

| | | | | |
|---|---|---|---|---|
| 4,399,027 A | * | 8/1983 | Miller .................. | B03D 1/1425 209/157 |
| 5,224,604 A | * | 7/1993 | Duczmal ................ | B03C 1/023 209/12.2 |
| 5,529,190 A | * | 6/1996 | Carlton ................ | B03D 1/1418 162/4 |

FOREIGN PATENT DOCUMENTS

| | | | |
|---|---|---|---|
| EP | 0052042 A2 | 5/1982 | |
| EP | 0473566 A2 | 3/1992 | |
| WO | WO 91/15302 A1 | 10/1991 | |
| WO | WO 2007/128036 A1 | 5/2007 | |

OTHER PUBLICATIONS

International Search Report for PCT/IB2012/055035 prepared by European Patent Office, mailed Mar. 15, 2013, 2 pages.
International Preliminary Report on Patentability for PCT/IB2012/055035 prepared by European Patent Office; completed Jan. 1, 2014, 26 pages.

* cited by examiner

Primary Examiner — Robert A Hopkins
(74) Attorney, Agent, or Firm — Haynes and Boone, LLP

(57) ABSTRACT

This invention relates to a tubular cyclonic separation device the style of which was presented in PCT/ZA2003/000160 and which enables all of the inlet and outlet connections to be completely contained within a tubular profile, the diameter of which is that of the body of the cyclonic section. This disclosure adds further novel and inventive developments to the cyclonic device which enable it to be used as a separating device for systems involving all three phases (gas, liquid and solid) and where two, three or more different product streams may be separated, all within the same cylindrical profile. These further inventive developments also relate to the use of externally supplied gas and/or additional liquid phases which are injected through the walls of the cyclonic body using specifically located slots and/or holes in combination with specifically located stepped edges. These further novel and inventive developments enable the concepts of froth floatation (FF) and Dispersed Air Floatation (DAF) to be exploited within an enhanced gravitational field together with the options for washing the separated froth and/or the separated heavier fractions, all within the same cyclonic unit. As part of the novel and inventive introduction of the stepped edges, means are provided whereby gas bubbles smaller than 30 microns can be created on a large scale and with a reduced energy input relative to typical conventional equipment. Also, the size of the gas bubbles may be controlled together with the intensity of any particle on particle interactions that may be created. This latter has many potential applications within FF and/or DAF processes, including applications within oil and tar separation from solid surfaces and within many ore preparation and ore leaching processes. The tubular profile enables processing and separation to be achieved "within the pipe line" or for very closely packed arrangements to be assembled within carrier vessels.

9 Claims, 32 Drawing Sheets

DIAGRAMATIC SECTIONS

VIEW ON 'A' 'A'
VORTEX FINDER PIPE 17
REMOVED

VIEW ON 'B' 'B'
VORTEX FINDER PIPE 17
REMOVED

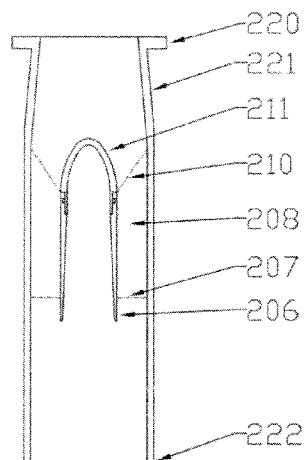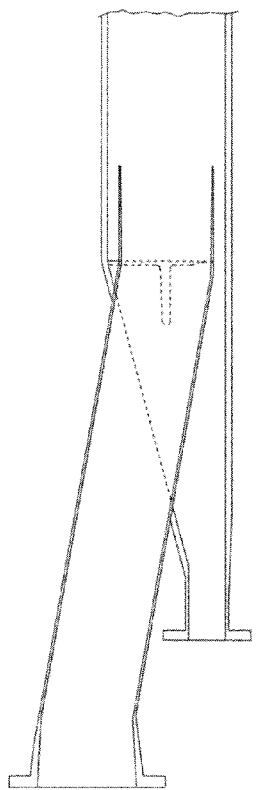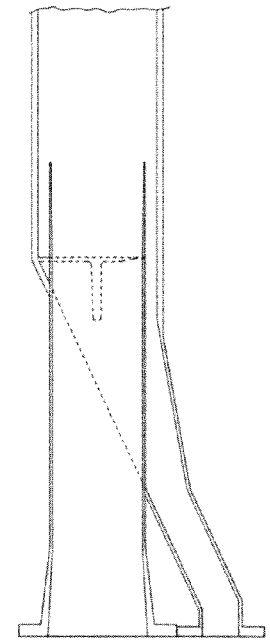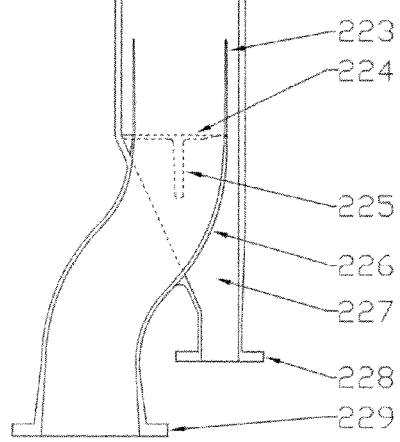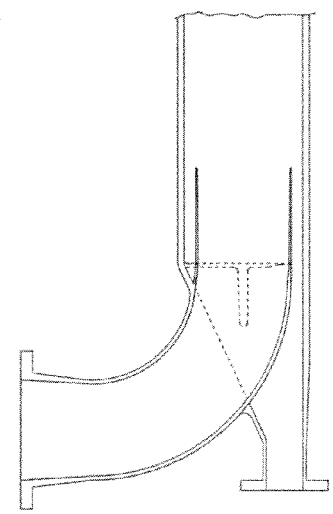
FIGURE 6C
FIGURE 6D
FIGURE 6A
FIGURE 6B

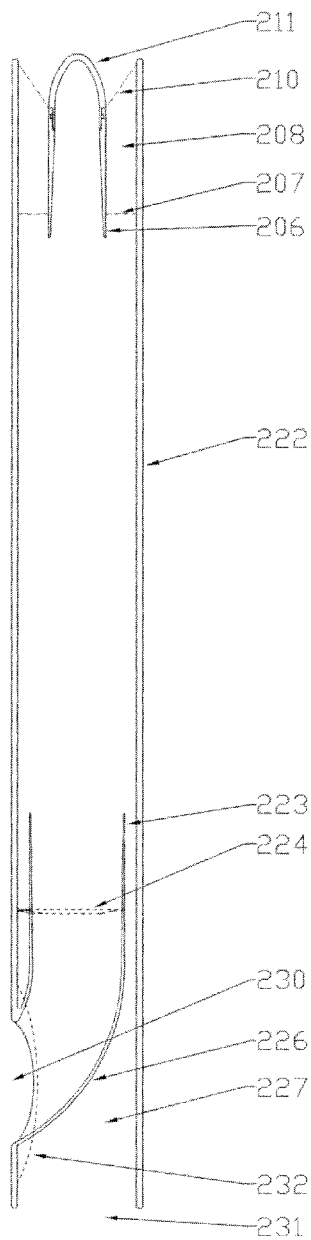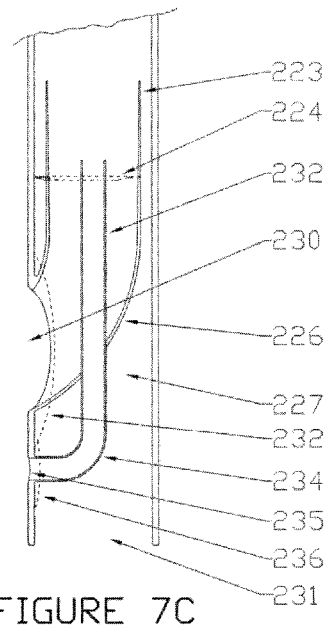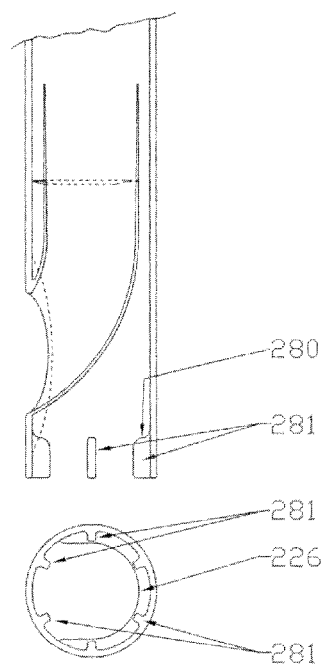
FIGURE 7C
FIGURE 7A
FIGURE 7B

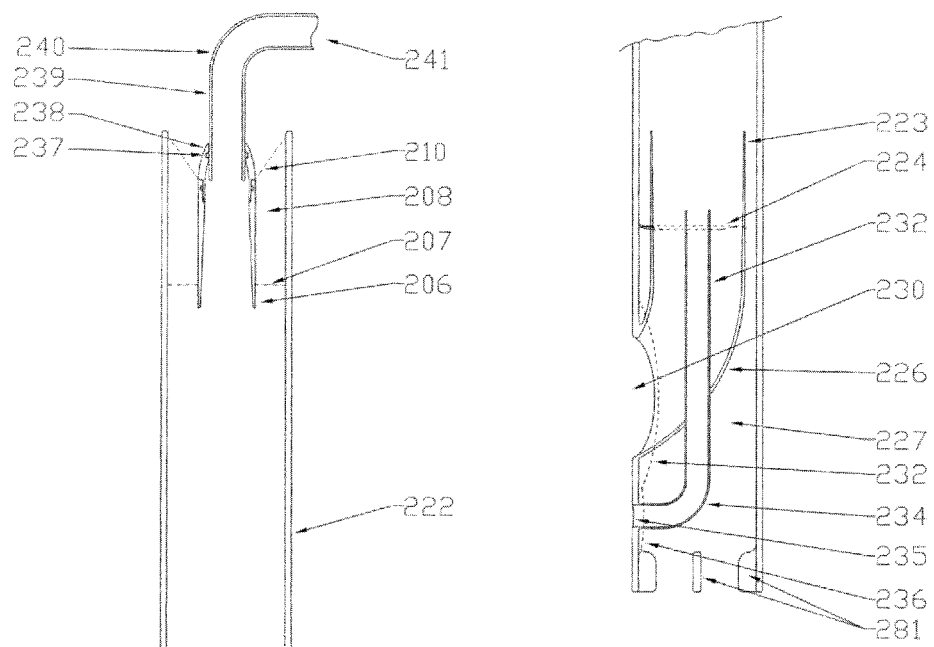
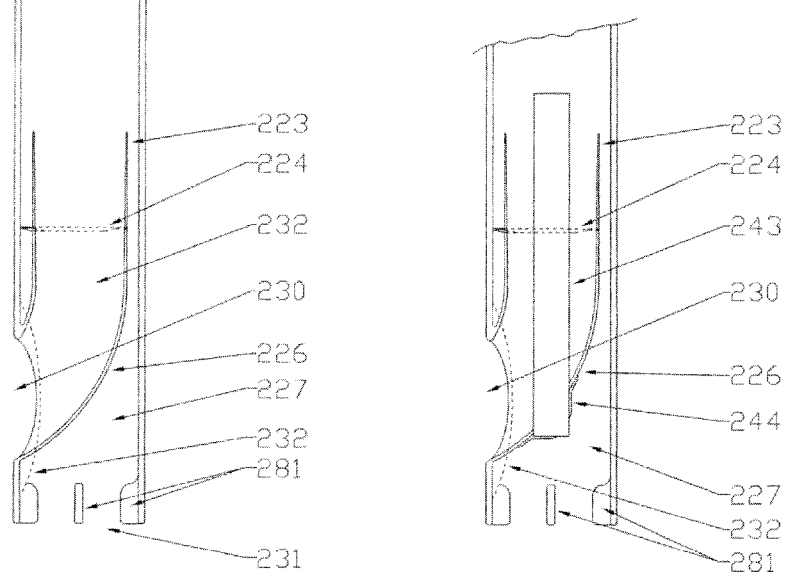
FIGURE 8A
FIGURE 8B
FIGURE 8C

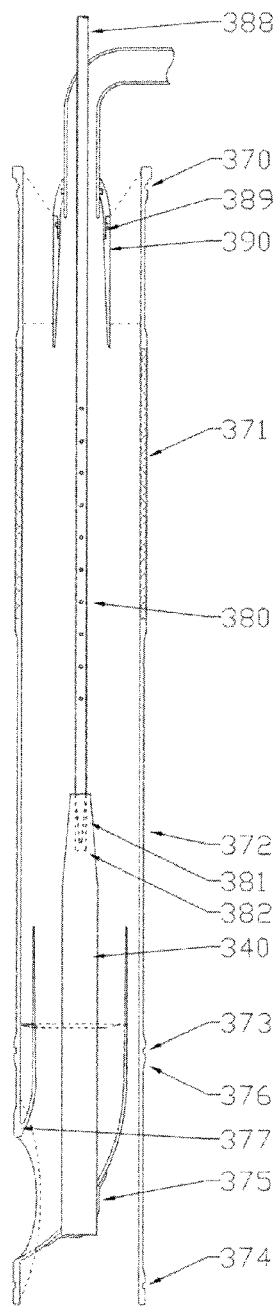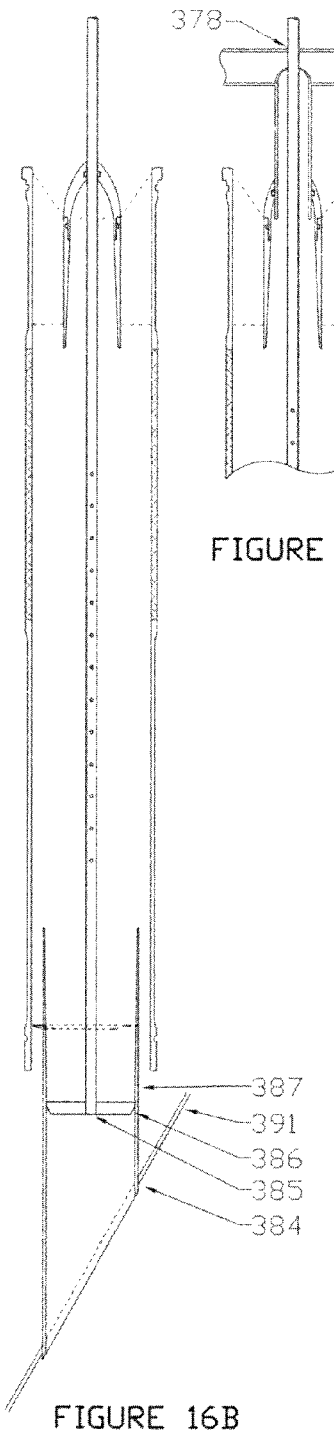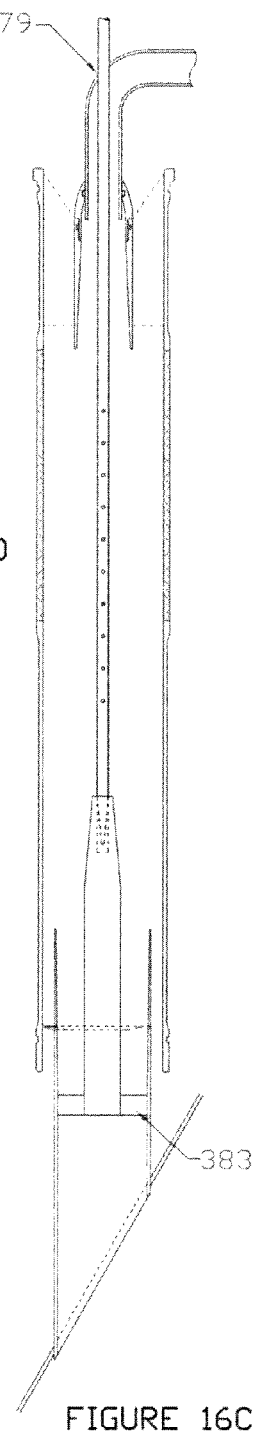
FIGURE 16D
FIGURE 16A    FIGURE 16B    FIGURE 16C

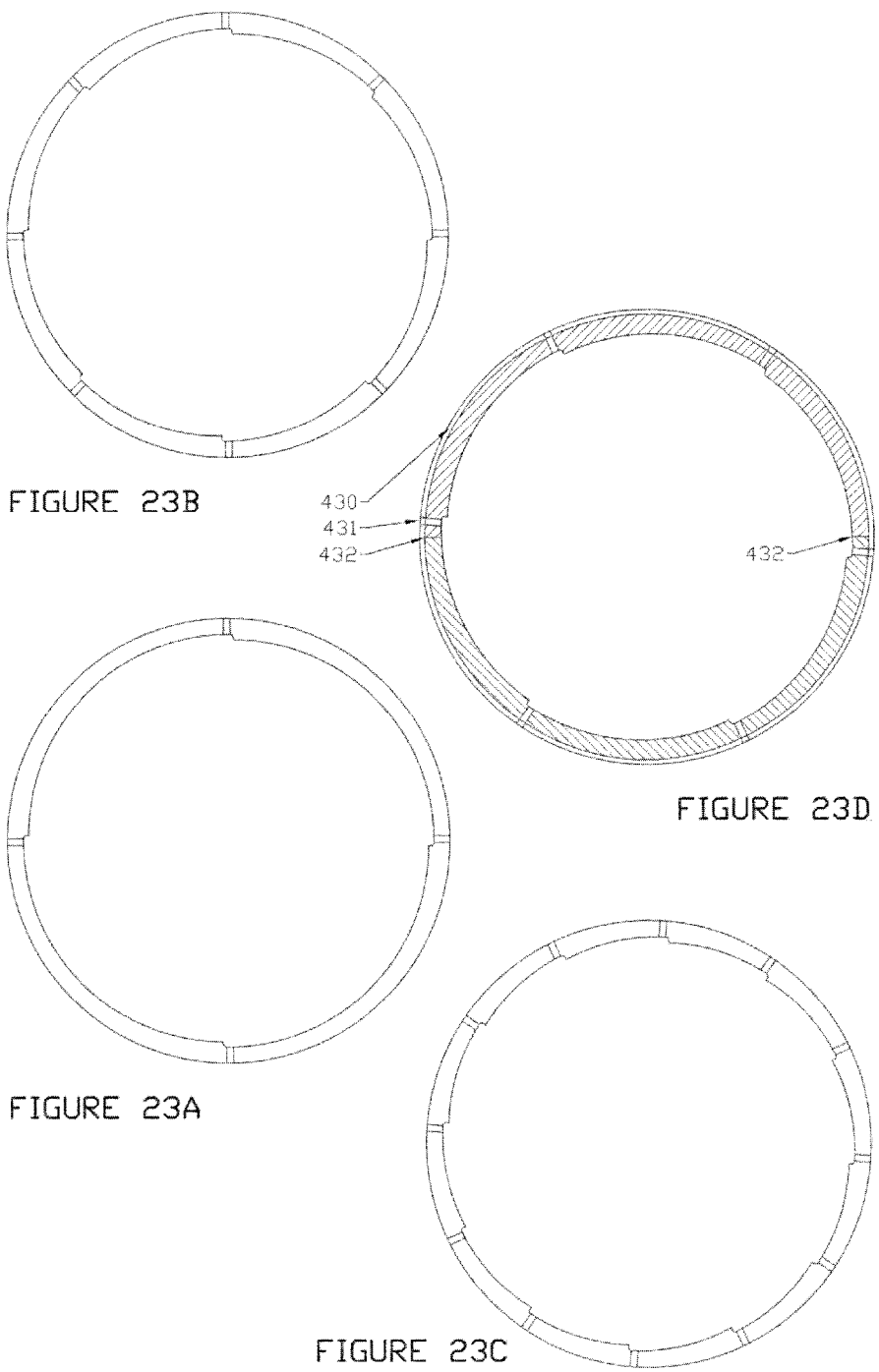

APPARATUS FOR SEPARATION AND PROCESSING OF MATERIALS

FIELD OF INVENTION

This invention relates to a tubular cyclonic separation device the basic form of which was presented in PCT/ZA2003/000160 with the primary purpose of separating a scrubbing liquor from a scrubbed gas stream as that gas stream exited a gas scrubbing device. The separation device was completely contained within a tubular profile, the diameter of which was that of the body of the cyclonic section itself. The gas-liquid mixture entered at an upper end of the device and the cleaned gas and the separated scrubbing liquor exited at the other lower end as separately ducted streams but all within the same cylindrical profile.

Also, within this same disclosure was the use of a specifically profiled stepped edge within the gas scrubbing unit together with the creation and application of a highly abrasion resistant resin based system which could be either cast or moulded.

This disclosure adds further novel and inventive developments to the cyclonic device which enable it to be used as a separating device for systems involving all three phases (gas, liquid and solid) and where two, three or more different product streams may be separated, all within the same cylindrical profile. These further inventive developments also relate to the use of externally supplied gas and/or additional liquid phases which are injected through the walls of the cyclonic body using specifically located slots and/or holes in combination with specifically located stepped edges.

These further novel and inventive developments enable the concepts of froth floatation (FF) and Dispersed Air Floatation (DAF) to be exploited within an enhanced gravitational field together with the options for washing the separated froth and/or the separated heavier fractions, all within the same cyclonic unit.

This further novel and inventive development can also be used to create very small gas bubbles and to contact these bubbles with the liquid phase in the presence of centrifugally enhanced gravitational forces. These centrifugally enhanced gravitational forces can be exploited to minimise the tendency of the bubbles to coalesce immediately following their creation and to maximise the mass transfer rate per unit surface area of bubble.

As part of the inventive introduction of the stepped edges, means are provided whereby the size of the gas bubbles may be controlled together with the intensity of the particle on particle interactions that may be created within a FF or DAF process. This latter has many potential applications, including oil and tar separation from solid surfaces and in many ore preparation and ore leaching processes. As a result of the technology, many of the materials processing functions that are associated with these processes are able to be combined with the separation functions which would normally follow such processes. Both sets of functions can now be carried out in the same tubular profile unit.

The tubular profile enables processing and separation to be achieved "within the pipe line" or for very closely packed arrangements to be assembled within carrier vessels.

All of the above developments have been evolved in a manner whereby the abrasion resistant resin material or other suitable construction materials may be used for the manufacture of the equipment.

BACKGROUND OF THE INVENTION

Most cyclonic separation devices take the form of a cylindrical vessel with a tapered conical section which tapers to one of the product outlets or alternatively, a tapered conical section without a cylindrical section. The materials to be separated are introduced at the wide end of the cone or, if a cylindrical section is present, at the opposite end of the cylinder to the conical section. The method of introduction for the materials to be separated is such as to cause the materials to rotate about the axis of the vessel as they progress through the vessel. This rotation is typically instigated using one or more tangential inputs for the feed mixture or by feeding the feed mixture axially through a set of shaped blades or by other suitable means. As the materials to be separated move away from the feed, the rotary motion of the flow moves the heavier or higher density components towards the perimeter of the vessel and the lighter and/or finer components towards the core. As the materials move into the conical area, the lighter and/or finer components begin to reverse flow in an ongoing spiral back towards the inlet end where in general they are able to exit through a central aperture. This aperture is often fitted with a short tubular connection which projects for a short distance into the vessel. This is often referred to as a vortex finder. The portion of the feed mixture which leaves via this exit at the feed end is often referred to as the overhead product.

The remainder of the feed mixture, containing the heavier or higher density components that have migrated towards the perimeter of the vessel, moves towards the narrow end of the conical section, progressively displacing most of the lighter and/or finer components and a proportion of the carrier fluid from within itself as it does so. As a result of this progressive displacement, the heavier portion becomes more concentrated. This heavier portion then leaves via a connection at the end of the conical section. This portion of the feed mixture if often referred to as the underflow.

The cyclonic separation device that was presented in PCT/ZA2003/000160 has all the product outputs at the opposite end to the feed end. This not only lends itself to simple "within the pipe line" styles of installations, it also enables closely packed arrangements to be created within carrier vessels.

These structural differences also affect the flow profiles within the unit. In a normal cyclone with its overhead product leaving at the feed end, the flow profiles consists of an outer vortex flow from the inlet towards the underflow exit with an inner vortex flow in the opposite direction. Also, because both exit flows leave via smaller (usually much smaller) radius conduits relative to the radius of the outer vortex, there is a considerable radial velocity component within the unit. The principle of conservation of momentum causes the circumpherential velocity to increase as the fluids move radially inwards. Overall, therefore, there are considerable variations in velocity between immediately neighbouring elements of the fluid within a normal type of cyclone vessel. These variations result in local shear and eddies which in turn affect the particle separation efficiency. Also, in the case of applications involving froth or dispersed air types of floatation, the froth and the particle-gas combinations are subject to considerable levels of destruction.

Where the product streams leave at the opposite end to the feed end, and where both products leave via large diameter connections, the internal radial velocity components can be arranged to be relatively low and the reverse flowing central vortex can be avoided. Alternatively, should it be appropriate, relatively modest radial velocities accompanied by a reasonably low intensity reverse flow central vortex can also be set up. For example, in the case of liquid based systems, the intensity of this radial component and the reverse flow vortex can be adjusted on line by simply adjusting the size of the gas core. A large diameter gas core will yield very little radial velocity and reverse flow vortex and as the diameter of the gas core is reduced so the magnitude of them can be increased.

These flow profiles and their adjustability within liquid based systems can be very advantageous in the context of liquid-liquid separations and in the context of Froth or Dispersed Air Floatation applications. These flow profiles and their adjustability will have a less pronounced benefit but none the less a significant benefit on the separation efficiency of suspended solids. The importance and benefit of controlling the diameter of the gas core within a normal style of hydrocyclone device is clearly shown within PCT WO 02/076622. In this disclosure, an additional gas core controlling conical aperture is concentrically inserted into the top of the normal overflow outlet connection and it is used to control the diameter of the core and the intensity of the shear (and hence eddy mixing) which occurs adjacent to the core. The technology that is presented herein enables the diameter of the gas core to be controlled in an on-line adjustable manner within this somewhat different style of cyclonic separator and to achieve this control not just with a single unit but when a closely packed group of such units are arranged within a carrier vessel. The technology presented within PCT WO 02/076622 relies on a fixed size of orifice. Obviously the orifice can be replaced with a different size of orifice but on-line adjustment is not available.

It must be remembered that the type of cyclonic separation device that is presented in this disclosure is not in general able to create such a thick and well dewatered underflow stream as can be achieved with a typical hydrocyclone unit.

The need to control the stability of the gas core is also referred to within WO 03089148. This disclosure also presents the concept whereby an additional, concentric and extended central vortex finder reaches down to at least the top of the conical section within a normally shaped hydrocyclone and/or cyclone. This additional vortex finder is able to remove a selected portion of what would otherwise be mostly included in the overhead product. In the main, this selected portion of the overhead product is that which is displaced from the most concentrated part of the underflow product as it concentrates itself in the lower portion of the cone. In general therefore, relative to the rest of the overhead product, this portion contains a much higher proportion of mid and oversize components. In addition, for a normal hydrocyclone or cyclone, this portion of the central vortex is created at a position which is at or very close to the centre line. This means that the centrifugal forces which act upon it as it rises up the centre of the core are generally not strong enough to clear all of the mid and oversize components out of it before it reaches the overhead outlet. By separately collecting and recycling this relatively small proportion of the total flow the authors claim a very much improved quality of separation within the remainder of the product streams.

Typically within a normal hydrocyclone, the gas core can source its supply of gas from either the overhead connection or the underflow connection as well as via the feed. In some instances, depending upon the style of connection which is fitted to the overhead and underflow outlets, gas can be drawn through the unit from the underflow to the overhead product. In these circumstances the quality of the overhead product can be affected not only by the gas inclusion but also by the poorer separation of the larger solids from the liquor which is routed to the overhead product from the last thickening stages of the underflow product.

GB897057 presents a device which can be mounted within the vortex finder for the overhead product and which prevents the gas core from being removed with the overhead product, unless that core exceeds a particular size.

This same type of concept is reported in U.S. Pat. No. 48,438,434 but in this instance it is used to prevent the gas core from being removed within the underflow. It is also used within a froth floatation application inside a cyclone to create a "support pillar" for the separated froth so that the froth is forced to exit as part of the overhead product. This same disclosure also presents a range of differently shaped support pillars which by inference are very instructive as to the manner with which material moves from the main outer vortex into the inner reverse direction vortex within a normal hydrocyclone.

The concepts which are presented herein avoid the reverse direction central vortex, the relatively high radial velocities, the dewatering function of the underflow close to the centre line and the small diameter gas core. Instead, the coarse solids are not forced towards the centre line by the shape of the cyclone body, and there is the option to use a connection at either the feed end or the outlet end through which the diameter of the gas core can be controlled.

CA 1178383 presents one of the earliest disclosures for the concept of carrying out gas injection through the walls of a cyclonic separator so as to create a froth floatation or dispersed air floatation style of device within the enhanced gravitational field of a cyclone. Here the non-floated material is removed via an annularly connected tangential outlet and the froth is removed using a counter flowing vortex through a central vortex tinder type of connection at the slurry inlet end. A permeable wall for the hydrocyclone is mounted within an outer container and is used to supply the compressed air for the floatation process. The equipment had a tangential inlet for the slurry feed and in general sought to keep a relatively thin slurry layer on the inside wall of the generally cylindrical and permeable wall within the equipment. In this way they were able to limit the magnitude of the shear between the upward flowing central vortex of froth and the downward outer vortex of aerated slurry.

U.S. Pat. No. 4,997,549 introduces wash water sprays to clean the froth before the froth leaves via the overhead product. In most other respects the equipment that is described in U.S. Pat. No. 4,997,549 has a lot of similarities to that which is disclosed in CA 1178382.

WO 9119572 uses a similar concept to that presented in CA 1178382 except that an orifice plate type of obstruction is fitted at the bottom of the permeable wall part of the cyclonic body. Beneath this orifice plate type of obstruction the underflow fraction was able to degas itself so as to create a reasonably gas free product. The underflow product from the CA 1178382 style of equipment contained a significant proportion of gas bubbles.

The equipment which is presented herein is arranged to be able to degas the underflow product without the need for such on orifice type of obstruction and without all the blockage issues that accompany such an obstruction. These blockage issues would be particularly acute if the feed slurry contained heavy components (such as metal fragments), or inadequately screened oversize materials.

One way of avoiding the issues associated with pore blockage within a permeable wall unit is to separately supply a layer of froth beneath an incoming and already spinning layer of feed slurry. This concept is disclosed in U.S. Pat. No. 4,971,685. The principle draw back of this equipment is the limited ability of the separately created froth to maintain its function throughout the equipment. This equipment used an annular collection arrangement for the underflow product and a disc type of froth support pillar.

Another disclosure where the froth is pre-made before it enters the separation device is presented in CA 2246841. This disclosure relates to the recovery of bitumous oil from the large deposits of bitumous oil sands which are found in western Canada. Careful slurry preparation and extensive pre-conditioning and air addition upstream of the cyclonic device is needed in order to separate the bulk of the bitumous oil off the surfaces of the sand particles before the slurry enters the separator.

The separator has multiple (usually two) tangential inlets at one end, an annular collection zone with tangential off-takes for the residual sand slurry at the other end and a central froth outlet for the bitumous float, also at the opposite end to the feed. At the top of the off-take for the bitumous float there is an annular platform which is designed to act as a froth support platform. This platform enables the froth to separate itself into a reasonably sand free float fraction which then passes on down through the hole in the middle of the annular platform. The annular platform also enables the sand slurry to be able to reasonably de-aerate itself before it passes around the outside of the annular platform. The equipment has a reasonably low pressure drop relative to the claimed particle size of sand which is kept out of the float fraction. However, it is anticipated that the degree of removal of the bituminous oil is not as high as it otherwise could be if a) good particle on particle scraping were achieved and/or
b) wash water or additional froth were provided towards the end of the separation process to sweep the residual fine bitumen particles out of the mother liquor which is incorporated with the sand fraction.

The later parts of the disclosures that are made herein seek in particular to address these two technical features.

SUMMARY OF THE INVENTION

A cyclonic separation and materials processing device is presented which has a materials entry at one end and which is arranged so that the materials that enter will be given a tangential velocity component as they enter. The materials then move through an essentially cylindrical cyclone tube towards an annular outlet for the heavier fraction (or the so called "underflow" fraction) and a second concentric outlet for the lighter or "overhead" fraction. Typically the tangential velocity is imparted using a set of axial flow spinner blades which are arranged around a central cylindrical or tubular core piece. This core may be fitted with one or more concentric connections for variously enabling different aspects of the invention to be carried out. Similarly the outlet for the "overhead" fraction may be fitted with either a concentric froth or vortex support pillar or with one or more concentric tubular connections so as to enable other aspects of the invention to be carried out.

For purposes of the present specification, apparatus is understood to encompass reference to, inter alia, a device, a unit, a cyclone separation unit and/or a cyclone unit.

A particular feature of the invention is for the whole assembly to be achievable within a tubular profile the diameter of which is the diameter of the cyclone tube. This enables an individual example of the invention (hereinafter referred to as a unit) to be used as a truly "within the pipeline" type of device. Alternatively a number of units can be assembled into a close packed parallel arrangement within a carrier vessel so as to provide an assembly with an appropriately larger volumetric capacity.

The units were originally developed for the purpose of removing a liquid or slurry dispersion from a gas. However, the equipment is equally capable of removing larger and/or higher specific gravity particles and/or droplets (hereinafter referred to as a heavy fraction) from a liquid or liquid mixture. In addition, with the benefit of additional connections through the inlet end and/or the opposite end of the unit, multiple fractions are able to be separated whilst at the same time the size of the gas core can be controlled and stabilised.

A further feature is the option to install a permeable wall within a portion of the length of the cyclone tube through which gas may be introduced so as to enable a froth flotation or dispersed air type of floatation process to proceed within the unit. An alternative use for this permeable wall is to introduce a liquid though the wall for example to wash the heavy or underflow fraction before it is discharged. The arrangement details for this permeable section of the wall are such that different fluids (gases and/or liquids) can be added separately at different locations along the length of the same unit and the relative proportion of each fluid that is added could be on-line adjusted.

Amongst the many drawbacks and limitations that are associated with a permeable wall is the very fine filtration that must be applied to the fluid that is to be injected in order to avoid blockage problems within the permeable wall. A further drawback is the relatively limited volumetric flow of liquid that in general can be achieved.

A solution to these restrictions has been invented whereby gas or liquid is introduced through axially spaced holes or slots into the space immediately behind axially orientated stepped edges within the body of the cyclone tube. A number of these stepped edges can be arranged around the perimeter of the cyclone tube and each stepped edge would have its own set of holes or slots. These holes or slots may have any orientation but preferably they should be arranged to feed tangentially or almost tangentially into the rotating medium within the cyclone tube. A method is presented whereby these holes and slots may be created using an assembly of axially orientated strips which are assembled and held together in a manner similar to that for the wooden staves in a wooden barrel.

This mechanism enables a sequence of wide slots to be created which enable a complete layer of liquid to be inserted outside the rotating medium within the cyclone tube. This option enables smooth and uniform contact to be made between the inserted fluid/fluid mixture and the whole of the rotating medium. This should be compared with the previous options which were available and which used one or two tangential pipe entries for introducing a second fluid for product washing or other purposes.

The fluid which enters via the tangential slots in this design is also able to impart a smooth accelerating or decelerating function to the medium which is rotating close to the wall of the unit.

A particular benefit that can be derived from gas insertion via the axially orientated stepped edges is that a gas cushion can be created beneath one or more circumpherential portions of the rotating medium. This gas cushion is able to create an effectively frictionless boundary within the zone of the gas cushion. Typically, between about 20% and 70% of the perimeter of the cyclone tube can be covered by a virtually frictionless boundary.

A further feature which can be derived from the stepped edge is that as the gas cushion breaks up and is incorporated into the bulk of the rotating medium, the fineness of the gas bubbles that are created can be controlled. This control is achieved partly by the selection of a particular shape for the inside surface of the cyclone tube between each stepped edge and partly by adjustments to the gas feed rate. The shape selection can also be used to vary the intensity of the particle on particle interactions and of the other gas-liquid-solid interactions which occur as the liquors which were supported on the gas cushion "land" back onto the inside surface of the cyclone tube. For a typical situation with eight stepped edges per unit, the rotating medium within the unit is exposed to eight such sequences of intensive interaction per revolution within the unit. Also, as part of each interaction there is an intimate gas contacting mechanism between the gas bubbles and whatever is liberated from the surfaces of the other separate phases as a result of that interaction.

In this form, equipment of the type that is described in this invention can become a very effective means for removing oil from oil coated solids and for enhancing many ore leaching and related applications.

A number of ways by which groups of the units may be installed into carrier vessels are also presented. It is clear from these examples that many other specific arrangement details can also be achieved. It is therefore quite possible to envisage the through the wall features as being able to add a number of different fluids one after the other, each at its own location along the length of the unit, so as to achieve a number of potential chemical or other process functions one after the other. These additions would all have the benefit that the heavy fraction is continually the first to see the inputted fluid. Also, any residues/extracts from the previous addition(s) can be cleared away from the heavy fraction, ready for the next addition to be made or ready for the separated product to be discharged.

Each unit is therefore able to be considered as a piece of multi-functional processing equipment which also has its own inbuilt product separation facilities.

BRIEF DESCRIPTION OF THE DRAWINGS

FIG. 6 presents various example arrangements for utilising the cyclone function within an "in the pipe line" type of application.

FIG. 7A presents a simple tubular embodiment which is suitable for insertion into a compact assembly within a carrier vessel.

FIG. 7B shows how abrasion resulting from the annular discharge of the heavy fraction (underflow) into the carrier vessel can be minimised.

FIG. 7C indicates one method by which an additional concentric connection may be made through the middle of the lighter fraction off-take. This connection would be appropriate for example for an oil off-take when processing an oil-water-solids mixture. It could also be used for controlling the gas core.

FIGS. 8A, 8B and 8C show further optional arrangements for connections at both the feed and the other end of the unit, including at 8C a froth or core support pillar.

FIG. 16 continues the concepts of FIG. 15 into the type of detail that is appropriate for a carrier vessel of the type shown in FIG. 14. It also shows how a froth washing function can also be added.

FIG. 21 also shows a carrier vessel capable of containing up to 18 such units.

FIGS. 23A, B and C present cross sectional designs for 4, 8 and 12 stepped arrangements.

FIG. 23D presents one method by which a stepped arrangement could be manufactured as two halves and then bonded and bound together.

OUTLINE DESCRIPTION OF THE PREVIOUSLY DISCLOSED EQUIPMENT

Figure 1:
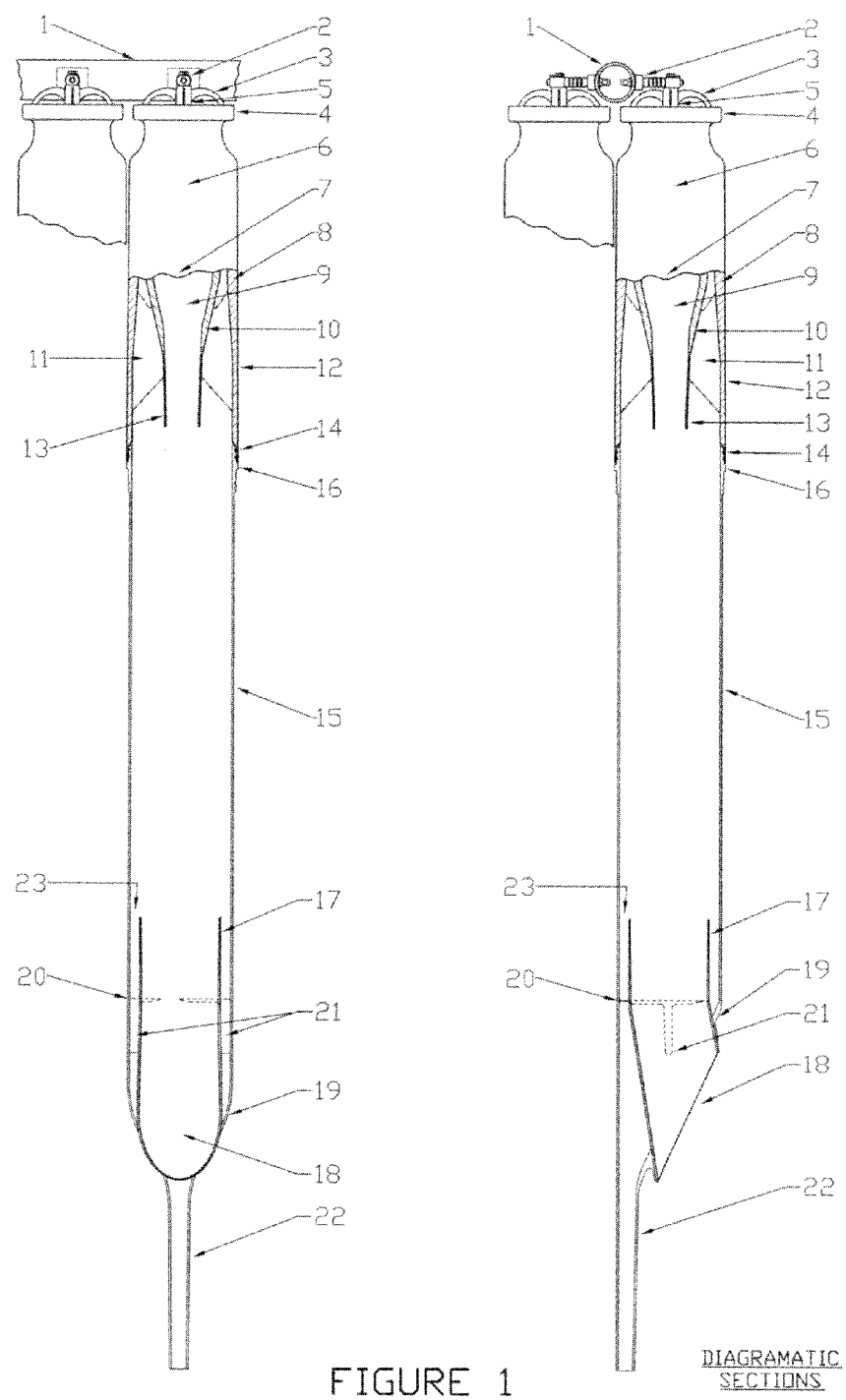
FIG. 1 presents the dedicated spinner section and cyclone separation unit for separating the scrubbing fluid from the scrubbed gas from the previously disclosed gas cleaning unit.
Figure 2:
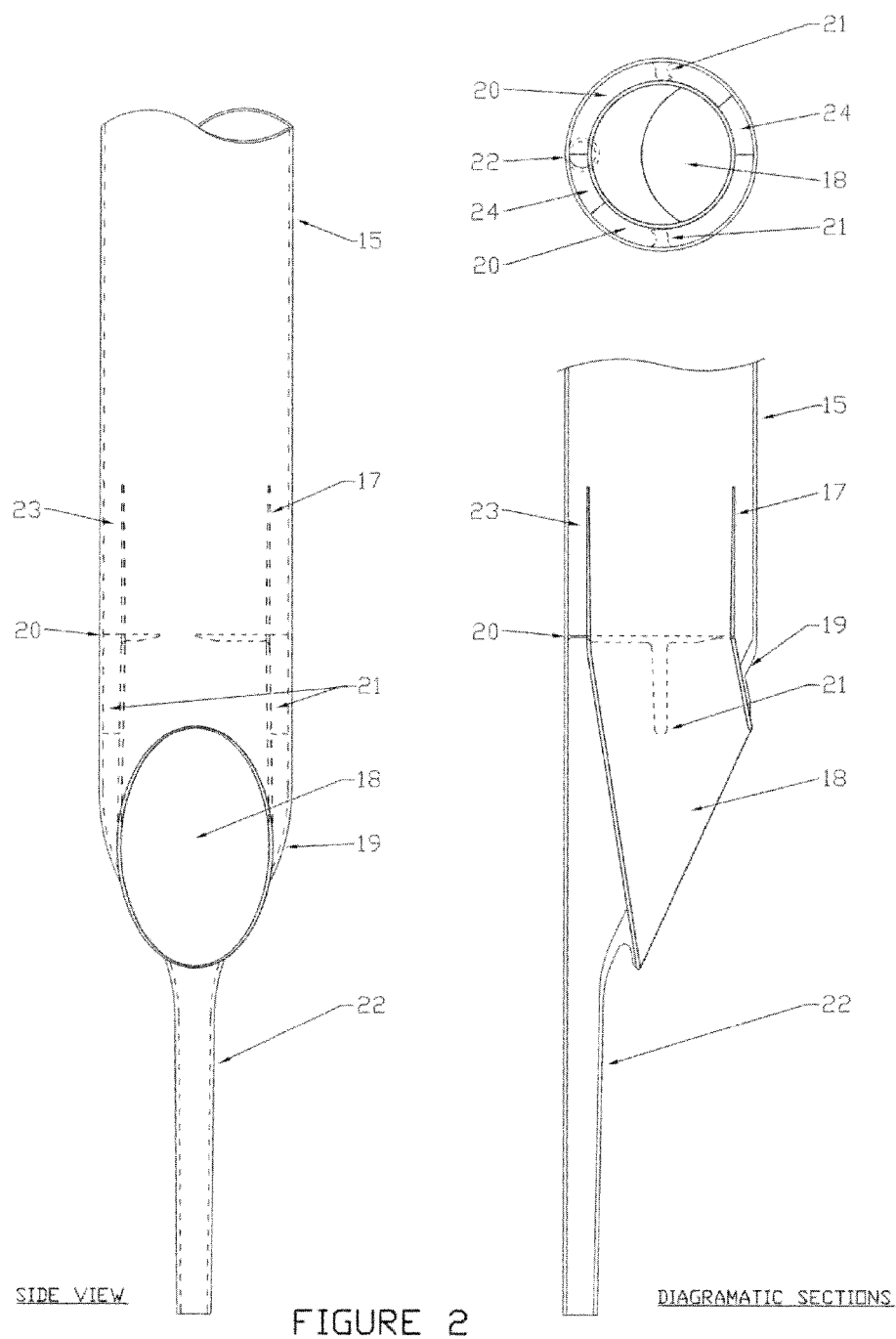
FIG. 2 presents in more detail the vortex finder area of the above referred cyclone unit.

FIG. 1 illustrates an example of the equipment associated with one gas scrubbing unit within a close packed array of such units in accordance with the previous invention and which has a centrally arranged scrubber fluid feed.

In this example, scrubbing fluid enters the equipment via a header 1. The scrubbing fluid is drawn off the header 1 at each gas cleaning unit through an off take fitting 2. Typically, there is one such fitting per gas scrubbing unit. Each header 1 typically services two rows of gas scrubbing units.

The feed to each gas scrubbing unit turns through 90° and is directed downwards into the gas scrubbing unit through a centre feed pipe 5. The centre feed pipe 5 is centred, using a spoked hub 3, which in turn is held in place by an outer ring 4.

The gases to be scrubbed enter downwards between the spokes 3 and pass through the annular space between the centre feed pipe 5 and the outer ring 4 into the heart of the scrubbing unit 6.

The section line 7 is positioned just below the scrubbing section of the unit. This section line reveals, in the case of this embodiment, an annular outlet 8 from the scrubbing section which immediately directs the mixture of scrubbed gases and used scrubbing fluid into the spinner blade section. This section includes in this embodiment six spinner blades 11. These blades are situated within the annular space between the outer casing 12 and a hollow core piece 10.

At the bottom of the spinner there is an inner skirt piece 13 which serves to create an annular calming zone for the mixture of gas and scrubbing fluid as it emerges from the spinner blades 11. The hollow recess within the skirt 13 prevents any solids and any droplets of scrubbing fluid that may have bounced off the blades within the spinner section from directly accessing the central vortex and thereby accessing the gas outlet. In this embodiment, this hollow recess was conveniently extended up into the area 9 inside the scrubber section. Alternatively and preferably, it can be closed off with a domed or upwardly conical top at some convenient point within the skirt 13.

The outer casing of the spinner section, 12, extends below the spinner blades for a minimum distance so as to provide a suitable wear surface in the area of high wear, which occurs immediately beneath the spinner blades.

The extended outer casing, 12, sits on the top of the main cyclone body section 15. This joint can be sealed using 'O' rings, 14, by resin bonding, or by other suitable means. In the previous embodiment, the top of section 15 had a shaped shoulder and locating lug 16, which sat on top of and was 'O'-ring sealed to a mounting ring (not shown here). This mounting ring was resin bonded onto and sealed to a punch plate which was sealed into the main carrier vessel into which the gas cleaning units were mounted. The locating lug 16 prevented each unit from rotating as a result of the rotational torque produced by the spinner.

At the bottom of the cyclone section 15, there is a vortex finder pipe 17, which delivers the clean gas to the clean gas outlet 18. The vortex finder pipe is inserted through the aperture at 19 and bonded into place.

The part rings 20 at the bottom of annulus 23 are arranged so that the baffles 21 are about 35% of the way around the underside of the respective ring in the direction of rotation.

The scrubbing fluid outlet 22 is drained by gravity into a collection pipe (not shown here). The whole arrangement of the collection pipe, the gas cleaning units, the punch plate and the drainage collection pipes are typically arranged into an overall carrier vessel with the dirty gas entering the top of the vessel and the clean gas extracted from the side of the vessel at a convenient point below the punch plate.

The lower part of the vessel receives the scrubbing fluid, which is drained via the outlet pipes 22. This lower part of the vessel provides a suitable storage and recirculation vessel from which the fluid can be pumped back to the scrubber fluid inlet header and/or to an appropriate treatment or other process.

Such an arrangement was described in full within PCT/ZA2003/000160.

The cyclonic section 15 is connected at joint 19 or using some other convenient connection to the vortex finder. The vortex finder pipe 17 discharges at 18 via the partial bend. The gap between 17 and 15 forms the annular section 23. The portions of annular ring 20 form an approximately perpendicular partial end to this annular section which enables the used scrubbing fluid to be separated from the gas and discharged via pipe 22.

In order to achieve this separation, the scrubbing fluid with some entrained gas passes through the gaps 24 between the portions of annular ring 20 into the space below these portions of annular ring. Here (and within the annular space beneath the ring portions) the radial baffles 21 (which project across the full width of the annulus below the ring portions 20) stop the rotational movement of the scrubbing fluid and entrained gas. The scrubbing fluid falls to the bottom and exits via pipe 22.

Figure 3:
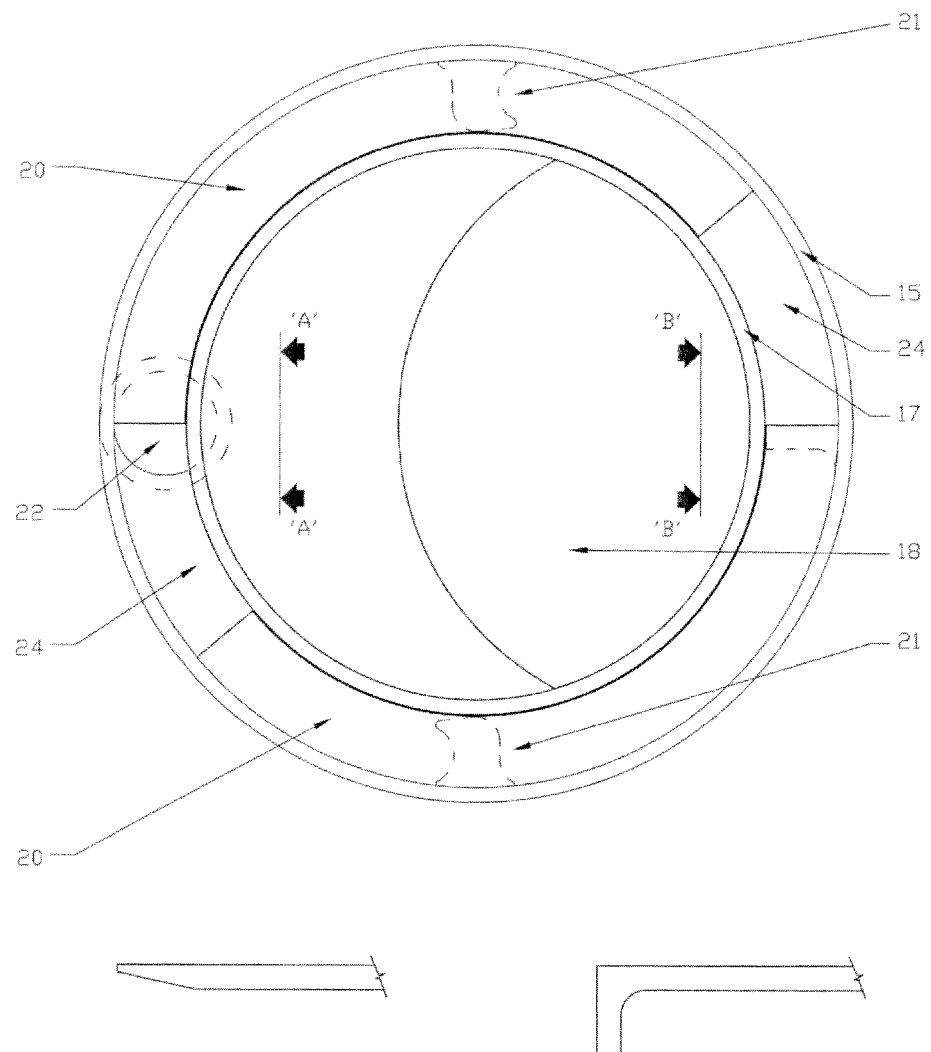
FIG. 3 presents further details of the baffling and turbulence suppression arrangements which are a feature of the annular collection zone for the scrubbing fluid within the previously disclosed gas cleaning unit.

Section BB on FIG. 3 shows a radial infill piece beneath the end of one of the ring pieces 20. This infill closes the gap between the top of the inclined end plate which is formed around the gas exit 18 to close off the annular gap below the ring pieces 20. This infill (as shown in section BB) prevents the non uniform annular space that is formed by the outlet 18 and the inclined end plate from upsetting the performance of the vortex finder.

PCT/ZA2003/000160 describes a preferred connection detail between the cyclone body and the gas cleaning unit and a preferred detail for mounting the whole assembly into the punch plate support within the main carrier vessel. Numerous other optional designs can be used to suitably support, seal and orientate the cyclone pipe into the punch plate support structure. These options must ensure that the torque created by the spinner blades does not cause the cyclone pipe to rotate or to "creep-rotate" over time.

Logical Developments to the Previous Disclosures

Figure 4:
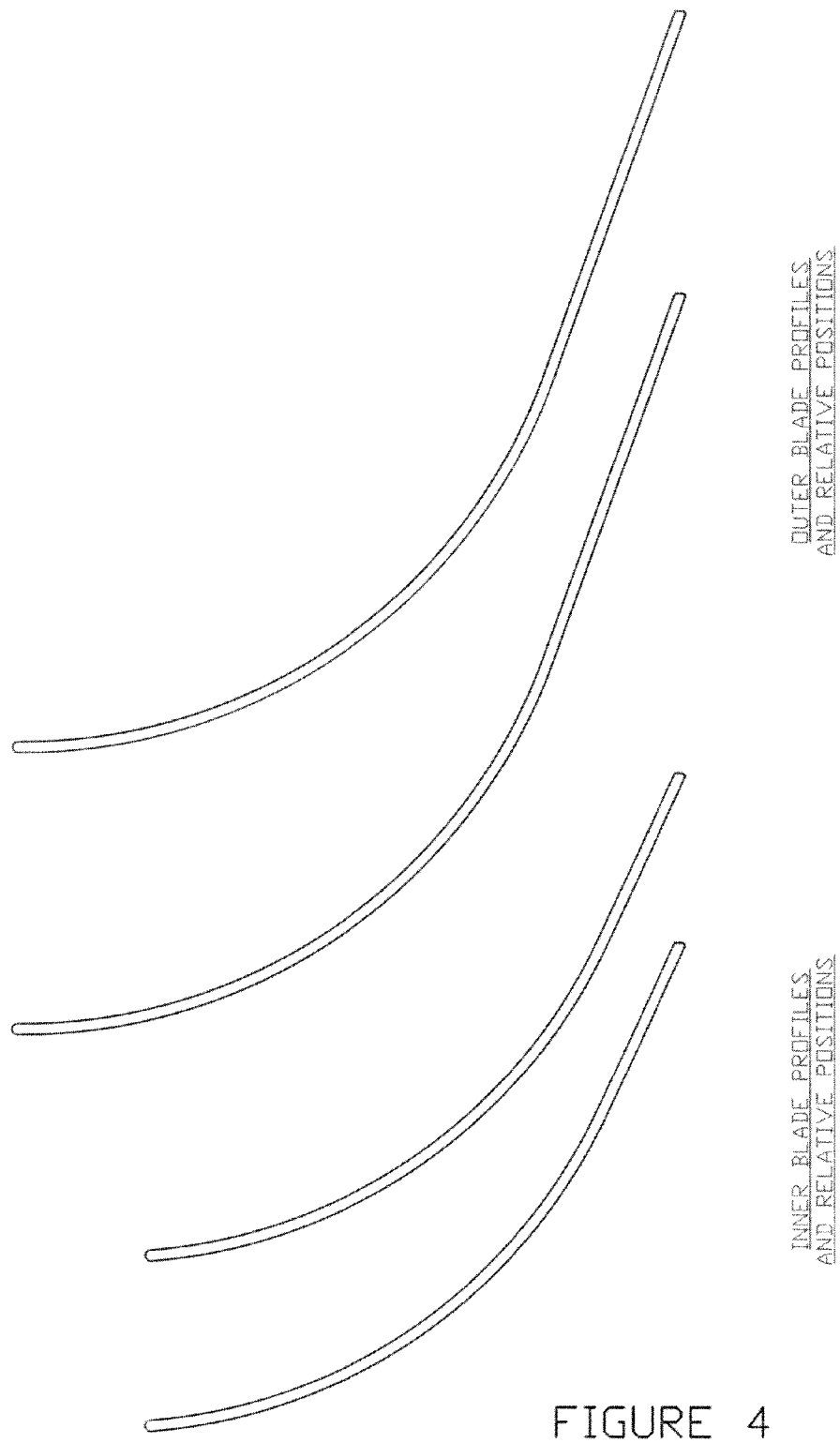
FIG. 4 presents details of the type of spinner blade design which has proven to be efficient, wear resistant and effective.

FIG. 4 shows a set of profiles for the blades 11 in the spinner section. With respect to the profiles which were presented in PCT/ZA2003/000160, those which are shown in FIG. 4 have been adapted to create reduced turbulence on the back of each blade; to create a greater overlap between the exit from one blade and the start of the next blade forward; and to optimise the positioning of the inner profile relative to the outer profile. As a result of this latter, the inner blade profile has been positioned so that the resultant top radial edge of each blade slopes towards the centre of the spinner section. This slope can be exploited as will be shown in relation to FIG. 29 to create a spinner which is particularly resistant to blockages when handling stringy materials within the incoming fluid mixture.

A further benefit of the re-positioning of the inner profile for the blades relative to the outer profile is that large solids which bounce oft the blade surface will tend to bounce in a direction which is approximately perpendicular to the radius line at the point of impact. With the previous profiles, the bounce would have been inwards relative to the radius line at the point of impact.

This more outward bounce ensures a reduced angle of incidence between these solid particles and the wall of the cyclone body section. As a result, there is less abrasion further down the cyclone. Also, the average bounce trajectories for those particles as they move on down the cyclone body will tend to be nearer to the walls of the cyclone. As a result, less of them will enter the inside bore of the vortex finder.

Moving the inner blade profile higher relative to the outer profile will further improve this bounce issue. However, by raising the inner profile, there will be less potential for exploiting the reduced blockage options which will be referred to in relation to FIG. 29. Clearly, an optimum trade off position can be identified to suit the particular application.

The angle between the outlet part of each blade and the line perpendicular to the axis of the spinner for the blades that are shown in FIG. 4 is 20° at the outer perimeter of the blades and 25° at the inner perimeter of the blades. These angles are considered to be close to the middle of the preferred range of angles. Larger angles allow larger gaps between the blades and therefore larger debris can be passed without blockage. However, a reduced level of spin will be imparted. This reduced level of spin may not be sufficient to yield optimum separation for the smaller particles within the cyclone body.

Smaller angles will create increased tangential components within the resultant velocity of the fluid mixture as it leaves the blades. However, as the angle is reduced, the gap between the blades at the blade outlet is reduced. Also, as this angle is reduced, so the rate of reduction in this gap gets faster. For angles below 15° at the inner perimeter and with blades with a realistic thickness as regards wear life, the gap becomes too small for most practical situations unless there is good upstream debris screening.

One option is to use fewer blades. However, turbulent losses become a problem within the inlet region of the blades. Also, for liquids, cavitation or related issues within the inlet region of the blades will become a problem.

With this style of cyclone, with the vortex finder at the opposite end of the cyclone body relative to the fluid inlet, it is not normally necessary to have such a high tangential velocity at the inlet for the same degree of separation over the same body length. Also, reductions in tangential velocity as a result of viscous drag will not cause such a significant reduction in performance relative to what would occur within a conventional cyclone with the vortex tinder at the inlet end. These features are particularly noticeable when separating liquids from a gas or from another lighter and non-miscible liquid.

This latter feature also enables practical designs to be achieved where the cyclone body is longer than would otherwise be appropriate with a conventional design. This leads to a sharper cut between the separated and un-separated fractions and to smaller particles being separable for a given cyclone diameter and tangential velocity.

Overall, the preferred range for the average between the angles between the outlets of the inner and outer perimeters of the blades and the line perpendicular to the axial centre line of the spinner would be between 10° and 50° with a more preferred range of between 15° and 35°.

Figure 5:
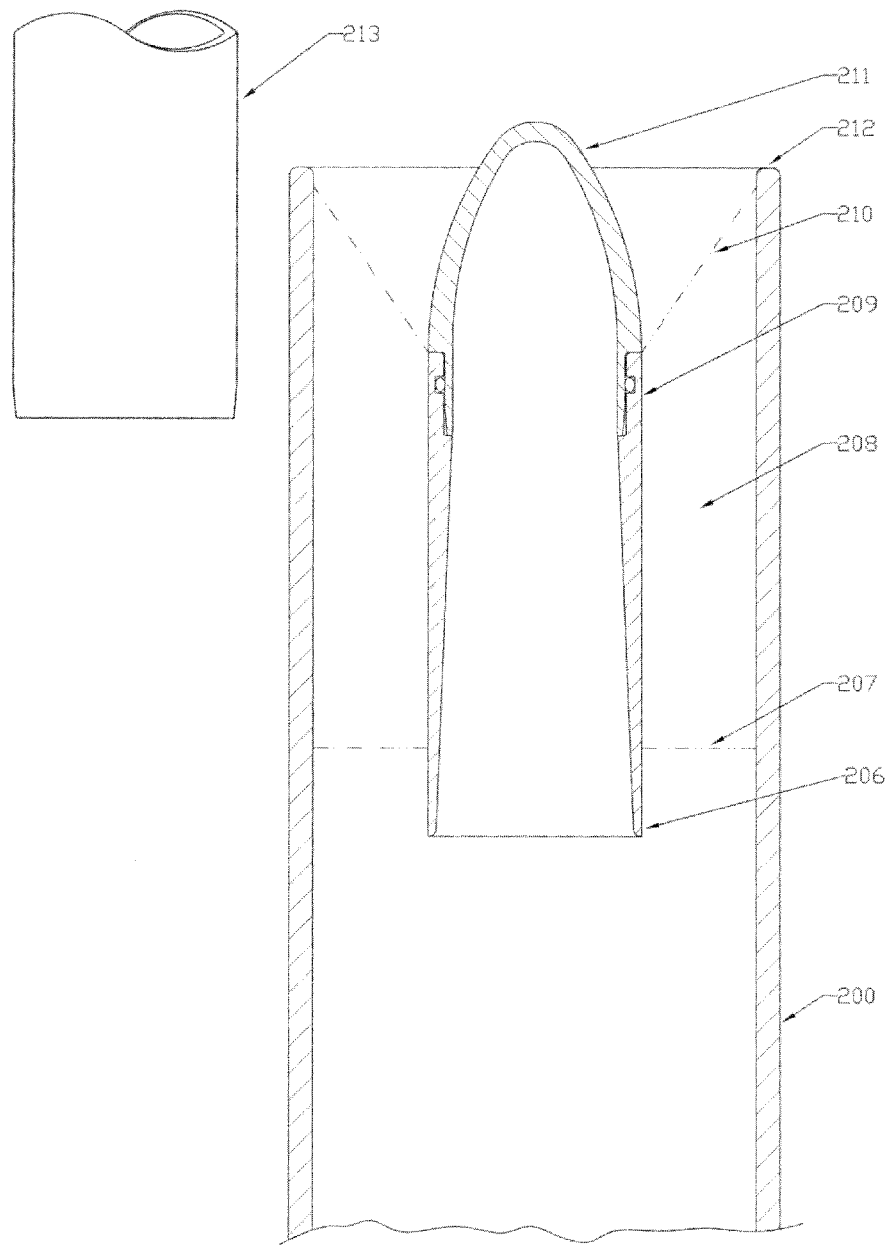
FIG. 5 presents a diagrammatic sectional view of a spinner for the more general case where the spinner is not connected directly to the equipment that produces the feed materials.

FIG. 5 shows an alternative and more generally applicable spinner section. In this more generally applicable embodiment, the tapered inlet between the core section 10 and the outer casing 8 in FIG. 1 have been replaced by a parallel open ended arrangement beginning at the open end 212. The rest of the arrangement is similar to the previous design with the blades 208 having leading edges at 210, trailing edges at 207 and an inner skirt section beneath the blades 206. This assembly can be continuous with or separately jointed to the cyclone body 200. FIG. 5 shows a continuous connection.

The centre hole where the core section 10 (in FIG. 1) would have been is, in this embodiment, capped with the removable cap 211. This cap can be sealed to the spinner core at joint 209 using an appropriate sealant, 'O' ring (as shown here) or other appropriate means. Alternative arrangements for the function of cap 211 are also possible. The inlet area to the spinner is now approximately twice that of the unit which is shown in FIG. 1. In FIG. 1 the object was to maintain as far as possible the exit velocity from the gas scrubbing unit and to convert that velocity into a spiralling vortex without significantly changing the speed of the gas.

Here, the inlet velocity is much lower and acceleration occurs within the blade section. As a result, the potential for gas turbulence issues or for liquid cavitation issues at the back of each blade will be much reduced.

The dome shape or alternatively a conical shape to the inside of the cap 211 is there to ensure that droplets cannot enter the central vortex from within this skirt section. It is also there to ensure that any condensation or other collection of solids or liquid within this area is returned to the bottom perimeter of the skirt 206, following the mechanisms and details which were described in detail in PCT/ZA2003/000160.

Clearly, one or more tangential inlets can be arranged for feeding the inlet materials as an alternative to, or as an addition to the spinner arrangements that have been described above. All such arrangements would be amenable to adaptation to suit the inventive developments that are disclosed herein.

In the general situation of a droplet removal cyclone of this e, the gas velocities are typically much higher than for a dry particle cyclone. The liquid film that accumulates on the wall prevents significant solid particle bounce at the wall. At very high gas velocities, the turbulent shear forces at the gas/liquid interface tend to cause droplets of liquid to be pulled out of the liquid surface. In the more general case of a flat liquid surface, these droplets can create quite a deep layer of spray above the liquid surface. In the case of a liquid covered wall of a cyclonic section, these spray droplets are subject to centrifugal forces and as a result they are unable to move more than a few millimeters from the wall before the effect of the centrifugal forces return them to the wall. Therefore, these droplets can only be present within a few millimeters of the wall of the cyclonic section. The form of the vortex finder ensures that any such "surface spray" of droplets is retained.

In addition to the option for mounting the cyclone tube, spinner and vortex finder arrangement within a carrier vessel, it is equally appropriate to arrange them in the form of a pipe section. FIGS. 6A to 6D show various examples of how this can be arranged. Clearly, these are not the only options which can be arranged. However, the concept of a pipeline separator with an axial inlet at one end and either axial or side outlets at the other end for the separated components is a particular feature of this development, especially when the options associated with FIGS. 29A to 29D for reducing the risk of blockages are also added. These options will be described more fully later.

A particular advantage of the features shown in FIGS. 6A to 6D are that it is clear that this style of cyclone is not limited to the separation of liquid droplets from gases. It can be used for most of the potential options associated with all three phases, (gas, liquid and solid), including liquid-liquid systems, liquid-liquid-gas systems, liquid-liquid-solids systems, liquid-gas-solids systems and liquid-liquid-gas-solids systems.

DETAILED DESCRIPTION OF THE PRESENT INVENTION

FIGS. 6A to 6D particularly focus on the "within the pipe" style of applications. FIGS. 7A and 7B together with FIGS. 8A to 8C demonstrate how those same features and further features can be combined into the original design requirement. This requirement was for the unit to be entirely contained within the cylindrical profile of the cyclone tube itself no as to enable a number of such units to be mounted within a close packed arrangement within a carrier vessel.

It should be noted that none of these options require the units to be mounted vertically.

Figure 9:
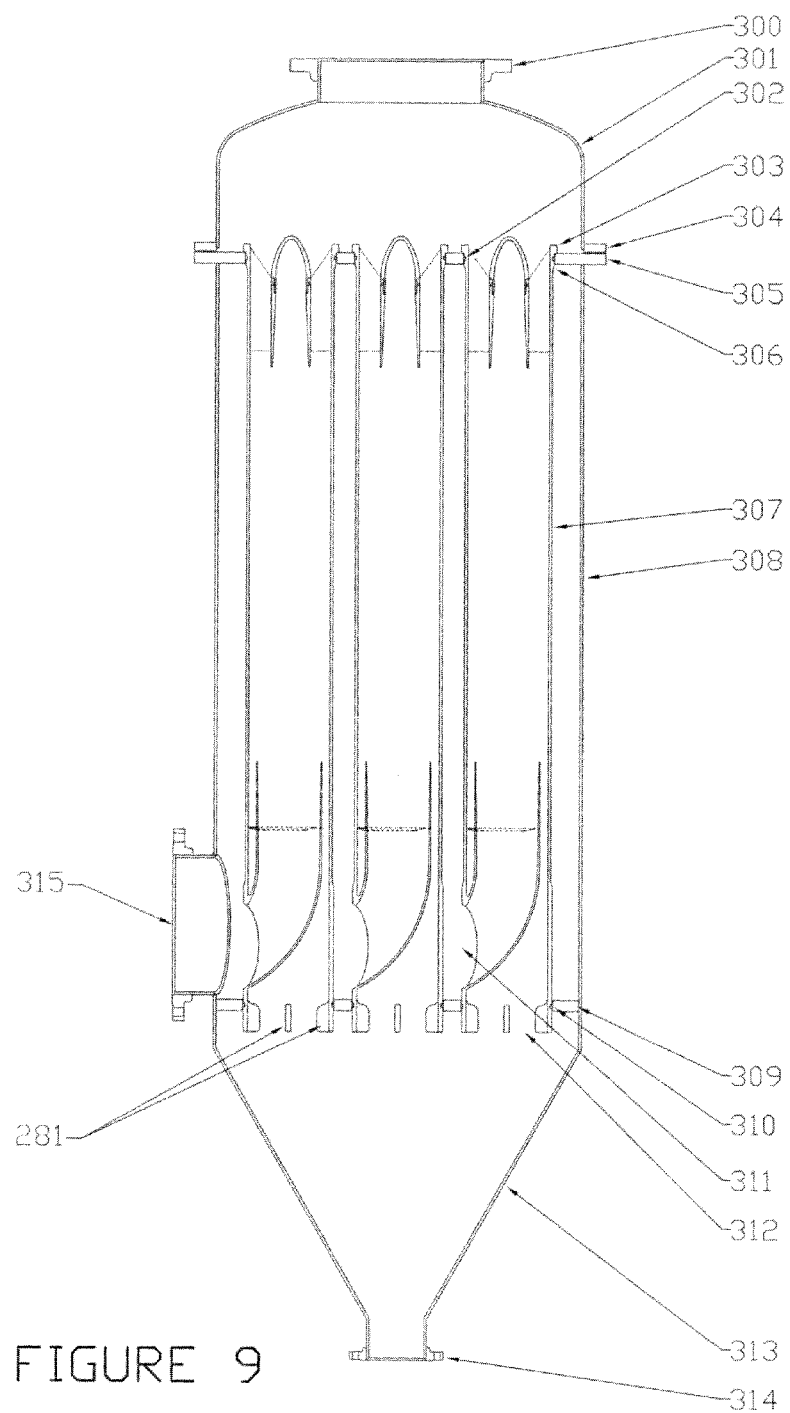
FIG. 9 presents a typical carrier vessel arrangement for a collection of units as presented in FIG. 7A.

FIG. 7A shows how the simple two phase separation embodiment can be arranged so that it can be utilised as a number of parallel units in a close packed arrangement within a carrier vessel such as is shown in FIG. 9. By mounting the unit between two separating punch plates so as to create a three chamber carrier vessel, a very compact and high capacity system can be achieved.

Referring to FIG. 7A, it will be noted that the axial annular baffles below the part rings 224 have been deleted. Once the concept of the inclined outlet connection at 19 in FIG. 1 (which allowed the liquid to be routed to the outlet 22) is deleted and the fluid (or the heavier fraction in the more general case) is allowed to pass freely on down the annulus, then these axial baffles in the annulus are no longer needed.

If it is appropriate to reduce the spin velocity in the annulus, e.g. to reduce abrasion within the receiving zone of the carrier vessel, then radial fins can be inserted beneath the outlet for the light fraction as shown at 281 in FIG. 7B. Ideally, the top edge 280 of the radial fins 281 need to be inclined from the wall so as to progressively reduce the spin energy and thereby minimise local abrasion.

Figure 13A:
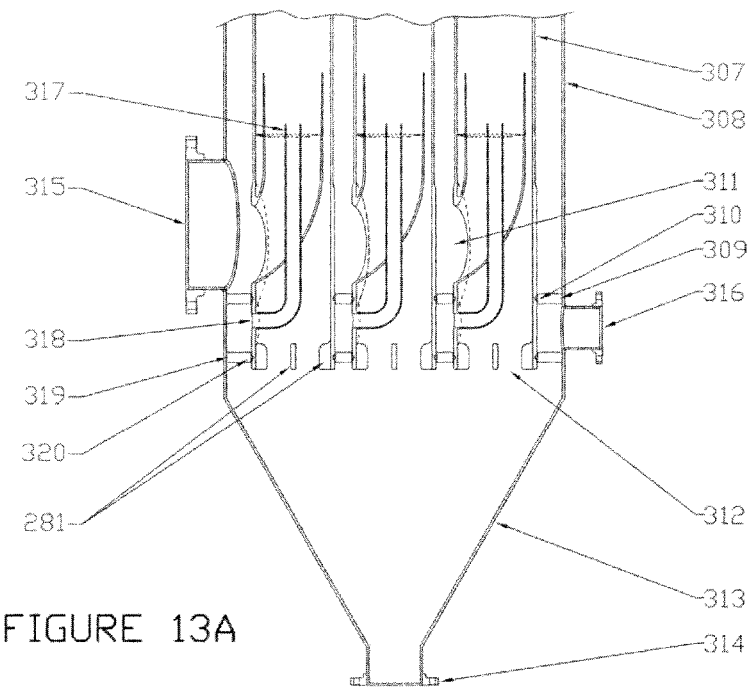
FIG. 13 shows alternative details using at 13B a different style of support pillar or at 13A a connection through the vortex finder.

At FIG. 7C, a second connection is provided within the centre of the vortex finder. This can be connected using an additional punch plate within the carrier vessel (as for example is shown in FIG. 13A). This additional connection can be used for a number of purposes. These include:—
1) A controlled source/exit for a suitable gas for use within a liquid cyclone duty, so as to enable a properly stable and controlled radius gas core to be established.
2) An outlet for a third phase, e.g. "oil" or gas when the unit is used as a three phase separator.
3) An outlet for a froth phase when the unit is used as part of a froth floatation or froth separation system. (This will be reviewed in more detail later).

Note, when such a design is used in conjunction with a piped centre entry through the spinner, then the function of stabilising a gas core and/or removing a third phase or froth can be shared with this middle pipe at the vortex finder. In this way, the gas core can be stabilised and controlled independently whilst withdrawing three separate "cuts" or phases through the three outlets at the opposite end to the feed.

Note, in the context of this document, the term "oil" or "oil phase" should be understood to include any separable non-miscible liquid phase which has a lower specific gravity relative to another liquid or slurry phase.

Also shown within FIG. 7A is an internal jointing/abrasion protection layer 232 which surrounds the side outlet connection. Within FIG. 7C, two such layers are shown, 232 and 236, one at each side outlet connection. These are abrasion resistant layers which can be cast or moulded into place using, for example the silicon carbide and resin/polyurethane mix that is referred to in PCT/ZA2003/000160 or some other suitable product. Such other products will be well known to someone who is experienced in the art.

FIG. 8A shows a "through the spinner" connection pipe 239, elbow 240 and connection 241 to a suitable manifolding arrangement or other connection (not shown). As discussed above, this can be used for controlling a gas core so as to ensure optimum quality in the liquid stream that is removed at the outlet 230.

Note, by providing an external flow control to the volume of fluid removed from exit 231, more fluid can be selected to be removed from the outlet 230. Providing sufficient liquid is removed via 231 to ensure that any solids in this stream are not able to settle and cause a blockage somewhere else in the system, or providing that a suitable hopper arrangement is arranged beneath 231 and that the unit as a whole is arranged to be vertical or sufficiently steeply inclined for the solids to fall into that hopper, then with appropriate sizing of the vortex finder, the combined exit flow via 230 and 241 can represent effectively all of the inlet volumetric flow. This is despite the fact that, in general, the annular gap 223 in FIGS. 8A to C will, in general, have been sized to suit the largest potential debris, and not the volumetric flow that it is required to handle.

Essentially, what happens in this style of apparently oversize vortex finding arrangement is that the liquid phase adjacent to the wall (which will be carrying the bulk of the particulates), will have an axial velocity component similar to but generally slightly less than that of the bulk flow down the cyclone body. As this enters the annulus, if the total volume cannot exit via 231 it will displace the slightly slower tangential velocity fluid which is adjacent to the outer surface of the vortex finder pipe. This displaced fluid will join the fluid exiting down the inside of the vortex finder pipe.

The particulates laden fluid will therefore continue down the outer zone of the annulus and progressively more of the clean fluid content of this flow will move towards the reverse flow along the outer surface of the vortex finder pipe. This is a similar process to that which occurs within a normal cyclone, particularly within the tapered zone, except that the solids are able to stay at the same peripheral radius. The lighter liquid phase is able to move radially inwards and then move back along the outside surface of the vortex finder pipe to the entry into the vortex finder.

By ensuring the appropriate annular gap relative to viscous drag, the required volumetric split between the "underflow" of particulates and the "product" flow through the inside of the vortex finder, then the separated particulates can be routed successfully to the collection arrangements with minimal re-entrainment from the annulus area. The sizing and positioning of the part ring pieces 224 are a critical part of this detailing.

In the above description, the term particulates should be understood to include a heavier fraction which combines to form a continuous medium at the wall. Similarly, the term clean fluid will include a lighter phase dispersed within this heavier fraction.

It should be noted that in the context of a slurry type of application, the above description refers to a de-gritting or de-sliming type of duty. It does not refer to a typical de-watering function as is sometimes a requirement in some mineral processing and other similar applications.

Figure 12:
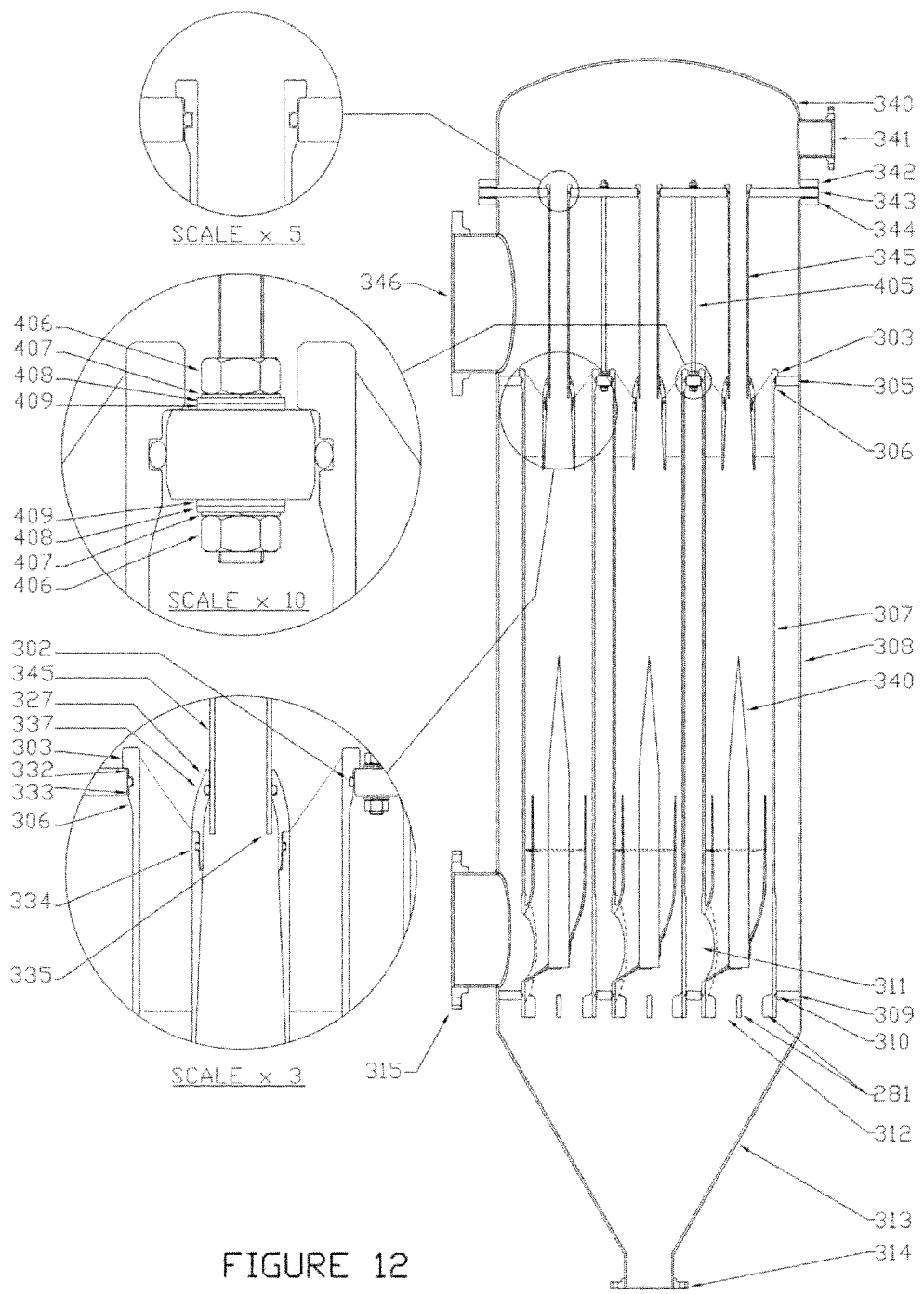
FIG. 12 shows an alternative way by which connections through the spinner can be made for a unit which utilises a froth or core support pillar.

In FIG. 8C, a typical froth or vortex support pillar is shown. This could be flat topped as shown, cone topped as shown in FIG. 12 or even with a concave socket (not shown) as best suits the circumstances. The selection of which is the most appropriate to the specific froth, oil or whatever duty is well known to those who are experienced with the technology and need not be discussed further in this specification. This support pillar would normally be used in conjunction with a through the spinner pipe connection such as that shown in FIG. 8A. This froth or vortex support pillar can be arranged to prevent a central core of gas, froth, oil or a combination of these from being drawn down into the inside of the vortex finder. The core that is thereby retained would then have to be removed via the through the spinner connection in a manner similar to that for a more conventional hydrocyclone. In this arrangement, the unit can be used as a de-gritting and de-frothing or de-oiling unit for a recirculation of cleaning fluid or for some other similar and relatively mildly contaminated fluids such as in a cooling or quench circuit, a washing circuit, a water-oil-gas system or even a dense medium separation system.

If the inlet details of FIG. 8A were combined with the vortex tinder details shown in FIG. 8B, then a four component system could be handled, e.g. solids, water, oil and gas.

FIG. 9, shows how a simple two component separation arrangement can be inserted into a carrier vessel so as to handle large throughputs and/or high system pressures. Obviously, when handling high system pressures, the normal hydrostatic techniques for varying the split ratios between the components would have to be changed to appropriate flow and/or pressure controlled arrangements based on the pipework connections associated with the outlets 314 and 315.

Within FIG. 9, 'O' ring sealing arrangements 302 and 310 have been shown as the means of providing a seal to the respective punch plates 305 and 309. Alternative sealing arrangements would be equally appropriate.

Similarly, the units are conveniently supported on a shoulder 303 at the top of the spinner section. Again there are many alternative options for inserting and supporting the units into the respective punch plate positions.

Not shown within FIG. 9, but which is necessary for this and for all other punch plate type arrangements, is some form of positive anti rotation location for each unit. This is necessary so as to prevent the torque from the spinner from causing a progressive rotational creep which could steadily wear the seals and ultimately allow the units to spin relatively freely within their punch plate locations.

Figure 10:
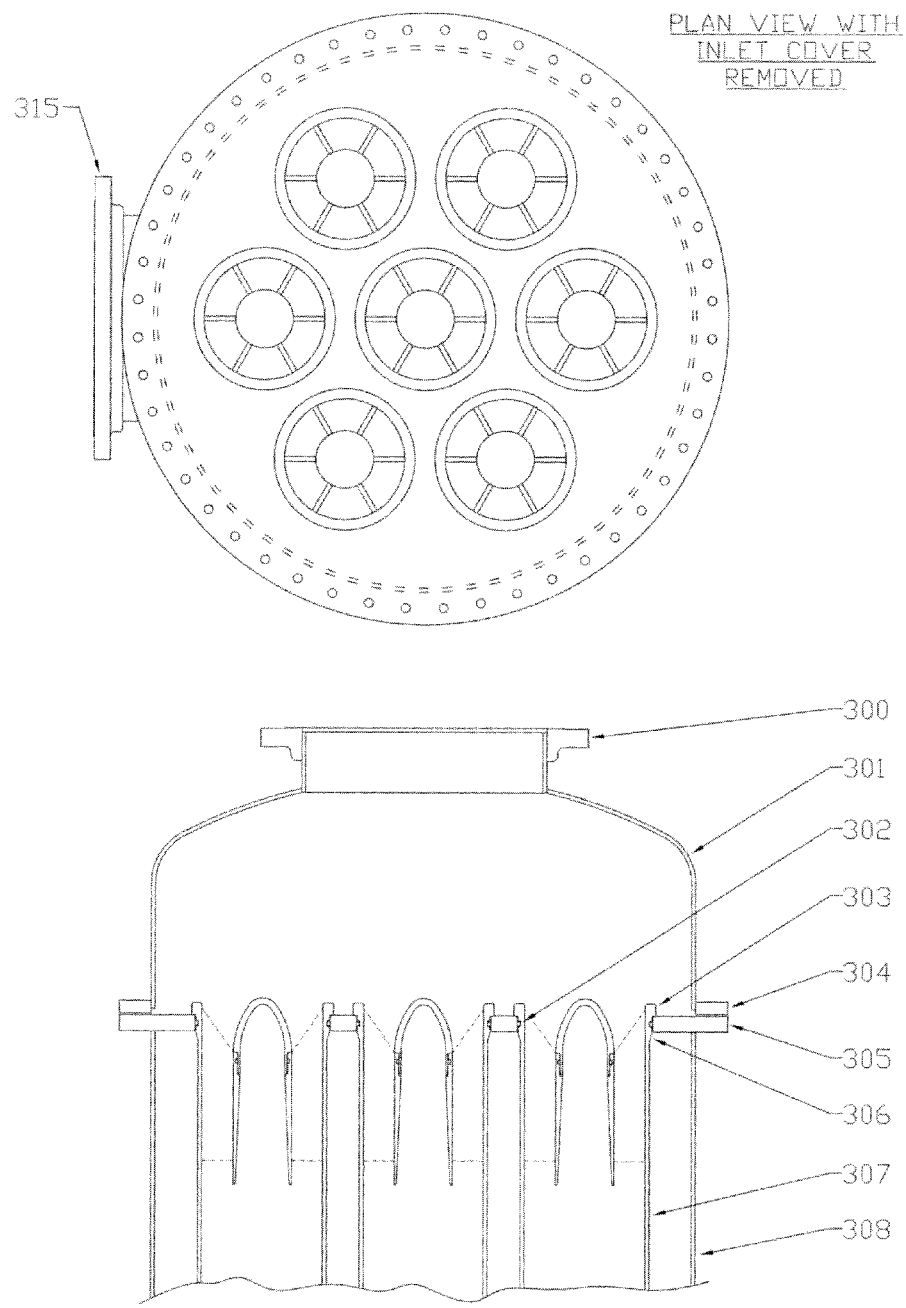
FIG. 10 provides a larger scale detail and plan view for the type of arrangement shown in FIG. 9.

FIG. 10 shows an enlarged detail of the type of mounting which could be utilised for supporting the units within the top punch plate. It also shows a plan view of a typical six unit arrangement. For reasons of ease of fabrication and for punch plate rigidity, the punch plate 305 has been extended radially outwardly to also form the mating flange for flange 304 on the inlet cover. This is not a necessary detail but it does conveniently simplify the construction.

The units which are shown are each shown with six spinner blades. This is a typically convenient number. But for small diameter units or where high tangential velocities are required, it may be appropriate to use fewer blades per unit. Larger numbers of blades can lead to better energy efficiency and to better phase separation within the unit. A practical optimum based on unit size, debris size, duty requirements and practicality is therefore appropriate.

Figure 11:
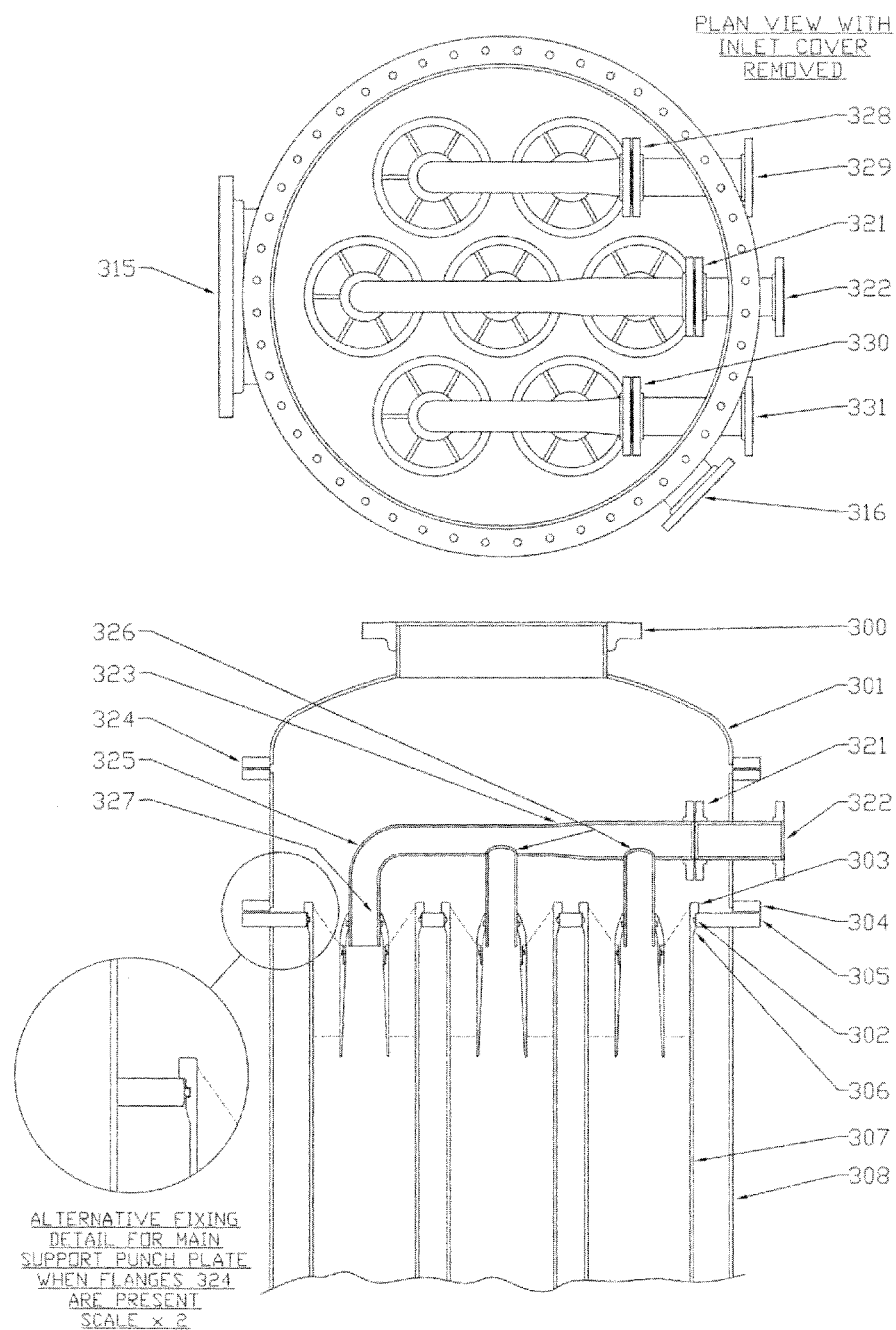
FIG. 11 shows how connections through the spinner can be inserted and manifolded into the type of carrier vessel arrangement shown in FIG. 10.

FIG. 11 shows how the details presented in FIG. 10 can be adapted so as to enable a through the spinner connection to be inserted and manifolded via bends 325, expansion pieces 323, T pieces 326 and flanges 321 to that assembly and removal of units can be achieved during maintenance, etc. In the bottom let corner of FIG. 11 an alternative fixing arrangement is shown for the punch plate. This alternative arrangement avoids the additional bolted and flanged joint in the body of the main carrier vessel.

As an example of some of the alternative arrangement options that are available using this type of cyclone unit, the froth/core support pillars 340 in FIG. 12 are shown as conical. Also, a different punch plate support system is shown together with a side entry for the incoming fluid which is to be processed. This latter enables the top vessel cover and all of the internals to be removed for maintenance, etc. without disturbing any of the external pipework or other connections, other that for the connection 341. Of particular note are the tie bolt arrangement details between the two top punch plates using bolts 405. The inlet fluid will apply pressure between these two punch plates whereas the pressure on the outside of the two plates will be relatively similar, and equivalent to the product outlet pressures. The tie bolts conveniently balance the pressure induced forces between the plates and also cause the weight of the cyclone units to be shared between the two plates. As a result, the stress loadings on the punch plates are greatly reduced, especially when high tangential velocities are required with relatively dense fluids (e.g. for liquid and slurry applications).

Note, instrumentation and sample etc connections have not been shown on any of the drawings so as to simplify them. These items are well known to those experienced in the technology and do not form a part of this specification.

The enlarged details in FIG. 12 show an optional arrangement whereby the ends of the tie bolts can be sealed into their respective punch plate and also show an arrangement for the sealing of the "through the spinner" connection pipes 345 into the top punch plate 343 and into the spinner itself.

The tie bolt arrangements utilise nuts 406, spring washers 407, flat washers 408 and elastomeric or other suitable sealing washers 409 to create a seal between the tie bolts and the punch plates.

The connecting pipes 345 are shown as being 'O' ring sealed to the punch plate and at the spinner end it as being 'O' ring sealed to the cap 334 with an 'O' ring 327. The particular 'O' ring detail at the punch plate has been arranged such that the inside diameter of the 'O' ring groove is the same as or less than both the OD of the connecting pipe and the I/D of the 'O' ring or other sealing arrangement that is used at the spinner end. In this way the forces created by the hydraulic pressure on the pipe 345 are either balanced or downwards. As a result, these pipes only need to be inserted and do not require specific retaining devices.

The same force balancing concepts have been used for the cyclone units themselves in all of the arrangements shown in FIG. 9 and subsequently. However, the enlarged detail in FIG. 12 is the first enlargement which enables this to be seen with clarity. Other optional arrangements or clamped arrangements could also be used.

Whilst the normal pressure related forces on the units will be downwards, there are potential process upset or "what it" situations which could occur whereby the pressure around the outside of the body sections 307 of the cyclone units could exceed the pressure associated with the inlet 346.

The seals and support arrangements for the units rely on vertical support via shoulder 303. The holes in the punch plate need to be fitted with lead in tapers for the 'O' rings 302 on both the upper and lower entries to the holes (332 and 333 respectively). The taper 306 provides a simple lead in taper for centering the units as they are lowered into place. Other than at the 'O' ring positions, the outside diameter of the units should preferably be less than that at the 'O' rings themselves, so as to simplify assembly and maintenance and to minimise the potential for damage to the 'O' ring sealing surfaces.

At the lower end of the units the sealing arrangements into punch plate 309 using 'O' rings 310 would follow a similar concept.

FIG. 12 also shows the lower "heavy fraction" collection zone being fitted with a conical base 313 leading to outlet 314. This is convenient for those situations where heavy solids and grits could be present but alternative designs using dished, flat or other styles of end closure could also be utilised.

FIG. 13A shows how units with a central outlet 317 within the vortex finder pipe can be connected to a separate outlet 316 utilising a second lower punch plate 319 and 'O' rings 320. This punch plate and 'O' ring arrangement would preferably be similar to punch plate 309 and 'O' rings 310, but alternative arrangement details could also be used.

Figure 13B:
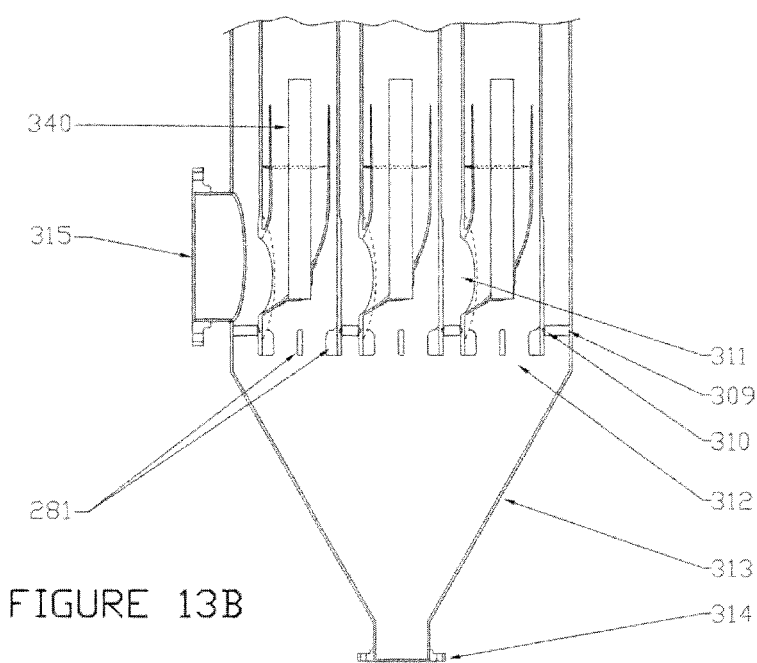

FIG. 13B shows flat topped core or froth support pillars 340 as opposed to the alternative conical design which was shown in FIG. 12.

Figure 14:
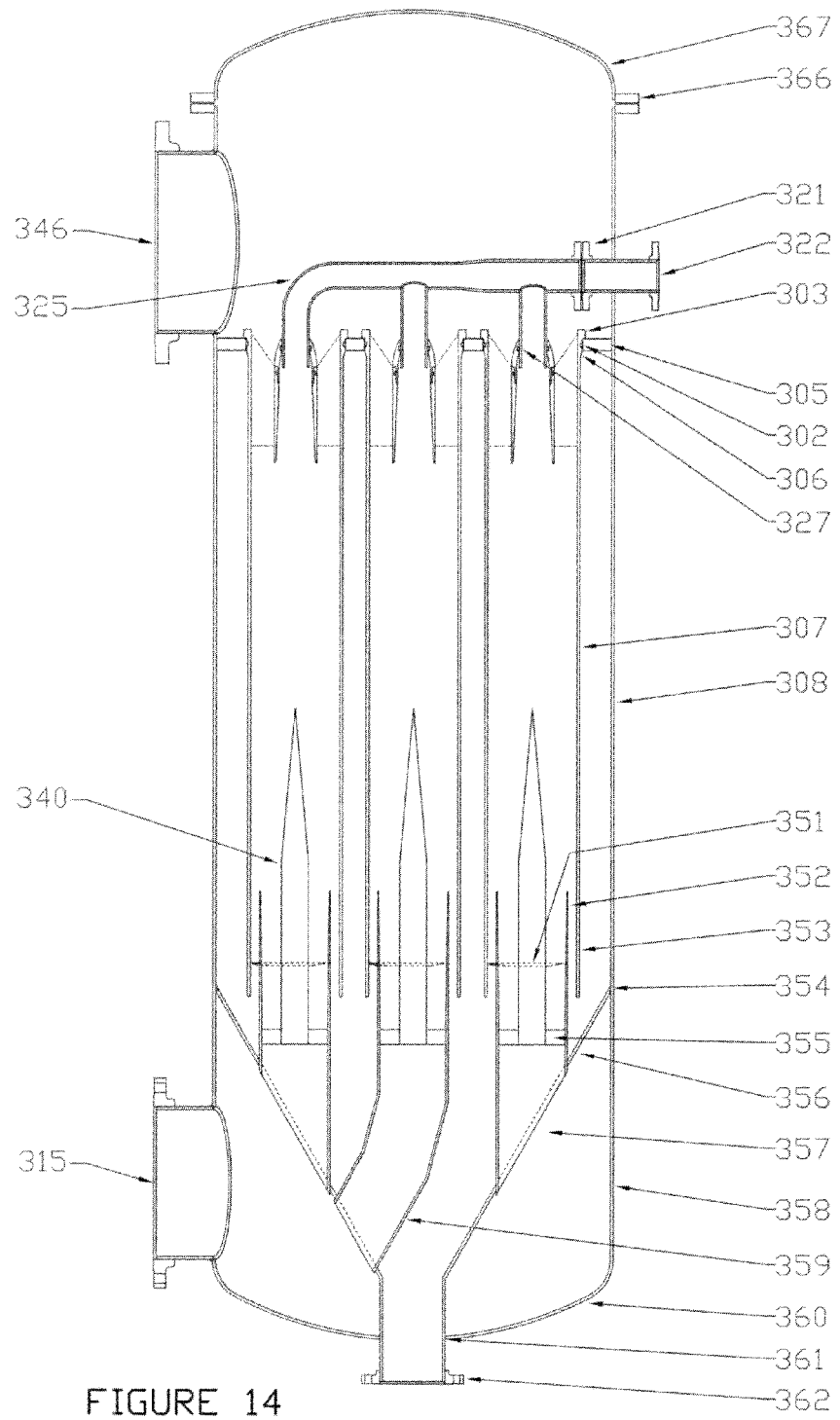
FIG. 14 presents a different style of carrier vessel arrangement within which the vortex finder and (in this case) the core support pillar are not part of the cyclone unit but are built into the carrier vessel itself. This simplifies the design detail for the cyclones such that only the high abrasion components are included within the cyclone units.

FIG. 14 shows an alternative way of mounting the vortex finder and any other components which accompany the vortex finder (in this instance, a conical froth support pillar 340). Here, the vortex finder pipe 352 is mounted through the "heavy fraction" floor (in this case a conical floor) 356. This creates a "light fraction" outlet 357 into a collection chamber with walls 358, floor 360 and outlet 315. In this instance the floor 360 is a dished floor for ease of pressure retention but other shapes could be equally suitable depending upon the specific design and duty requirements.

The "heavy fraction" which collects in the conical base 356 should preferably be discharged via a central connection 361 to outlet 362 but other arrangements could be suitable depending upon the specific design and duty requirements.

When the array of units include a unit which is positioned on or near to the centre line of the carrier vessel 308 it is convenient to use a long radius or fabricated bend 359 to support the vortex finder for this unit.

This arrangement simplifies the construction of the units themselves and does away with the lower punch plate (309 in FIG. 13). Providing the vortex finder pipes are reasonably accurately positioned, the part annular rings 351 within the cyclone tubes 307 can be used to centralize the lower end of the cyclone tubes with respect to the vortex finder. The vortex or froth core support pillars 340 would be supported from their respective vortex finder pipes using radial vanes 355. Providing these vanes are positioned well back from the inlet end of the vortex finder pipe, the vanes do not need to be angled or otherwise arranged in order to minimise any disturbance to the vortexing flow regime as it enters the vortex finder pipe.

The arrangement details that are shown in FIG. 14 for the feed end of the carrier vessel are similar to those already presented in FIG. 11 except that the feed connection flange 346 is now shown as a side entry rather than an axial entry through the end of the vessel. This enables the end cover 367 to be disconnected at flange 366 for inspection and maintenance without affecting the external pipe connections.

A particular advantage of the arrangements that are shown in FIG. 14 are the greater simplification of the construction of the units themselves as the principal wear components can be removed and replaced with relative ease and the items which are not subject to high wear can be assembled as a single fabrication. In addition it will not be necessary to achieve accurate alignment between punch plates at each end of the carrier vessel. Indeed, the punch plate 305 can be used to align the vortex finder pipes during their installation, by using actual or dummy cyclone tubes to achieve their proper alignment.

Although not shown in FIG. 14, baffles similar to baffles 281 in FIGS. 8A, 8B and 8C can be included as necessary within the cyclone tubes so as to minimise abrasion within the carrier vessel. Similar baffles could also be fitted within the vortex finder pipes towards or at their discharge ends so as to minimise abrasion from this source. Alternatively, the support vanes 355 can be adapted as appropriate to achieve the same objective.

All of the above details have assumed that the units will be used to separate a feed mixture into two, three, four or (using concentric vortex finders, not shown here) more fractions. A further development of the concepts is to exploit the concept of a permeable wall within part or all of the cyclone tube. At FIGS. 15A, 15B, 15C, 16A, 16B, 16C and 16D, a number of optional arrangements are presented assuming a permeable wall is included within the cyclone tube. It is assumed that the permeable wall will be used for the injection of a floatation gas and/or for the injection of a washing fluid for the "heavy fraction".

Figure 15A:
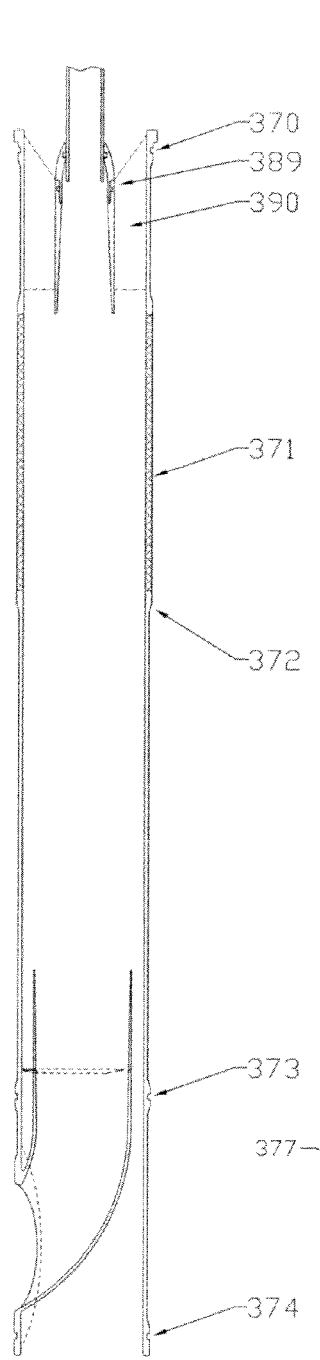
FIG. 15 shows how the concept of a simple permeable wall can be added to the cyclone tube.

FIG. 15A shows the various 'O' ring mounting grooves 370, 373 and 374 that would be needed for a simple two phase separation. The through the spinner connection could be used for either a third float phase being removed through the spinner or for a gas core and hence a vortex stabilising and control connection to be made through the spinner. This arrangement assumes a carrier vessel of a type similar to FIG. 12.

Figure 15B:
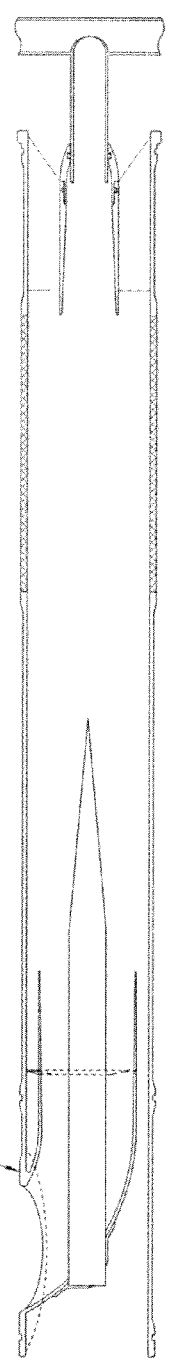

FIG. 15B shows a similar style of unit with a froth or support pillar in position.

Figure 15C:
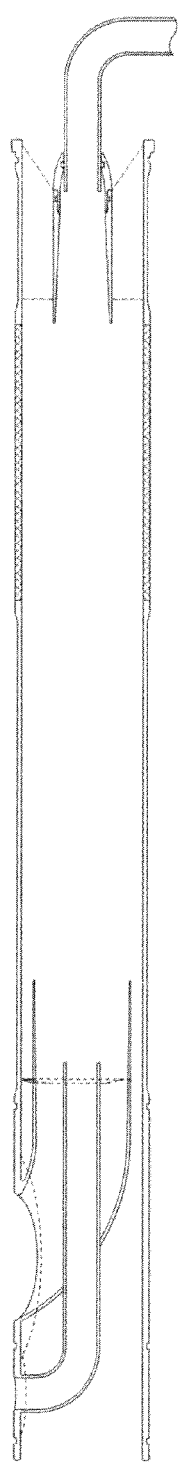

FIG. 15C shows a second outlet within the vortex finder pipe such that three fractions can be separated and removed from the one end (opposite the feed end) and the gas core and the vortex can be controlled through the spinner.

Between FIGS. 15A, 15B and 15C, the different likely connection options for manifolding the through the spinner pipe are also shown.

In FIGS. 15A, 15B and 15C the cross hatched portion of the cyclone tube 371 is meant to indicate a simple permeable wall. Pressurised gas outside this wall (within this part of the carrier vessel or within an equivalent containment around this part of the wall) would permeate the wall and because of the high swirl velocity of the fluid inside the tube, the gas would be broken into small bubbles. Assuming the fluid stream which enters the unit via the spinner has suitably "fluid-phobic" (e.g. hydrophobic for an aqueous system) particles or has been pre-treated to create such particles then as the gas bubbles migrate radially towards the core, as a result of the enhanced gravimetric forces within the cyclone tube, they will attach themselves to the fluid-phobic particles and seek to convey them towards the core of the cyclone tube. The resultant froth core can then be routed out via the vortex finder or one of the other central connections.

This use of a permeable wall is well known, and many different styles of application have been reported. However, its incorporation into some of the types of cyclone unit that are described herein is new.

Depending upon the type of permeable wall that is used, some form of transition between the permeable wall and the rest of the wall of the cyclone tube will be needed. Diagrammatically this is shown at 372.

In FIGS. 16A, 16B and 16C an additional through the spinner pipe connection has been shown which has a number of distribution holes 380 along its length. This can be used for the also well established function of providing a wash fluid for the Floated fraction. Alternatively, in the case of FIGS. 16A and 16C, it can be used to provide a stabilising gas supply to the vortex so as to assist the smooth removal of the float without the froth being broken up by the high shear zone which typically surrounds the centre line of the cyclone unit.

The style of unit shown in FIG. 16A would be suitable for insertion into a carrier vessel of the type shown in FIGS. 9 through 13 whereas the style of unit shown in FIGS. 16B and 16C would be appropriate for a carrier vessel of the type shown in FIG. 14.

The functionality options for the unit shown in FIG. 16B would be similar to those for FIG. 15A except for the addition of the wash function and/or the vortex stabilising ability. Similarly, the function of the type of unit shown in FIG. 15B can be replicated by those shown in FIGS. 16A and 16C with the addition of the wash etc. function. Clearly the functions of the unit shown in FIG. 15C can be replicated and added to in a similar manner.

In general, the centre pipe 388 will need to be centralized and stabilised within the main cyclone tube. The connection through the top cap in the spinner (FIG. 16B) or through the spinner connection at 378 or 379 as appropriate should be adequate at the feed end of this pipe. At the opposite end, it can be slotted into an appropriately shaped socket as shown in FIGS. 16A and 16C or when there is no froth or core support pillar it can have its own radial supports 386 at its closed end 385 (FIG. 16B). The ends of the radial supports are shown with lead in tapers to assist assembly and maintenance.

FIGS. 16A and 16C show the pipe having a tapered end 381 which fits into a parallel socket 382.

Figure 17:
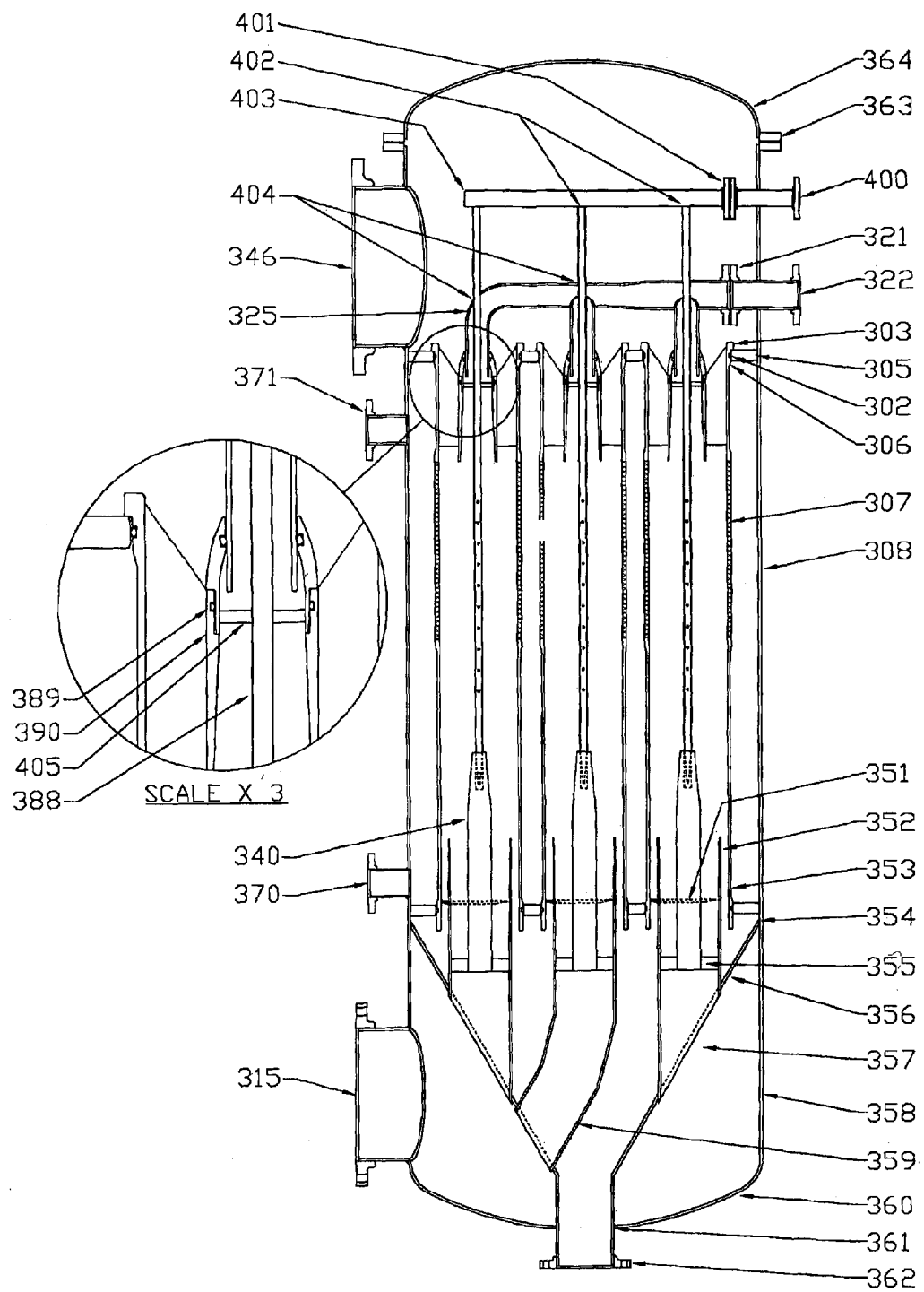
FIG. 17 presents a carrier vessel arrangement based on the type of unit presented in FIG. 16C (i.e. one which uses a core support pillar).

FIG. 17 shows an example of how the unit shown in FIG. 16C can be incorporated into a carrier vessel. The two sets of manifolded feed pipes for feeding through the spinner would, in this arrangement, need to be joined together and inserted as a whole into the units.

Wash water and/or vortex stabilising gas would be fed through flange 400 through the internal connecting flange 401, through the 'T' connections 402 and then via the sealed joints 404 down the middle of the other through the spinner connections.

The froth off-take in this arrangement would be out through the spinner and via pipe 325 and connecting flanges 321 to the external connection 322.

Depending upon the overhung length of the centre feed pipe 388 within the connection pipe 325, it may be necessary to install centralizing or radial vibration stabilising supports 405 between the two pipes at or near to the connection of the outer pipe to the spinner core 390. A possible arrangement is shown in the enlarged detail in FIG. 17 together with the sealing 'O' ring 389 between the spinner core and the outside of the pipe 325. These radial supports need to be arranged so that they do not cause any significant interference to the flow profiles as they approach and enter the skirt of the spinner core.

A further feature of FIG. 17 is the two side connections 370 and 371. For simple gas floatation only one such connection should be needed, preferably at the bottom so as to allow for vessel drainage. However if two connections are made, then both a floatation gas and a wash fluid for the heavy fraction can be supplied to the chamber surrounding the permeable wall. A simple fluid level gauge either between the two pipe connections 370 and 371 or within this part of the carrier vessel itself can be used to control the proportion of the permeable wall which is used for washing the heavy fraction and the proportion which is used for floatation.

Figure 18:
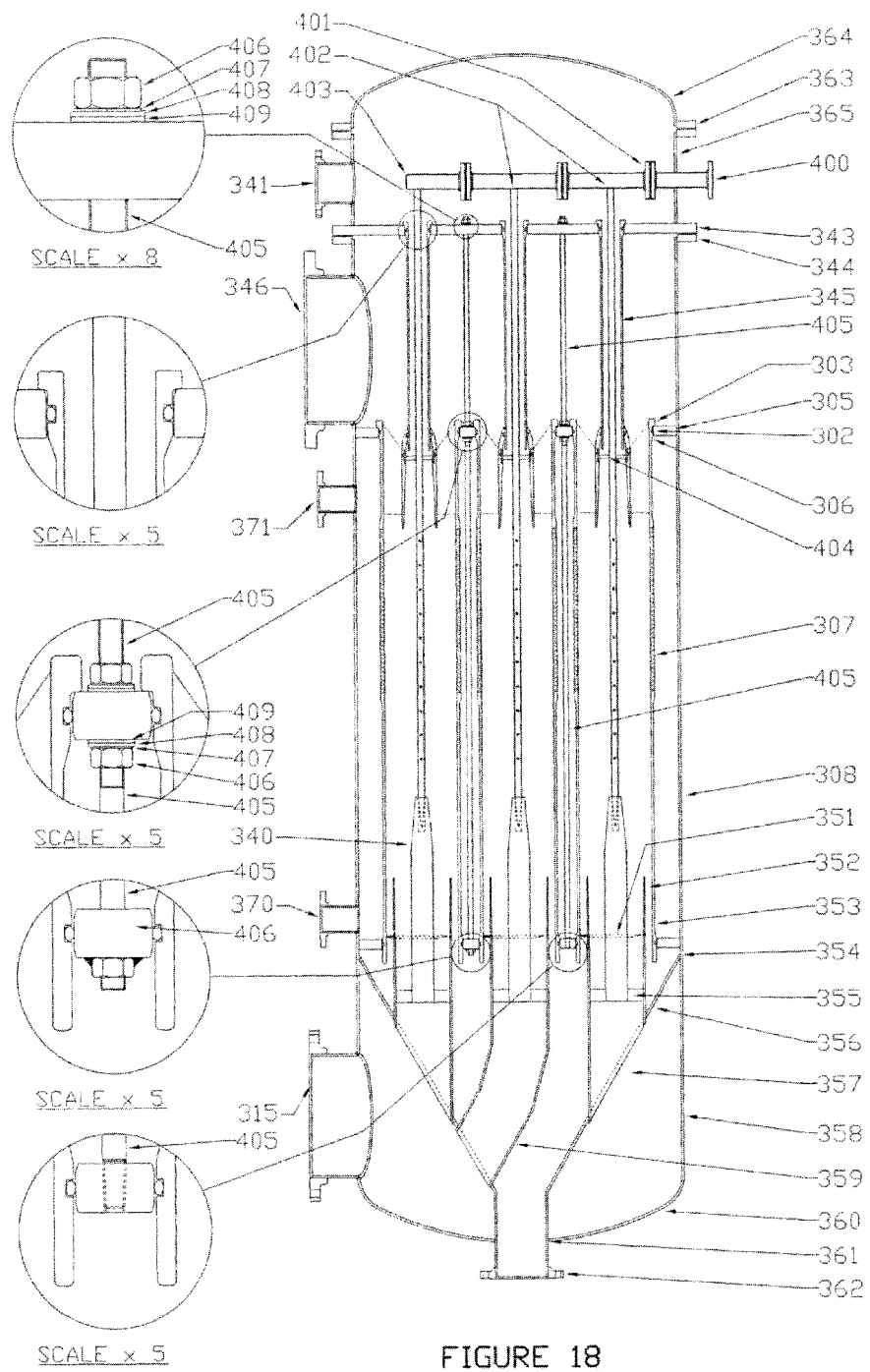
FIG. 18 develops the FIG. 17 details to suit a carrier vessel style similar to that presented in FIG. 12.

In FIG. 18, the same essential features are shown as in FIG. 17 except that the fluid feed arrangements into the carrier vessel have adopted a similar style to those which were introduced at FIG. 12. The same benefits can be obtained from the tie rods 405 as were described in relation to FIG. 12. In this respect, the pressure on the lower punch plate is also able to be supported by the tie rods. Two optional connection details for the tie rods to the bottom punch plate are presented in the enlarged details. Either welded on nuts 406 on the underside of the punch plate can be used, or the punch plate can be drilled and tapped, preferably with a tapered thread. Alternative options are also possible.

In this (FIG. 18) optional arrangement, the centralizing pieces 404 for the centre wash fluid/gas control pipe will be essential.

Figure 19:
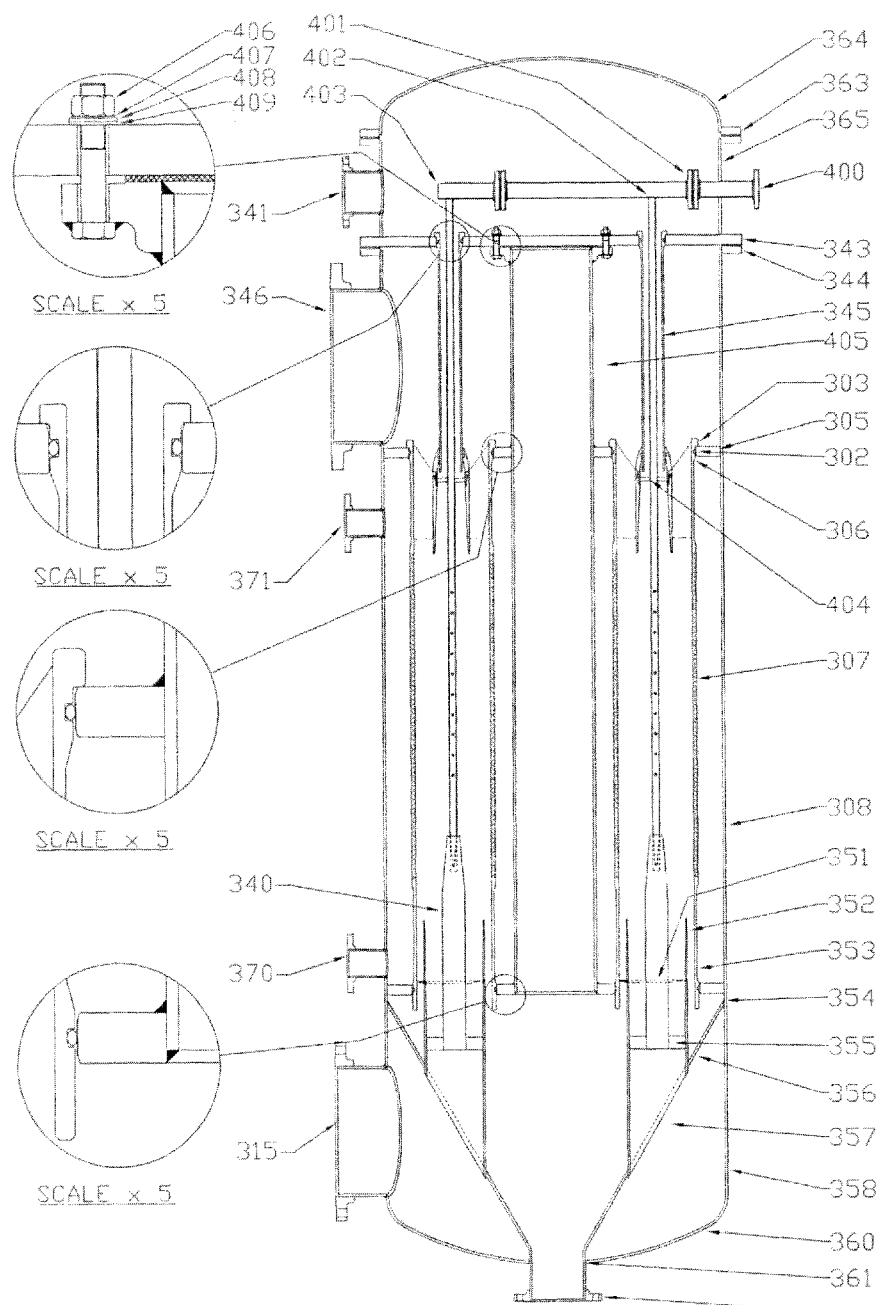
FIG. 19 shows a somewhat simplified but slightly reduced volumetric processing capacity arrangement, but which follows the style presented in FIG. 18.

Whilst greatly reducing the bending stresses etc. in the punch plates, the tie rods 405 do greatly increase the complexity of manufacture and maintenance. In FIG. 19, a more pragmatic arrangement is shown whereby the centre cyclone unit is deleted and replaced with a welded in pipe of similar or smaller diameter to that of a cyclone unit. As a result, a notionally 7 unit carrier vessel would become a 6 unit vessel, but the construction and maintenance are greatly simplified.

Also, this support pipe creates a direct access to the "heavy fraction" collection zone which can be used if necessary for clearing blockages, etc.

The units which are shown in FIG. 19 have been shown with their permeable walls extended so as to indicate the optional arrangement whereby the lower portion of the permeable wall can be utilised for the insertion of a washing fluid or a secondary reaction fluid for improving the quality or for further processing the contents of the heavier fraction. For this option, the permeable wall can simply be extended as shown, or a second section of permeable wall can be added with the same or a different permeability, as best suits the particular requirement. Additional permeable sections could also be added if desired. When two or more permeable sections are present, one or more of the sections could be separated by a non permeable section or individual permeable sections could be jointed directly to its neighbour. As can be seen, a range of optional arrangements are possible in order to maximise the processing benefits that can be achieved within the one piece of processing equipment.

Figure 20:
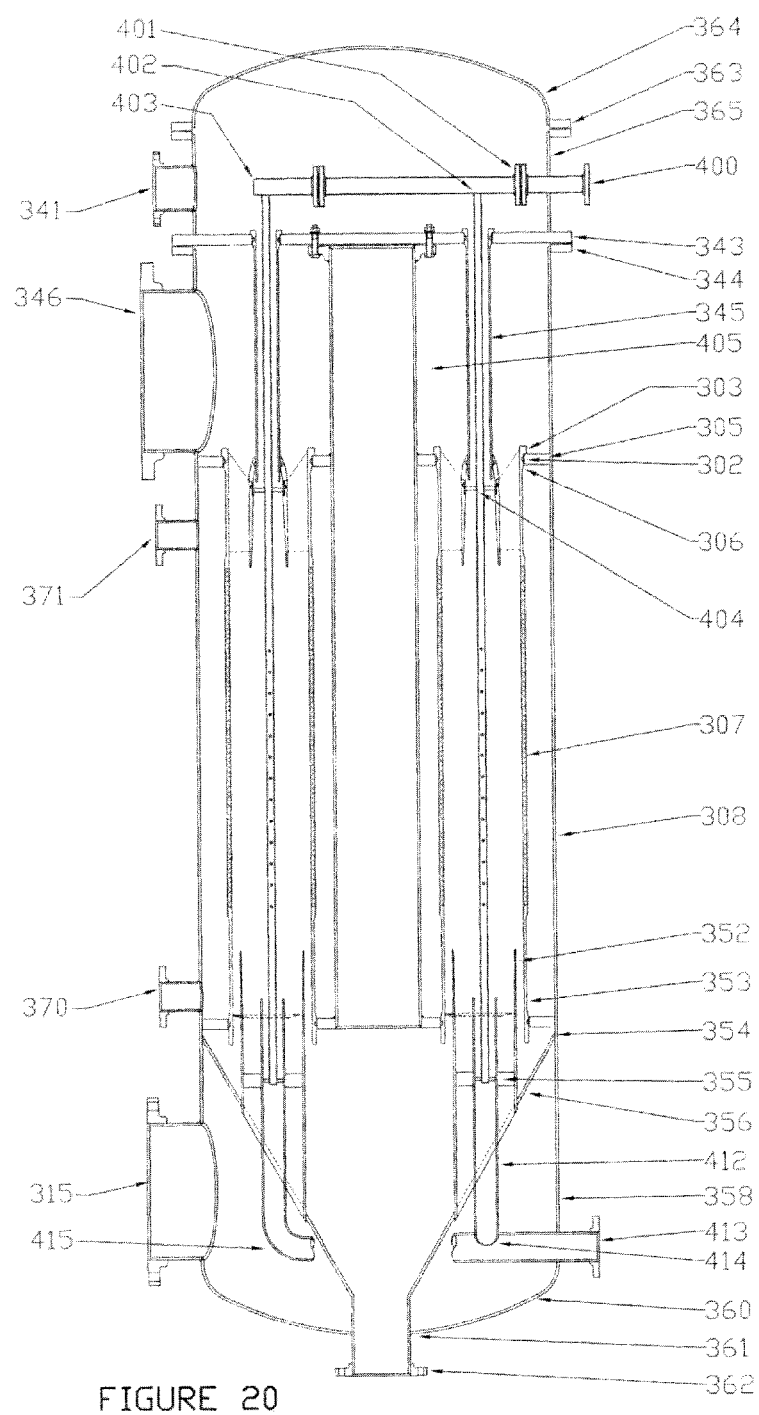
FIG. 20 takes the concepts presented in FIG. 19 and exchanges the core support pillar in each unit for an additional concentric connection through the lower vortex finder, making each unit into a unit with three connections at the inlet end and three connections at the other end.

FIG. 20 adopts the same style of arrangement as shown in FIG. 19 but exchanges each froth/vortex support pillar for an additional output connection. This arrangement enables all of the product streams to be withdrawn from the opposite end to the feed end. It also enables the two concentric feeds through the spinner to provide their separate functions via separate pipes. The one function is the washing and the second is the control of the central gas core.

A major benefit that can be derived from this style of cyclone, relative to that shown in FIG. 19 and relative to the more normal style of cyclone with their reverse direction vortex up the core of the cyclone body is that as the rotating body of fluid moves away from the feed end, it will progressively tend to develop towards a single rotating mass with virtually the same angular rotational velocity at any given transverse section. In a normal cyclone, the combination of the reversing direction of the two primary vortices and the radial flow of fluid from the outer vortex to the inner vortex will cause extensive turbulence, shear and back mixing between the fluids which are migrating towards the feed end vortex tinder and those which are moving towards the "heavy fraction" outlet. In a dispersed air floatation or a froth floatation type of application, this shear and back mixing will be quite counter productive. In a unit as presented here, the flow regime will be much more ideal.

As a result of this more stable and more ideal flow regime for the floated product, it is possible to operate with much longer cyclone tubes. This is not so much for the purpose of achieving better separation of specific particle sizes, but more from the perspective of enabling all of the ideal functions to be carried out in the same (all be it extended) vessel. These functions include:
  a) The floatation of the fluid-phobic portion
  b) Washing that portion to clear unwanted solids from the surrounding froth.
  c) The draining of that portion to further improve its quality.
  d) Washing the heavy fraction so as to separate it more cleanly from the gangue or un-separated fluid-phobic portion.

The unit is therefore able to return three separate fractions:
  i) A cleaned heavy fraction
  ii) A cleaned float fraction
  iii) A mid fraction, all or most of which may be appropriate for return as it is to the source as a recycled conveying medium. Alternatively, solids, etc. can be removed from the conveying medium so that an upgraded conveying medium can be returned.

In a normal froth floatation situation, three separate process stages would be needed to achieve the cleaned fractions that are referred to at i) and ii) above. Normally there would need to be a froth floatation stage followed by a separate washing stage for each of the product streams.

If the assembly shown in FIG. 20 were connected and operated such that the central froth off-take that is connected to flange 413 were connected using pipework with a continuous fall to an open discharge which is above a free surface then the pressure at the top of each pipe 412 would be the same and in close similarity to the pressure above the free surface to which they drain. Clearly this free surface can be within a tank which is under an appropriate regime of pressure control.

In this situation, when gas is being fed in through the permeable walls of the cyclone tubes, the gas pressure within the gas core within each cyclone tube can be controlled by controlling the pressure above the external free surface. Thus the stability and diameter of the gas core can be controlled from the outside connection to flange 413 rather than by controlling the pressure at flange 341.

Figure 21:
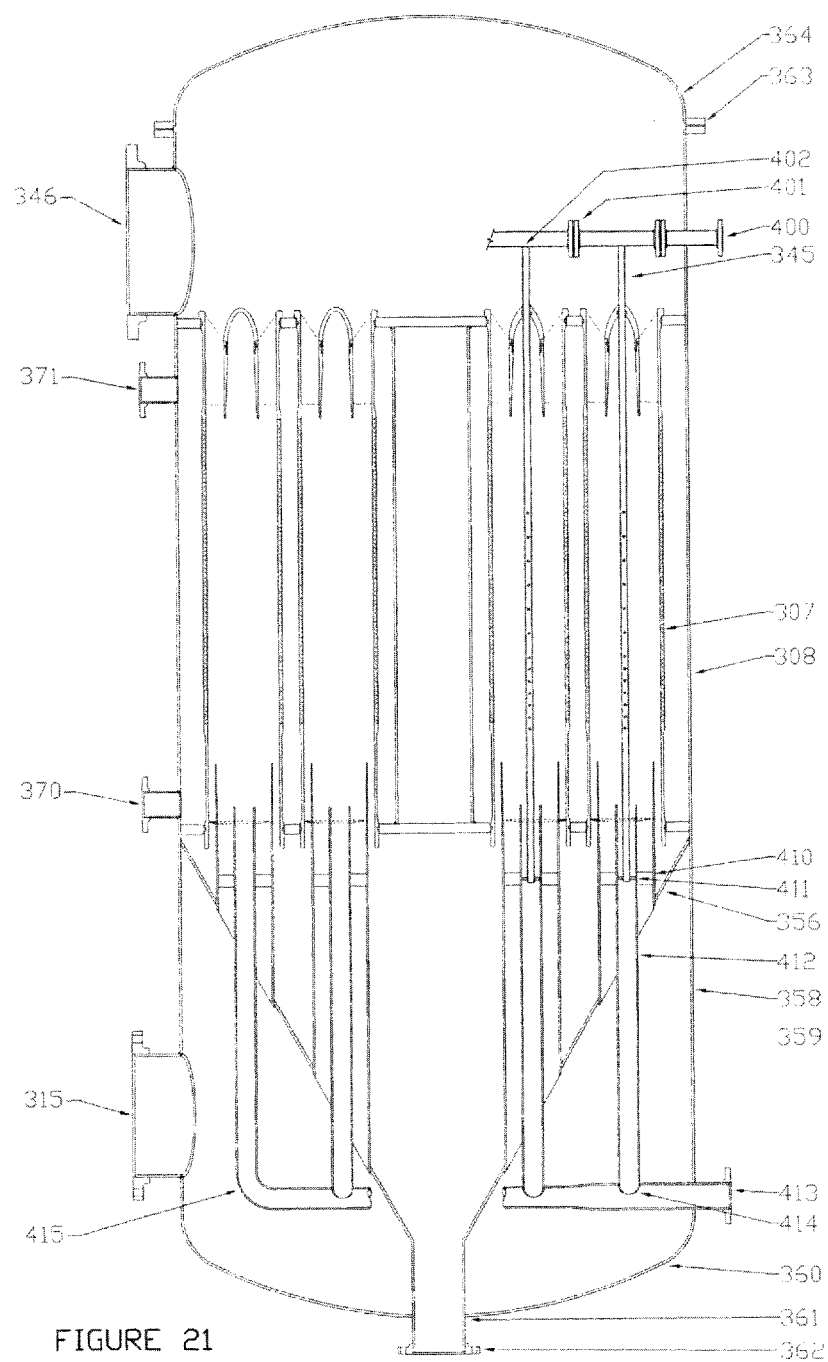
FIG. 21 simplifies the detail in FIG. 20 into units with either one or two inlet connections, plus three connections at the other end.

As a result, for gas floatation applications, the need for the top punch plate 343, for the separate and pressure controlled gas connection 341, for the pipes 345 and for their connections through the spinner can all be avoided. Following this logic, FIG. 21 shows a diagrammatic cross sectional view of a carrier vessel capable of carrying 18 units. The units on the left hand side have been shown as being arranged on the basis that the float product does not need to be washed. This arrangement could be suitable for the separation of an oil fraction from water that has been used for washing oil out of contaminated soil or from an oil sand. The units on the right hand side have been shown as being arranged so that the float product can be washed.

With this larger diameter carrier vessel it can be seen that the centre support tube between the punch plates will be able to reduce considerably the stress loadings on each plate. Clearly, for this size of carrier vessel or for larger carrier vessels, more than one support tube could be used.

The use of permeable walls for the cyclone tube brings with it a number of practical issues. Typically these include the brittle and sometimes fragile nature of suitably abrasion resistant permeable materials, the difficulty of suitably attaching the permeable tube to the remainder of the unit, the ease with which the permeable pores can be blocked and the limited quantity of wash fluid that could be transmitted through the washing zone part of the unit.

Figure 22B:
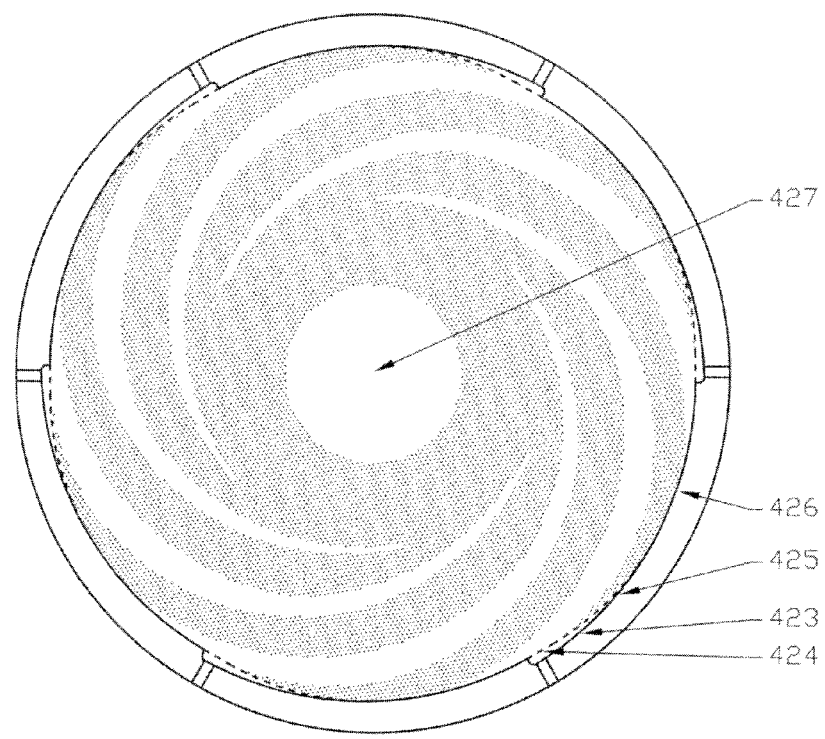
FIG. 22B presents a diagrammatic conceptual picture of how gas bubbles would move into the overall body of rotating medium within a cyclone tube from the stepped profile as presented in FIG. 22A.
Figure 22A:
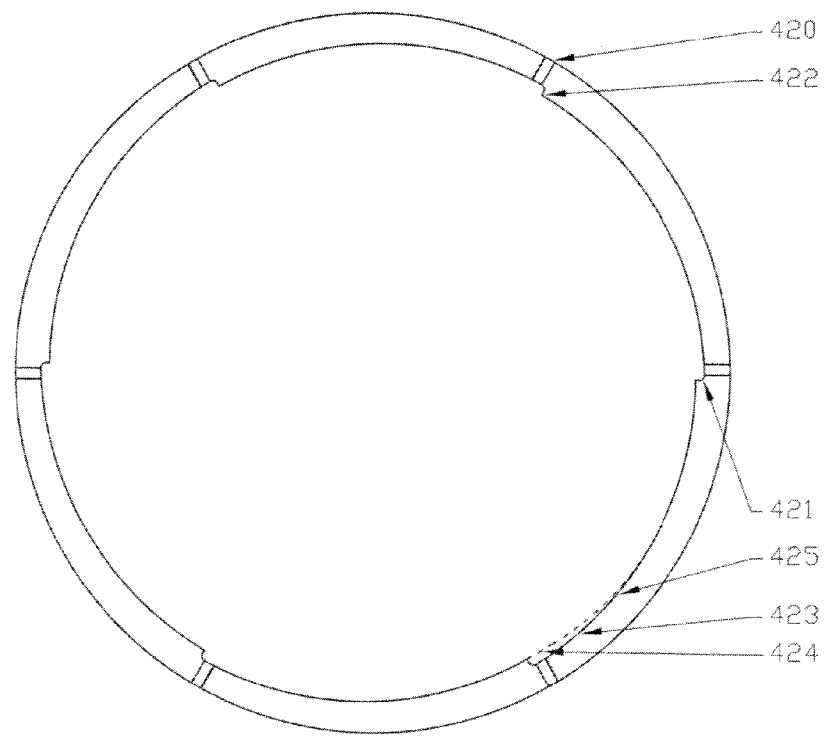
FIG. 22A presents the concept of the axially orientated stepped edges. In this case the steps have radially orientated through the wall inlets. This embodiment uses 6 stepped edges.

At FIG. 22A, a cross section perpendicular to the axis of an alternative concept for a permeable wall is presented. An indicative representation of how the gas bubbles would spread into the full flow of liquid mixture within such a cyclone tube is presented in FIG. 22B. The centre clear zone 427 is representative of the central gas core that in general would also be present.

The concept of the arrangement in FIG. 22A is that the tips of each step 422 should lie on or near to the same circle, the centre of which is the same as or close to that of the cyclone tube. Each step should have a sharp or reasonably sharp edge and the face of each step can be approximately radial. Preferably, but not necessarily, the face of each step should be angled so as to create a more acute angle between the face of the step and the upstream surface. Typically, this angle should be within the range of 100° to 45° with a preferred range of 80° to 60°. The rotation of the vortex for the design that is presented in FIG. 22A would be counter clockwise, however, an opposite direction design would be equally effective.

The angle between the line of each step and the direction of flow within the spiralling vortex at the point where the flow crosses that step should be within the range of 10° to 170° and preferably within the range of 50° to 130°. For convenience, but not necessarily, the steps can be orientated axially.

Preferably, but not necessarily, these steps would have a curved corner 421 between the face of each step and the ongoing wall of the cyclone tube. Just beyond this corner and in the shadow of the step, a row of holes or slots 420 spaced reasonably uniformly along the whole or most of the length of each step would allow gas and/or wash fluid to enter the cavity which would be formed between the surface of the liquid as it leaves the step and the wall of the unit 423 (i.e. following a profile similar to that of the dotted line 424).

If one considers the situation of gas being pressurised into this wedge shaped zone, then as the liquid leaves the launch edge 422, it will be supported on a cushion of gas in a similar manner to a shaft in a gas cushioned bearing. In general, the liquid which is being cushioned will have suspended heavy phase solids and/or heavy phase droplets within it. In general, these suspended solids and/or droplets will have a higher specific gravity than the liquid. As a result, they will tend to create bulges in the liquid surface which will be restrained by the surface tension of the liquid. As these bulges (or as similar surface undulations created by eddies within the liquid) become more distant from the launch edge 422, then some of the bulges will no longer be able to be retained by the surface tension. As a result, droplets and some of the solids will begin to break clear of the liquid surface. Some of these droplets will be liquid only and some will be in the form of solids surrounded by liquid.

In addition, any "liquid-phobic" particles or droplets within this boundary layer of liquid could also begin to leave the surface. As this process of surface break up progresses, a slowly decreasing proportion of the liquid and all of the particles and droplets within that liquid will be supported on the gas layer and a slowly increasing proportion of the liquid and some of its associated particles will break clear into the bulk of the gas layer. Once they are completely within the gas layer, these break away droplets and other particles will receive very little further support from the gas layer. However, friction between the gas layer and the liquid surface and between any break away droplets and/or particles will cause the adjacent gas layer to attain a velocity which will be approaching that of the liquid.

At about the point marked 425 on the profile, some of the liquid and its associated particles will arrive at the wall of the profile and a combination of liquid droplets being forced to spread out rapidly on to the surface, of particles trying to bounce off the surface or to roll along the surface and the local shear forces that will be associated with the re-establishment of the liquid boundary layer against the solid surface will cause a progressive break up of the gas layer from a continuous phase into a dispersed phase. This dispersed phase will be entrained into and further sheared within the adjacent mixture of liquid, droplets and particles. The net result of this process is that:— a) an array of fine gas bubbles will be created within the area of the general "landing" zone of the liquid and as a result of the centrifugal forces that will be present, these bubbles will move radially inwards at the same time as they are swept along with and then incorporated into the main spiralling vortex flow of the liquid mixture.

b) For that part of the process where the gas cushion is reasonably continuous, the gas will create a relatively frictionless boundary. As a result the viscous drag on the liquid mixture will be almost zero over each of the gas cushion zones. This almost zero drag within each of the gas cushion zones will allow viscous drag within the liquid mixture to cause the mixture at and close to the interface between the gas cushion and the liquid mixture to accelerate. This acceleration will increase the velocity of this interfacial layer from a value of zero or near zero as it leaves the step 422 to a value approaching that of the bulk of the liquid mixture by the time the liquid mixture arrives at the "landing" zone c) As the liquid lands at the "landing" zone, intense turbulence and shearing will occur within the boundary region of the liquid mixture. This will not only aid the creation of very small gas bubbles, it will also cause any oil film around any solid particles plus any other deposited or softened (e.g. leached) layers on the particle surfaces to be partly or entirely sheared off. In addition, it will ensure that the gas bubbles which are formed will be intimately sheared and mixed with all the particles and droplets that are present, including any oil or other materials which are sheared off. This will create very effective conditions both for floatation processes and for leaching processes.

d) It is clear from FIG. 22A that the gas cushion zones make up around one third to one half of the perimeter of this particular embodiment of the invention. With more launch steps and/or deeper steps, greater than 50% of the perimeter can be gas cushioned.

e) To a first approximation, a 50% gas cushion with reasonably smooth 'landing zones' would enable the cyclone tube to be twice as long for the same loss of tangential component relative to a non-cushioned hydrocyclone. This in turn would mean that such a cyclone would be able to separate particles with about half the settling velocity, relative to an otherwise similar diameter and smooth walled unit with a similar initial tangential velocity.

The drawing in FIG. 22A shows a cyclone tube which has 6 launch steps around its perimeter. In FIG. 23A, a design for 4 steps is presented. FIG. 23B has 8 steps and FIG. 23C has 12.

Essentially, any number of steps can be used. Preferably, the steps need to be spaced reasonably uniformly so as to ensure a reasonably uniform flow regime within the cyclone tube.

FIG. 23D shows one of the many possible methods by which this type of unit can be made using a casting technique with an abrasion resistant matrix. The tube could be cast in two halves and jointed and bonded at the two joint lines 432. With joint lines at these locations, any excess resin at the joints will not significantly affect the performance of the cyclone tube and the joints will be clear of any abrasion. Similarly, any excess resin would be clear of the holes or slots 431. When the GRP wrap or other encapsulating or strengthening layer 430 is applied, suitable temporary pegs or other arrangements could be applied to the holes or slots 431 so as to prevent them from becoming blocked.

Figure 24:
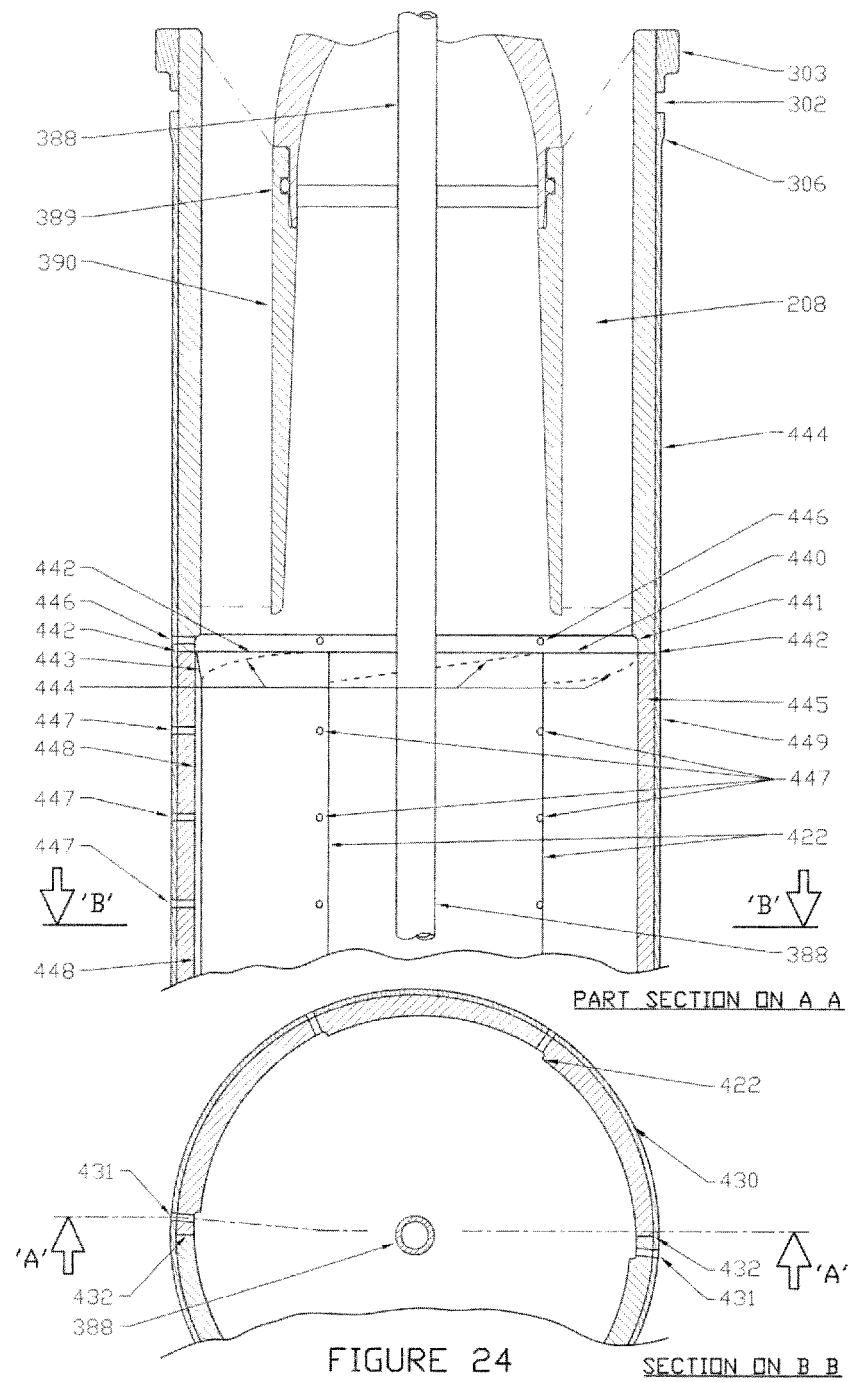
FIG. 24 shows a preferred method by which a 6 stepped arrangement would be interfaced with the associated spinner section.

FIG. 24 reproduces part of FIG. 23D so as to identify the section line which has been used to create the cross section that is shown in the rest of FIG. 24. In this cross section, it has been assumed that the steps 422 are orientated axially, that the spinner section has been cast separately from the rest of the cyclone tube and that it is jointed at line 442. In order to prevent excessive wear or undercutting at this joint line it is convenient to utilise a similar launch step 440, radius corner 441 and gas inlet holes 446 just upstream from the joint line 442. Alternatively, the joint line 442 can be located at or just below the step 440 and the gas holes 446 can be located within the main gas inlet section 445 or within the joint line itself.

For convenience, but not necessarily, this launch step 440 should be the same depth as the other steps 422. Below the joint line (below this launch step) the wall of the cyclone tube should preferably, but not necessarily, slope radially inwards at between about 2° and 15° from the axis of the cyclone tube (preferably at about 5° to 10°) until it interrupts the profile of the axial steps. The lines 444 in FIG. 25 show the approximate position of the junction between these two sets of profiles. The actual junction line should preferably be rounded.

The line 448 denotes the bottom of the sectioned step at the centre of the gas inlet holes 447. These holes should be sized and spaced such that when they are supplying the desired gas flow to suit the specific system requirements, they will create sufficient pressure drop over each hole so as to produce a reasonably equal flow through each hole whilst at the same time ensuring that the velocity is not high enough so as to begin to punch a significant depression into the surface of the liquid as it passes over the hole. Gas velocities through the holes should generally be within the range of 5 to 80 m/sec. with a preferred range of 10 to 50 m/sec. The actual preferred velocity will depend upon the tangential velocity of the liquid. High tangential velocities can accommodate gas velocities through the holes at the high end of this range whilst lower tangential velocities must use appropriately lower gas velocities (approximately proportionately lower).

In order to facilitate the adjustment of the gas flow to suit the particular duty, or a changing duty, the holes can be arranged with suitable screw in nozzles or otherwise suitably attached nozzles which can be exchanged for similar nozzles with differently sized flow controlling orifices or other flow controlling devices. Alternatively, adjustable flow controlling devices can be used at each hole or for groups of holes.

When interchangeable nozzles are used, the holes 446 and 447 can be made larger diameter so as to reduce the gas velocity down stream of the nozzle. In this way, the above referred gas velocity limitations can be avoided.

Also, when separate gas flow nozzles are used, some or all of the nozzles can be equipped with suitable inlet and outlet filters/strainers. In this way, coarse dust and/or debris related flow restriction and/or blockage problems within the individual flow control nozzles can be prevented. It should be noted that rust, dust and other debris could gain access to the gas stream and hence to the nozzles during normal operation and/or during a process upset or during some other event. Also, during a process upset or during some other event, solids and/or sticky or viscous materials could access the gas flow control nozzles from the liquid side and cause the nozzle to become blocked or restricted.

Other methods of introducing filtration or other forms of screening in order to protect the gas flow control arrangements against problems associated with partial or complete blockage will be obvious to those who are skilled in the art.

FIG. 24 also shows how the GRP wrapping or other form of encasement of the cast, moulded or otherwise manufactured components could be arranged. Conveniently, this wrapping can be used to create the necessary 'O' ring groove 302 and support shoulder 303 together with the sloping shoulder 306 to create an entry guide for the 'O' ring arrangement into the punch plate. Clearly, there are many alternative ways of achieving an equivalent seal, guide and support or fluid connection arrangement.

Figure 25A:
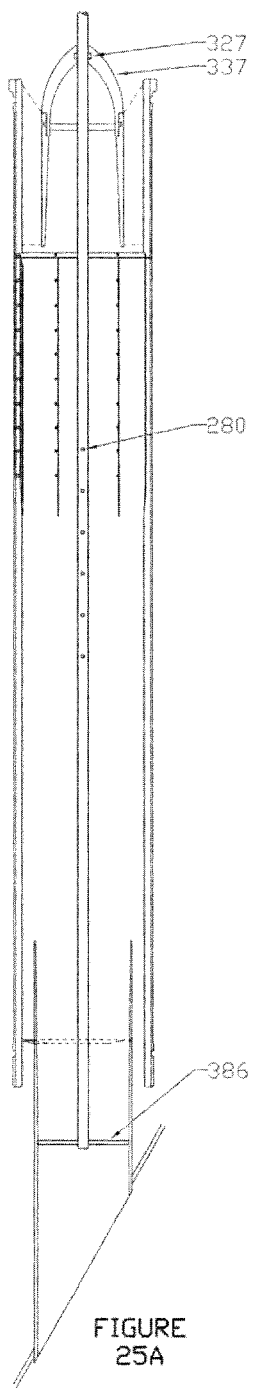
FIG. 25 shows three optional arrangements for a stepped assembly with an interface with the spinner section as presented in FIG. 24 and with optional arrangements for froth washing and for a core support pillar or other connection arrangements at the non-feed end.
Figure 25B:
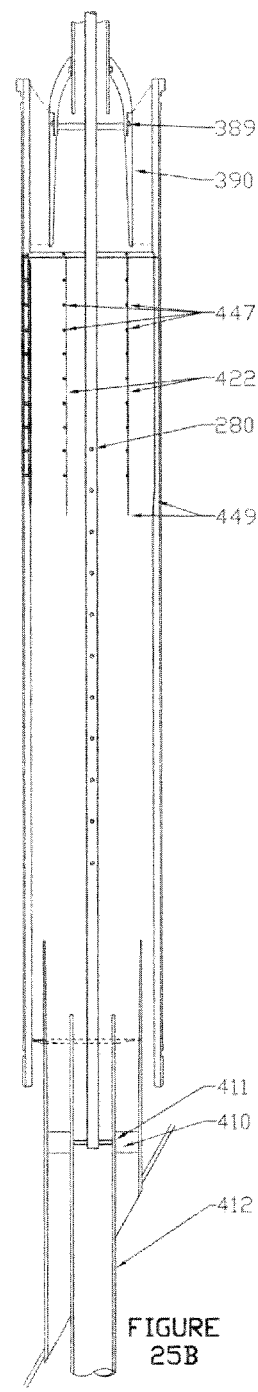
Figure 25C:
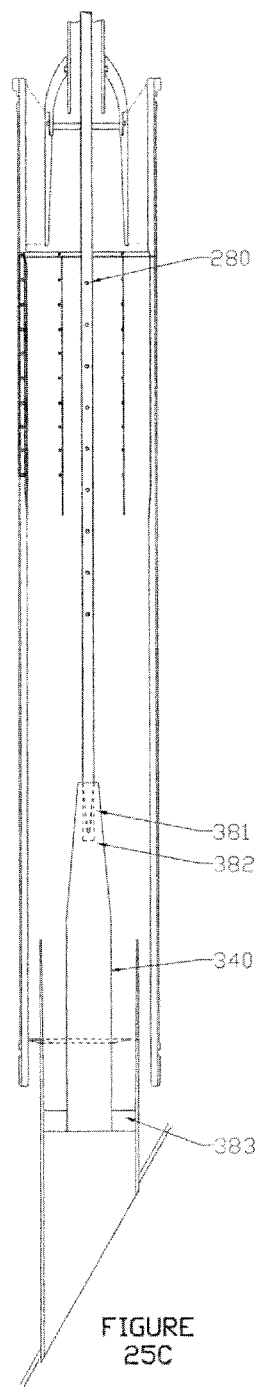

FIGS. 25A, 25B and 25C show alternative bottom and top details for the unit, assuming they are constructed using this axial step type of construction. By way of example only, the details reflect a 6 step construction; other numbers of steps would follow similar concepts. Similarly, all of the previously discussed styles of unit could all be constructed using this type of step arrangement.

At the end of each step 422 which is furthest from the inlet spinner section, each step should preferably merge into the ongoing profile of the cyclonic section in a way which will minimise abrasion and which will cause the minimum of disturbance to the ongoing spiralling vortex. Preferably, after the last gas/fluid inlet hole or slot 447, the depth of the step should progressively taper to zero. Ideally the angle of this taper should be less than 5° relative to the axis of the cyclone tube. Preferably the angle of this taper should be between about 2° and 4° relative to the axis of the cyclone tube. The designs that are indicated by the lines 449 in FIGS. 25A to C utilise a 3° taper angle.

Of specific note is the positioning of the holes 280 within the wash fluid delivery pipes. In FIG. 25A, relatively few holes are shown. With this type of unit, unless there is a plentiful supply of wash fluid and it is not deleterious to the process as a whole if a lot of it were added, then there is not a lot to be gained by beginning the washing process until most of the froth has separated. Also, for this type of unit, all the froth will exit via the vortex finder. A principal objective for the washing process that has been assumed for the FIG. 25A arrangement is to rinse out as many of the unwanted solids as possible and route them to the heavies fraction (i.e. to outside the vortex finder). As a result, the rinsing process cannot be extended too close to the vortex finder without there being a significant risk that the washings may not clear the froth layer before the froth enters the vortex finder.

In the case of the type of arrangement shown in FIG. 25B, washed froth will be exiting via the smaller diameter exit 412. This means that the wash points can be positioned closer to the vortex finder than was the case for FIG. 25A. As regards the position at which the wash process should start, the same comments would apply for FIG. 25B as were made for FIG. 25A.

FIG. 25C presents a style of unit with a froth support pillar (of whatever style). In this case, the froth will be withdrawn through the spinner and washing can proceed effectively over the whole length of the unit right up to quite close to the skirt beneath the spinner blades. This skirt will be effectively performing the function of a more traditional style of vortex finder. In this case, care will be needed to ensure that the washing process over such a long washing zone does not cause the break down of too much of the froth with the result that the floatation efficiency is impaired.

In all cases, the intensity of washing has to be balanced against the extra losses of floatation product that will occur as the wash is intensified. This need for a balanced control is similar to that which applies to any in-situ washing activity within all normal floatation processes.

In the same way as there is an optimum position for the start and end of the froth washing process, there is an optimum position for the commencement of gas injection relative to the outlet of the spinner section. To a large extent this will depend upon the situation. Where, for example, heavy solids have to be separated from an oily water and then de-oiled, then it is preferable to develop a reasonably concentrated layer of these solids near the wall of the cyclone tube before the gas is introduced. In this way the gas will achieve maximum intensity of contact with the solids and the solids will achieve maximum interaction and mutual scraping of each other's surfaces as the gas is introduced and moves through them. Ideally, therefore, for this situation, the joint line 442 in FIG. 24, and/or the commencement of the steps 422 should be positioned a little way down the cyclone tube, and not directly beneath the spinner blades.

If, the solids content of the feed is already relatively high, then for an optimum design, the position for the joint 442 and the start of steps 422 should be raised accordingly. The higher the initial solids content, the nearer the start of the steps should be to the spinner. Conversely, the lower the initial content of those solids which have oil on them, the further down the cyclone tube should be the start of the steps 422.

In the same way as there is an optimum position for the start of the gas feed, there is an optimum position for the end of the gas feed. As the gas continues to move radially inwards it entrains with it mother liquor, gangue and other impurities. The froth washing process, if it is present, is there to wash these contaminants off the froth and back into the middle off-take or into the heavier fraction, as appropriate. The effect of the gas input must therefore be complete before or as the liquors reach the end of the froth washing stage.

In the context of FIG. 17, it was noted that branch 370 on the carrier vessel could be used for supplying a wash fluid or other liquid input. This concept can of course be utilised for all of the subsequent carrier vessel concepts. One option for selecting the point where the gas input stops and the liquid input starts is to utilise a liquid level control to control the level of the liquid in the carrier vessel. This would set the position where the gas injection stopped and the liquid injection would start.

Alternatively, another punch plate position could be introduced which would then enable the inputs to be put in at different pressures so that the rate of input of each material could be more specifically controlled.

In the context of FIG. 25, it should be noted that the holes 447 and the steps 422 that are shown are representative of a dispersed gas floatation or a froth floatation application. If an additional liquid washing stage were required, then the steps 422 would need to be extended and additional holes 447 of an appropriate size would need to be added within the region of the extended steps. If separately installed gas flow nozzles are being used, instead of specifically sized holes 477, then it is convenient, but not necessary, for the mounting arrangements for these nozzles to be common to both the gas inlet nozzles and the liquid inlet nozzles.

One of the necessary features for effective froth floatation and/or effective dispersed air floatation (especially when separating oils from oily solids) is to have well dispersed gas bubbles which are intensively contacted with the oily solids and the other oil droplets that are in suspension. Also, the finer the oil droplets, the finer and the more numerous the gas bubbles need to be. Similarly, for normal floatation processes, the finer the solids, the finer and the more numerous the gas bubbles need to be.

There are a number of examples of "in pipe" type devices for creating fine gas bubbles within liquid and slurry systems, both for floatation purposes and for chemical reaction purposes, or for both. Examples of such equipment can be found in the following patent specifications:

U.S. Pat. No. 5,437,784
U.S. Pat. No. 2,051,597
U.S. Pat. No. 3,908,702
U.S. Pat. No. 3,856,270
German Patent DE 3741843
Deutsches Reich 522673
PCT Application WO 2004/052514 A2

There are many other similar examples.

A common theme within all of these examples is the creation of intense shear accompanied by varying levels of impact against surfaces and/or sudden changes of flow direction whilst a gas-liquid or gas-slurry mixture is passed through them. All of the above referred devices carry out these processes whilst passing the fluid mixture in a generally axial direction through their essentially tubular equipment. The varying levels of impacts were mostly created by using baffles or orifice plate type of obstructions or they were associated with sudden bends in the generally axial flow profile. Some of these bends were associated with a generally annular flow profile and the bends were created by sharp changes in the average diameter of the annulus and/or the flow area of the annulus.

In the above overview, the terms impact and sudden changes have been used in their more generally descriptive senses rather than their strictly scientific interpretations. Nowhere in any of this prior art is there a description of the use of steps to introduce gas beneath a launched layer of liquid or slurry. The only potentially similar reference to the use of a step from which a liquid layer is launched and where a carefully created layer of gas is encouraged to become entrained with the liquid layer from beneath the edge of the step is within PCT/ZA2003/000160. In PCT/ZA2003/000160 the purpose of the step was to create an eddy within the gas right up against the face of the step. This eddy prevented the liquid from dribbling down the face of the step at the launch point.

Here, the process has similarities as regards both the prevention of dribbling across the faces of the steps and the entrainment of the gas beneath each layer of launched liquid. However, in relation to that disclosure and to the other above referred technologies for creating fine and well dispersed gas bubbles, the intention here is to entrain a flow of gas beneath the liquid mixture so as to create:— a) An almost frictionless gas cushion beneath the liquid layer and, in general, for that gas cushion to maximise the "in flight" portion of the flow profile for the liquid mixture which is adjacent to the wall of the cyclone tube.

b) A situation where this almost frictionless gas cushion allows the liquid mixture at the interface between the gas cushion and the liquid mixture to accelerate from a value of zero or near zero as it leaves the step to a value approaching that of the bulk of the liquid mixture by the time the liquid mixture arrives at the "landing" zone c) A situation where the gas cushion continues to provide maximum support to the liquid mixture as eddies, suspended solids and any dispersed droplets of a heavier phase within the liquid cause the liquid surface to begin to break up.

d) A situation whereby as any droplets or particles which have broken clear of the liquid layer begin to "land" on the ongoing perimeter of the inside of the cyclone tube, they are subjected to maximum droplet disruption and to maximum shearing action between different particles and between the particles and the fluid(s) surrounding them.

e) A situation whereby as the bulk of the liquid mixture arrives at the "landing zone" on the ongoing perimeter of the inside of the cyclone tube, it is subjected to maximum shearing and turbulent disruption both within and between all of the fluid phases, between all of the particles that are present and between those particles and all of the fluid(s) surrounding them.

f) A situation whereby within the region of the "landing zone and within the immediately following flow path for the liquid mixture, the gas which is displaced away from the inside surface of the cyclone tube during stages c) d) and e) is dispersed as small gas bubbles into the liquid mixture and whereby these gas bubbles are subject to intense interaction with the liquid mixture and with all of the particles and other fluid phases within the liquid mixture.

g) A situation whereby once the gas has been forced to mix with and to move through the outer layers of the liquid mixture, the ongoing movement of that gas is not subject to significant bulk shear and back mixing within the liquid.

h) A situation where there are significantly enhanced gravitational forces relative to a traditional froth floatation unit.

i) A situation where the separated froth can be washed without the froth being exposed to the intensive shearing processes that are normally associated with conventional styles of hydrocyclones.

j) A situation where all of the above features can be achieved within a conduit which is straight or essentially straight and within which none of the essential functions rely on transverse obstructions or other such features within the flow profile. Note, all the other above referenced technologies and prior art rely on transverse features to create the gas dispersion and other benefits that are claimed.

Figure 26B:
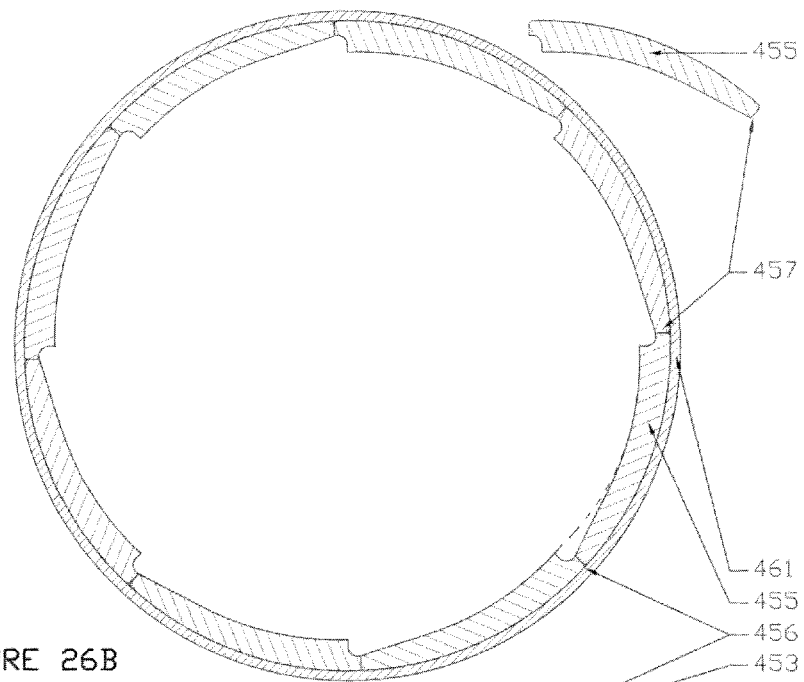
FIGS. 26A and B show the concepts for a set of 8 staves which create 8 tangential through the wall inlets.

In FIG. 26B, a multiple component arrangement is shown which utilises long axial components 455 in much the same way as wooden staves are used in a wooden barrel. This design achieves a similar internal circular profile to that which is presented in FIG. 23B. Clearly, the same style of concept could be used to create 4, or 6 or 12 or whatever number of steps around its internal perimeter.

The staves 455 are held together by GRP wrap, banding or some other form of binding method or enclosure 461. Each stave has an edge 457 which butts up against the opposite edge 456 of the adjacent stave. The gas or other fluid entries can be arranged using holes in the staves which could be located in similar positions to those shown in FIG. 23 or the subsequent Figures. However, a draw back of the radial gas and fluid input positions, particularly for liquid inputs, is that the velocity of the fluid through the hole can be a rate and process limiting feature.

Figure 26A:
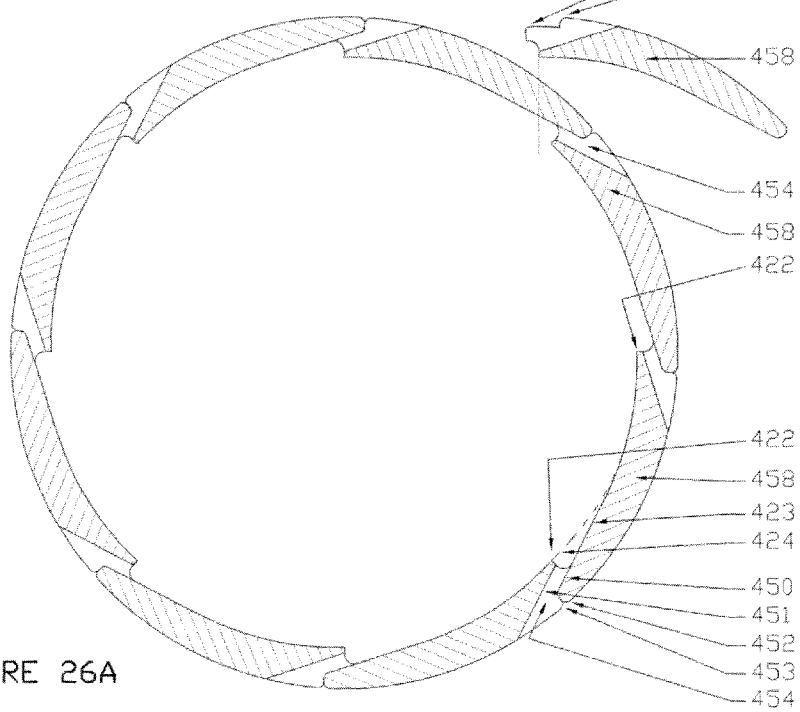

FIG. 26A shows an alternative gas or fluid entry detail which provides an essentially tangential input 454 for the gas or fluid. In this figure, the outside diameter of the staves is the same as or similar to the outside diameter of the enclosing layer 461. This is because it is convenient (but not essential) for the staves 455 to be thickened up in the area of each gas or fluid input so as to simplify the achievement of this style of arrangement.

The cross hatched part of each stave 458 in FIG. 26A represents the solid part of the stave which has been sectioned on the centre line of a gas or fluid input. The launch edge 422 is in the same place as for the staves 455 in FIG. 26B, as is the edge 456. An additional shoulder 453 builds up the local thickness of the stave from that of the profile of 455 to the profile at the gas or fluid entry. The part of the stave beneath the shoulder 453 and which is not cross hatched is a cut away slot which creates the inner face 451 and the two sides of the gas or fluid inlet 454.

In the upper right hand corners of FIGS. 26A and 26B the profile of one of the staves is shown away from its position within the rest. These profiles are drawn to the same scale for the same size of cyclone tube. The right hand end of the stave in FIG. 26A projects further to the right than that for the stave in FIG. 26B. This is because the stave in FIG. 26A has been extended locally so as to form an infill piece to create the outer surface 450 of the hole for the gas or fluid input.

Elsewhere along the stave, between each of the thickened up areas associated with each gas or fluid entry, the profile will be the same as that shown at 455. Where the gas or fluid entry hole is relatively small, the outer infill piece forming face 451 will be quite thin and relatively easily damaged during manufacture and assembly. In order to protect and reinforce this infill piece, the extra thickness of the stave in this area has been extended out over the top of the infill piece so as to create the top of a 'T' shaped reinforcement to the infill. This detail can be seen more clearly in FIGS. 27A, 27B and 27C.

Figure 27D:
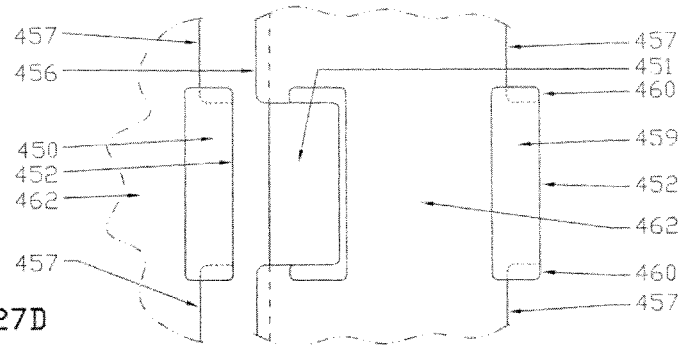
FIGS. 27A to 27D show further details of the 8 Staves concept and how different widths of tangential inlet slots can be created using the same basic design concept.
Figure 27C:
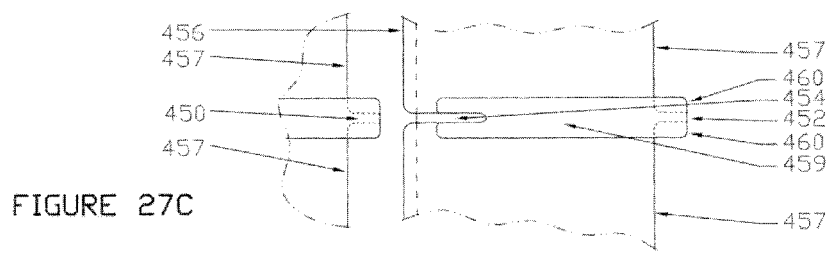
Figure 27B:
Figure 27A:
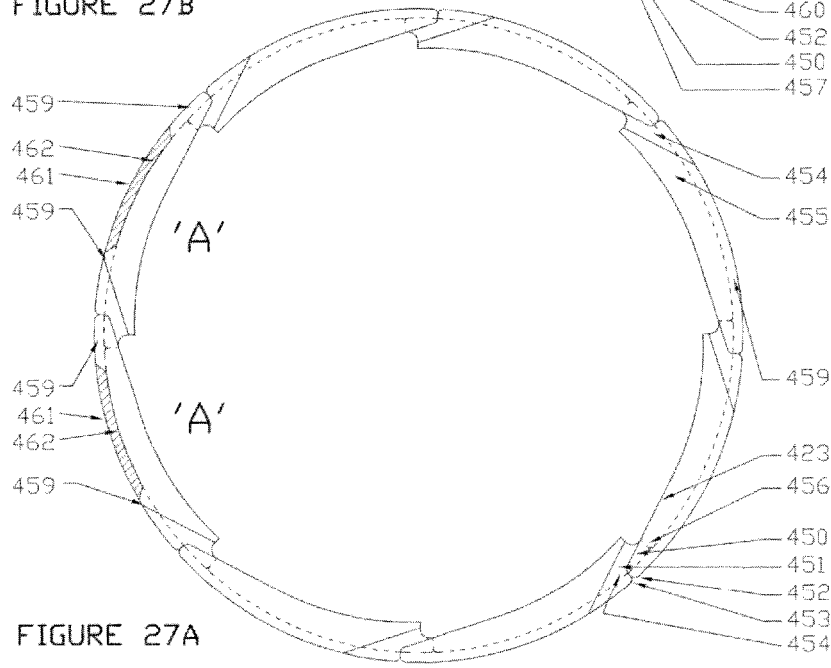

In FIGS. 27A and 27B the cross hatching for the sectioned material within each stave has been omitted so that the hidden detail can be seen more clearly. In FIG. 27B the edge of the stave between the gas or fluid inputs 457 is shown together with the edge of the infill piece 450 and the extension of the thickened up area 460 over the top of the infill piece. The end of this thickened up piece 460 is finished square at 452 so that it makes a reasonably close fitting butt finish up against the shoulder 453 on the adjacent stave.

In FIG. 27C a view from the outside of a cyclone tube of a short axial part of a stave has been shown together with a small part of the next adjacent stave to the left. This small part of the adjacent stave has been moved back from its true relative position so as to make the interfacing and overlapping parts more clear. The thickened up part of each stave 459 makes a circular ring all the way round the cyclone tube when all the staves are assembled. This simplifies the GRP wrap or other form of binding which may be used to hold all the staves together.

The inlet hole 454 has side pieces either side so as to ensure that the GRP wrap or other binding arrangements do not cause resin, etc. to get into the hole. These side pieces, together with the infill 450 and its top reinforcement 460 also create an abrasion resistant enclosure all the way around the entry hole as well as through the hole. This means that dirty gas and/or dirty liquors can be added through these holes without affecting their long term performance. At FIG. 27D, a much wider slot through the wall is shown. The cross sections 26A and 27A would still be representative of the concept. However, for some applications, once the width of the thickening 459 becomes significant, it will become necessary for structural reasons to carry additional external binding/reinforcement 461 in an axial direction through the gap 462 between successive thickenings 459 at each gas or fluid inlet. This would be in addition to the hoop reinforcement between each ring of inlets.

In FIG. 27A, this additional axial reinforcement is indicated by way of indication only at the two points 'A'. Where this additional axial reinforcement is needed it would be the same for all the staves. FIG. 27A therefore shows at points 'A' the typical detail associated with FIG. 27D. Elsewhere in FIG. 27A the detail reflects that associated with FIG. 27C.

Clearly, there are many alternative designs which could be used to enable cast or moulded abrasion resistant parts to be assembled so as to create an array of similarly shaped or alternative tangential inlets around a cyclone tube. What has been shown here is one such option which has been developed for a nominally 300 mm inside diameter unit. Alternatively, there are many alternative techniques that can be adopted to cast and/or to fabricate a similarly shaped or functioning arrangement that can introduce a gas and/or another fluid or mixture in a tangential or near to tangential direction through the wall of a cyclone tube.

Similarly, there are many alternative techniques that can be adopted to ensure that these arrangements are suitably abrasion resistant and that they are protected from potential blockage or flow restriction issues that could occur as a result of the ingress of debris or other foreign matter.

A key advantage of the tangential inlet relative to the radial inlet is that the gases and other fluids can be arranged to enter at a velocity which is close to that of the spiralling fluid within the cyclonic body of the unit. In this way the fluid can enter without causing any substantial disturbance to the liquid film and the momentum of the incoming gas or other fluid can be utilised within the unit. This is particularly relevant to washing or other processes where the incoming fluid is a liquid or a liquid mixture. Alternatively the liquid or liquid mixture could enter with velocities greater than the local tangential velocity so as to offset some or all of the effects of friction within the spiralling vortex. The liquid could even be used to increase the velocity within the body of the cyclone.

If a liquid or a liquid mixture is to be introduced at a significant velocity (e.g. at or above the tangential velocity within the unit) then in general, the pressure that is needed to accelerate the liquid through its entry holes or slots will be greater than the pressure that is needed in order to introduce the required flow of gas through the gas inlet holes. This means that there will be a need to create an additional zone outside the cyclone tube, rather than the common zone that was referred to in relation to FIGS. 17 to 21 inclusive. This additional zone would require an additional punch plate and 'O' ring or equivalent seals and it would need to be positioned at the desired interface between the gas addition and the liquid addition. It would be logical when this additional plate has been inserted for branch 371 to be moved down to close to this plate so that it can be used to drain the gas zone if necessary, either during or before maintenance.

It will also be appropriate to arrange the GRP or whatever binding that is used on the outside of the cyclone tubes to be thickened up locally or adapted by other appropriate means so as to enable the necessary 'O' ring or other appropriate sealing to be installed at this additional punch plate.

The reason for entering the liquor via a thin and wide slot rather than through a pipe or some other form of conduit with a thick section, is that the liquor which enters from a thin slot can be orientated so that it enters as a thin layer between the wall of the cyclonic section and the spiralling flow within the cyclonic section. In that way, the whole of the heavy fraction outside of which the liquor is inserted will have to move radially outwardly through this layer of inserted liquor. If this is a washing, leaching or some other chemical reaction process, then all of the heavy fraction would be given a reasonably equal exposure to the liquor. This would not be the case if a simple pipe or some other form of a thick conduit were utilised.

When dense fluids, especially liquids, are introduced through the wall of the cyclonic body in order for them to be carry out a washing function or some other processing function, it is appropriate to angle the input so that it enters in a direction which is parallel to (or close to parallel to) that of the spiralling fluid at that location. Unless the flow direction of the incoming fluid is reasonably aligned with that of the outer layers of the spiralling vortex, rotational mixing eddies will be created at the interface between the incoming fluid end the spiralling vortex. These eddies will cause much of the incoming fluid to bypass the outer layers of the spiralling vortex. Ideally, for a washing function or for some other processing function, the incoming fluid should be arranged to migrate uniformly through the outer layers of the spiralling vortex.

The detailing that is shown in FIGS. 26 and 27 only seek to show how this particular inlet arrangement can be designed so as to create an input where the tangent line is perpendicular to the axis of the cyclonic section. This simplified detailing has been used in order to simplify the description of the concepts that are presented herein. However, it will be obvious that the same construction concepts can be used when the groove 454 in FIG. 27C is orientated at an angle which is the same as, or which is close to that of the spiralling flow, rather than being perpendicular to the axis of the cyclonic section.

Similarly, it will be obvious that the wide slot that is shown in FIG. 27D can be orientated at an angle which is the same as, or which is close to that of the spiralling flow, rather than being perpendicular to the axis of the cyclonic section.

For similar reasons to those that are described above for the entry direction of a dense fluid or a liquid, when a fluid that is being added for a washing or processing function, it should be added at the same velocity or at a similar velocity to that of the spiralling fluid at the entry location.

It should also be noted that when liquor is travelling as a vortex down a cyclone tube with, for example, a 30° angle relative to a line which is perpendicular to the axis of the cyclone, then one revolution within say a 300 mm inside diameter cyclone will progress the liquor along the axis of the cyclone by a little over 471 mm. If all of the flow is to be contacted uniformly with the incoming liquor then with 8 inlets for the liquor, each liquor entry will need to have a width of about 60 mm in the axial direction. The style of entry that is described above and which is shown in FIGS. 27A and 27D is able to achieve this.

It will be clear to those who are experienced in the art that alternative design arrangements for similarly appropriate fluid inputs could also be used.

Because a gas has a much lower specific gravity and viscosity relative to that of a liquid, axial distribution of gas within the gas cushion from a number of individual entry points will be much easier than for a liquid. As a result, gas entries at around 70 mm intervals into the types of stepped arrangements that have been described above are able to create a sufficiently uniform gas cushion beneath the vortexing contents of an approximately 300 mm inside diameter cyclone tube. Clearly, with high system pressures, momentum issues associated with the higher gas density (resulting from the higher pressure) will become relevant. Therefore, as the system pressure gets higher, the spacing of the gas inlets will need to get closer.

An important aspect of the design of the tangential style of inlet is the closeness to truly tangential that is actually required. This is particularly relevant to gas inputs at high system pressures and to liquid inputs. The further the input is away from tangential the greater the disruption that will occur relative to the beneficial functions that can be associated with a gas or liquid input. However, the shorter the overhanging pieces 450 and 460, the shorter the groove 451 and the easier the casting or moulding of the stave pieces. The design which is shown in FIGS. 26A to 27D creates a truly tangential connection to the curved surface which leads up to the next launch edge 422. This design advantageously enables the entry duct 454 to be just long enough when using practical material thicknesses and corner radii to ensure that the whole of the gas or fluid which enters through the slot is flowing entirely tangentially (plus or minus about 10°) and without much cross turbulence. In other words it is a functional design. A shorter duct 454 would yield a somewhat turbulent and divergent discharge which would substantially reduce the uniformity of any washing or other function that was being required from the fluid addition. If a gas only input is being considered, then a less tangential solution can be adopted.

At the end of each of the step edges 422 furthest from the main fluid entry, there is a need to finish off the step and to create a simple cylindrical or near cylindrical profile in the same way as was discussed in relation to FIGS. 25A, 25B and 25C. There are a number of options for achieving this, some of which will be described below and others will be obvious to those who are skilled in the art.

One option is to progressively alter the shape of the cross section of the staves so as to create a profile as was discussed regarding the lines 449 in FIGS. 25A to 25C. Below this transition zone, the staves would become simple parts of a circular pipe section and they could be butt jointed and bound to form a smooth walled pipe all the way to and past the vortex finder and on to the end of the cyclone tube. This option could suffer excessive wear along the axial joint lines and therefore would be regarded as a less preferred option.

A second option would be to simply stop the staves at the end of the transition area furthest from the main inlet and then butt joint the end of the essentially circular pipe section which they will have created onto a suitably abrasion resistant section of pipe which would have the same inside diameter and which would continue to the end of the cyclone body.

A third option would be to stop the staves with simple square ends just before the start of the transition area and to connect this essentially circular section to a suitably abrasion resistant section of pipe, the inside diameter of which is similar to that of the root of each step, or between that of the root of each step and that of the launch point of each step. Preferably, the diameter of this ongoing section should be the same as or close to that of the root of each step. This would be the simplest and easiest solution but it does increase the inside diameter of the cyclone at a point which is not very far from the vortex finder.

A fourth option would be the same as the third option but for the top for the pipe section to have a slow taper (as described previously for FIGS. 25A to C) back to the normal inside diameter of the cyclone tube. From the perspective of ideality, the fourth option would be appropriate. However, from the perspective of practicality versus benefit the third option would normally be the most appropriate.

Figure 28:
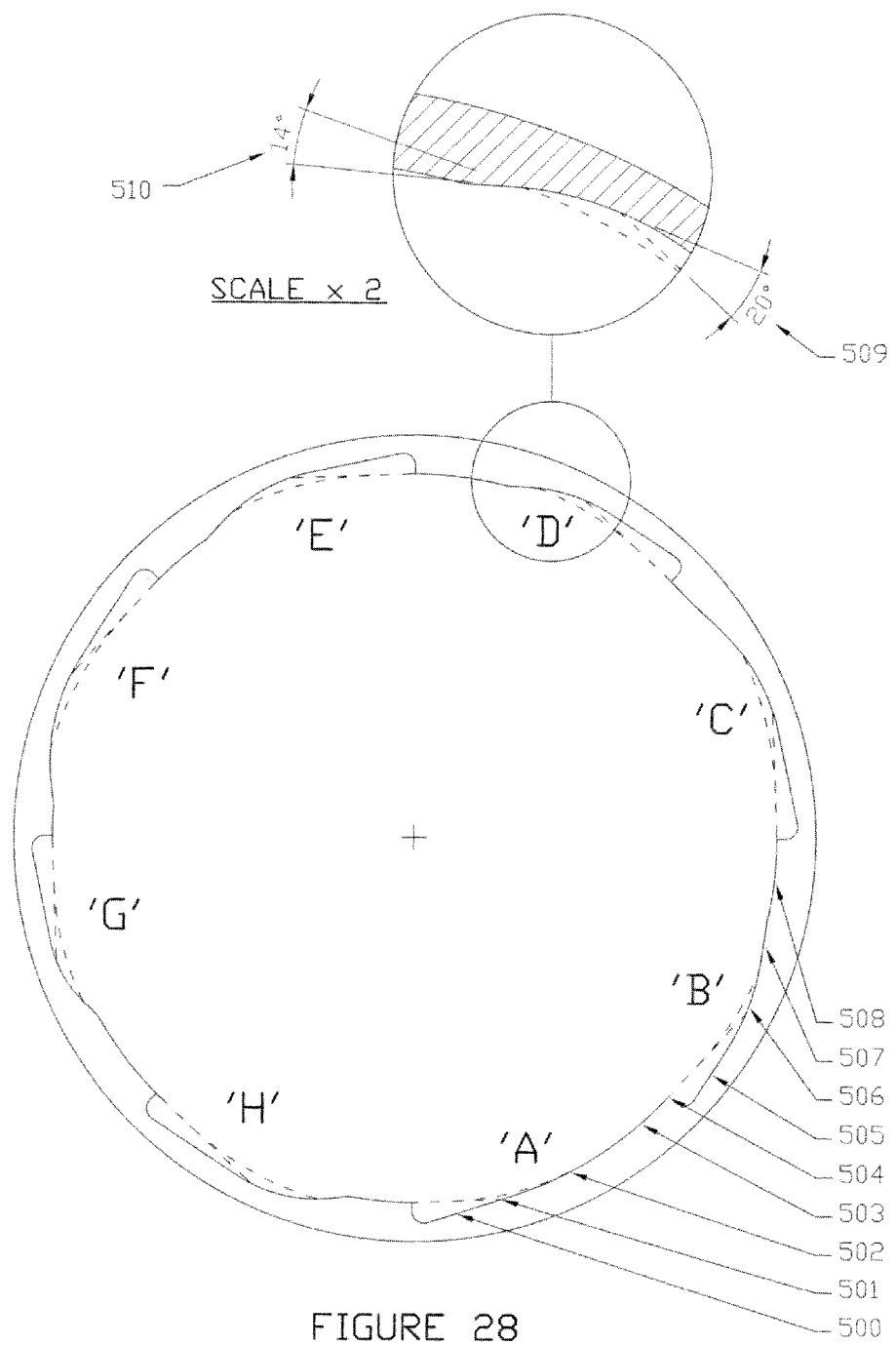
FIG. 28 shows eight optional profiles for the wall of that part of the cyclonic section which is between successive stepped edges. Each of these profiles will achieve a different combination of functional properties to suit different operating systems and situations.

In FIG. 28, eight different optional designs are presented for the profile that can be installed after the edge of each step 504. It will become clear to those experienced in the art that many more options can be evolved depending upon what particular combination of features is appropriate for the particular application. Similarly, it will be clear that the profile that is associated with a particular step can be different to that of the preceding step and/or the following step. In this way, different combinations of the following processing features can be achieved.

The eight different options are labelled 'A' through 'H'. All of these options, 'A' through 'H' could be arranged in a similar manner to that described above for FIGS. 26A to 27D. Alternative construction methods could also be utilised.

Option 'A' is basically the same as has already been described in relation to FIGS. 26A to 27D. The profile for option 'A; has a surface 500 which, in this example, is flat, parallel and continuous with the face 451 (in FIG. 26A) of the outer surface of the gas or fluid entry. The edge 504 is, for this option, the same as the edge 422 in FIG. 27A. A concave, flat or (for some applications) a convex surface 503 connects the surface 500 to the edge 504. Typically the surface 503 will be concave with a radius which is similar to that of the cyclone tube itself, preferably within the range of 0.8 to 1.2 times the radius and most preferably between 0.9 and 1.1 times the radius. The flow descriptions which were presented earlier regarding FIGS. 22A to 23D also apply to this profile.

One of the features of the prior art which was referred to earlier was to create very fine and well dispersed gas bubbles for the purposes of froth floatation for the purposes of creating the floatation bubbles for Dispersed Air Floatation equipment and for maximising mass transfer between the gas and the liquid, such as within aeration systems within aerobic waste water treatment plants. These features for creating very fine and well dispersed gas bubbles were referred to within the discussion of the profiles that are similar to profile 'A' in FIG. 28. In order to reduce the bubble size, greater shear and/or a greater momentum change is required within the area where the liquid layer lands following its 'flight' on the gas cushion. Clearly, the achievement of smaller bubbles will be accompanied by an increased loss of rotational energy. If a longer 'flight' path on the gas cushion can be achieved at the same time as smaller gas bubbles are also achieved, then the associated loss of tangential velocity that would be expected to occur as a result of creating smaller gas bubbles can be mostly offset.

A second feature of the prior art in respect of oil separation, especially the cleaning of oil off oily solids is to create an elastic medium by dispersing fine gas bubbles as uniformly as possible within the mixture. As the slurry of solids meets a bend or other form of flow disturbance, a pressure change is created within the slurry. The dispersed gas bubbles will expand or contract in response to the pressure change. This in turn will cause neighbouring droplets and solids to move rapidly relative to each other. This will create strong shear between the various droplets and solids. Some of the solids will also rub against each other. This shearing and rubbing will shear and scrape the oil off the solids. Once the slurry has passed the flow disturbance, it will take up a new flow profile and the pressure within the slurry will change to suit. The dispersed gas bubbles will expand or contract to suit and again the various droplets and solids will shear and scrape against each other.

A third feature of the prior art was to utilise the above two physical concepts (gas dispersion together with a combination of droplets and particles shearing and scraping against each other) to enhance chemical processes, e.g. within ore leaching or within other multi-phase reactions. Often in these latter situations, the overall process requirement would be for the leached ore (or the depleted reactant) to be separated from the rest of the mixture once it was exhausted. Typically this would mean that the fine fraction would need to be removed and the coarse fractions recycled to the front of the process. This recycling of the coarse fraction would require collection and buffer storage equipment after the reactor, followed by transfer arrangements to a suitable separation plant, a separation plant, further collection and buffer storage equipment and then the appropriate recycle equipment. In addition, within the reactor, the already reacted materials and the gangue or other impurity materials that are released during the process, or which enter with the raw materials, tend to dilute or otherwise get in the way of the ongoing processes with the un-reacted materials.

In the cyclonic equipment that is described herein, the reactant gas and/or the other reagents can be pushed in through the wall of the reactor where the centrifugal forces will have already caused the larger and generally heavier un-reacted particles to have accumulated. The gas bubbles will enable the solid surfaces to be sheared and scraped clear of impurities or other inhibitory components and/or boundary layers at a high frequency. In addition, the whole regime will have very high mass transfer rates between all three phases and finally, the cyclonic function of the unit will ensure that all the gangue and other impurities are cleared away very rapidly from the "reaction zone" (i.e. away from the peripheral regions of the unit) immediately they are created.

The purpose of the other profile shapes 'B' to 'H' is to show how small variations within the shape of the profile that follows each step can be exploited.

Some of the essential features which can be varied are:
a) The fineness of the gas bubbles that are created.
b) The intensity with which those gas bubbles are initially dispersed into the outer layers of the spiralling vortex.
c) The harshness of the inter particle shearing and scraping (i.e. is it a soft or a hard material that has to be removed).
d) The distance away from the wall of the unit within which effective particle scraping and shearing can be achieved (e.g. to scrape particles with a wide or narrow size spectrum)?

e) The tangential momentum that is added or removed per unit of additional fluid.

f) The orientation with which that momentum is applied and hence the form of the orientation of and the intensity of the turbulence that is created within the resultant flow profile.

g) The extent to which lighter fractions, reaction products and/or leachates are flushed away from the heavier fractions.

Note. Point g) can be the means for achieving considerable savings in relation to reagent usage and in relation to wash water usage.

Note also. Within the above list and within the following comments, the word particle(s) should be understood to include solids, droplets, droplets containing solids, droplets containing other non-miscible droplets and/or gas bubbles and any other possible combination of the three phases solid, liquid and gas.

To a large extent, items a), b) and c) above require similar features. Increased harshness, increased intensity and finer bubbles require a combination of high enough tangential velocities with sufficient shear and momentum change within the liquid mixture in the area of the landing zone at the end of the gas cushion.

In order to enable the effects of gas bubble derived particle scraping and shearing to penetrate further towards the core, the undulation that is created by the landing zone within the overall flow profile must be more severe in terms of its size. If mild scraping and shearing over a large radius is required, a gently sloped but large hump is required at and immediately beyond each landing zone. For harsher scraping and shearing, the slope of the hump must be steeper. For inter-particle scraping and shearing over a limited increment of radius the hump does not need to be as high.

For each of the optional shapes within FIG. 28, two dashed lines are shown leaving the respective launch point (the edge of the respective step). One line is a straight line which is tangential to the surface of a circle of radius equal to the radius of the cyclone tube at the launch point. It is therefore reasonably representative of the flight patch which would occur in the absence of a gas cushion and in the absence of any gas induced "elasticity" within the circulating liquor.

The second line is a curve representing the likely flow path of the main liquor surface after it leaves the launch point, assuming a typical level of gas input at each step (i.e. assuming a combination of the effect of the gas cushion and of the likely gas induced elasticity which will be derived from the gas bubbles that are created by upstream launches).

For the purposes of simplicity of explanation, all of the profiles 'B' to 'H' have been made up using a sequence of lines. The line 500 represents a line which is parallel to the axis of the tangential entry if a tangential entry is being used. Line 505 is angled at no more than 8° outwardly from line 500. This 8° limit is to avoid/minimise cavitational or other turbulence issues following a change of direction.

A further line 507 has been arranged within the profiles B' to 'H' at different angles to the expected flight path of the launched liquor. The curve 506 links the two lines 505 and 507 in a manner which ensures maximum utilisation of the gas cushion prior to the landing. Line 508 represents a surface which for the purposes of the following descriptions is, or is close to that of part of a cylinder of radius equal to that of the average radius for all the launch points.

As the length of curve 508 increases:—
a) The amount of viscous drag will increase
b) The elastic response to the previous landing zone hump will be more settled by the time the liquid mixture arrives at the next launch
c) After the next launch the interface between the liquid mixture and the gas cushion be smoother.

As line 507 is moved away from its upstream launch point, so the apparent size of the hump which it creates increases. As the angle of line 507 is changed, so the severity of the landing can be increased or decreased accordingly. Depending on the positioning and the orientation of the line 507, line 508 can advantageously adopt a range of alternative shapes. These shapes can range from a concave profile (e.g. similar to that which is currently shown) to a convex profile.

Profile 'A' is characteristic of a design that would be suitable for relatively easy froth floatation, where the bubbles do not need to be too fine.

Profile 'B' is designed to create slightly smaller gas bubbles but otherwise to achieve a reasonably economic balance between the benefits of the gas cushion, the creation of sufficiently fine bubbles and maintaining a smooth enough flow profile to achieve a sharp separation.

Profile 'C' is profile 'B' with the line 507 moved further away from the launch. This profile will create smaller bubbles and should create sufficient particle shearing and scraping to ensure that most oily solids are adequately cleaned, providing the oil is not too viscous or tar like.

Profile 'D' is similar to 'B' but the angle of line 507 is steeper so as to create finer gas bubbles and harsher particle on particle shearing and scraping.

Also at profile 'D' there is an enlarged detail. This detail shows at 509 the angle of incidence between the tangential "line of flight" and the surface of the profile. At 510 the angle of incidence is indicated between the likely "flight path" and the surface of the profile. The actual values of the measured angles that are presented in FIG. 28 are indicative of an average for the typical range of values which could be exploited. The typical practical limits for these ranges of values would be about 0.7 to 1.4 times the values which are presented.

Profile 'E' has the same angle for line 507 as was used for profile 'D', but the line is moved further away from the launch. The result will be even finer droplets, harsher particle on particle interaction and a greater radially inwards penetration within the overall flow profile for the particle on particle interaction process.

Profile 'F' is profile E' taken further with more intensive results as regards all three effects. Also, with the relatively short length of the equivalent curve 508 there will be a significant elastic expansion of the liquor immediately after each launch. This will accentuate both the particle on particle effects and the radial penetration of these effects.

Profiles 'G' and 'H' have the harshest angle as regards line 507 and take the concepts of profiles 'D' and 'E' to higher levels of intensity.

When the above features are compared against the length of the expected flight path, it is clear how much viscous drag can be avoided.

It will also be apparent that if more gas is injected, then the gas cushion will extend further and the intensity of the features that were discussed above will reduce. As a result, a profile such as 'E' can be adjusted, simply by varying the gas flow, to perform quite closely to what can be achieved by the whole spectrum of options from 'C' to 'F'. This means that by applying relatively small adjustments to the gas flow, a given construction can be adjusted on line to achieve quite widely varying production requirements.

If these added capabilities and their adjustability are combined with the multiple output capabilities of the unit when it is also functioning as a separator, it is clear that the unit should no longer be considered as just a separator. The above described developments have made the unit into a very flexible and capable piece of multi-functional processing equipment.

As noted above, line 508 represents a surface which is, or is close to that of part of a cylinder of radius equal to that of the radius of all the launch points. A profile that is very similar to that of profile 'A' can be created by commencing a flat or slightly curved surface 503 at or close to a stepped edge and finishing it tangentially to a surface 508. The associated tangential intersection between these surfaces would preferably occur approximately mid way between the arrow head positions associated with the labels 502 and 503. Other ways of achieving a similar function profile will be obvious to those who are skilled in the art.

Similarly, the essential functional requirements for the example profiles 'A' to 'H' can be created in other ways relative to those which have been described above. The above descriptions should only be regarded as indicative ways by which the types of shapes can be achieved. They should not be regarded as being the only ways by which the range of profiles that are being disclosed can be created.

In the context of multi-functional processing equipment it should be noted that the different processing stages that can be accommodated may not be characterised by gas addition followed by liquid addition. The appropriate sequence may be liquid addition followed by gas followed by liquid. Alternatively, the sequence may be gas followed by liquid followed by the same or another gas or liquid, or it may be some other combination. It may also be that the gas may be required for chemical or biological reaction purposes instead of or as well as floatation purposes.

The means of achieving all these different functions would be obvious to the reader. They would simply require the appropriate positioning of the suitably sized and orientated gas and/or liquid input holes or slots to suit the proposed functionality, together with punch plate dividers or other appropriate means between each input zone. Each separate input zone would then need the necessary external connections.

It should be noted that all of the benefits that can be derived from the features associated with this equipment can be achieved with a unit within which the main feed is through one or more tangential inputs. The tangential input or inputs can be instead of or in association with a spinner section.

It should also be noted that where the term carrier vessel has been used within this disclosure, the term includes a vessel around one unit as well as a vessel around more than one unit.

Figure 29A:
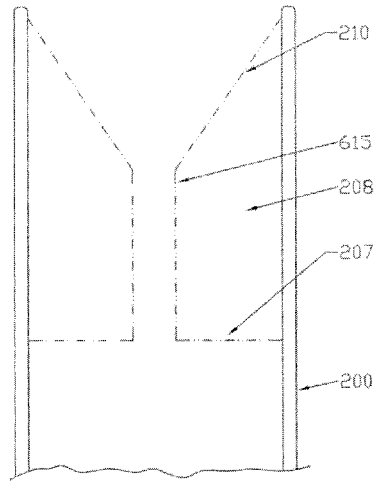
FIG. 29 shows how the entry spinner section to a unit can be adapted to make it effectively unblockable by either stringy debris or by all reasonable sizes of solid debris (e.g. up to about 30% of the diameter of the cyclone tube).

FIG. 29A presents a cross sectional view which is similar to that which is presented in FIG. 5, but without the core piece 209, the skirt 206 and the inlet cone 211. Also, the inner edges of the blades (615 in FIG. 29A) have been shown at a smaller radius with respect to the centre line of the unit.

The inner edges 615 of the blades form a relatively small diameter cylindrical passage through the centre of the spinner. Any stringy material which gets itself part one side and part the other side of the top edge 210 of a spinner blade will be able to slide down the relatively steeply sloped edge towards this cylindrical passage. Assuming the passage is made large enough, the stringy material will slip off the inside end of the blade and be swept through the passageway and into the cyclone body.

Reference to FIG. 4 will show that the clearance between successive blades reduces as the radial distance between the measurement location and the centre of the spinner is reduced. The blades shown in FIG. 4 reflect a slightly larger size of core relative to that which is shown in FIG. 5. With a much smaller passage between the inner ends of the blades (as in FIG. 29A) the clearance will become much smaller, potentially too small for most practical situations. At FIG. 29B, a second line 616 is shown between each line 615 and its respective outer wall 200. Whilst this line is not a true representation, it visually represents the concept. If every other blade terminates at line 616 with the remainder terminating at line 615, then adequately large gaps can be maintained between blades whilst at the same time making the cylindrical passageway through the centre of the spinner into a similarly sized passageway.

Figure 29C:
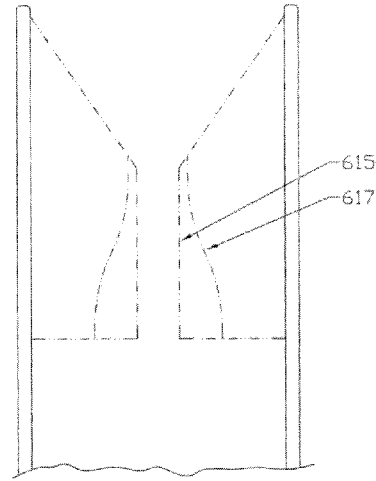
Figure 29B:
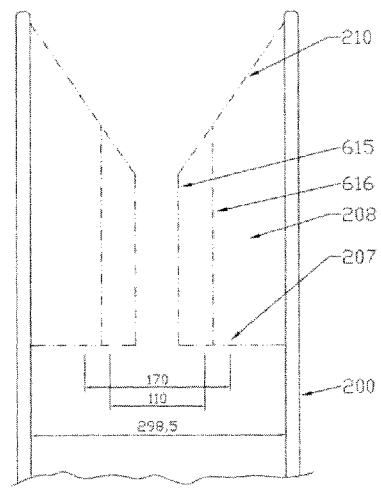

By adopting this style of arrangement, the residual gaps between the blades and the size of the centre passageway can be selected to suit the expected maximum debris size that is likely to be present in the raw feed.

Where it is expected that the likely lump debris could exceed the issues associated with stringy objects, then the shape of the inside of the centre passage can be amended as shown by line 617 in FIG. 29C. Referring again to FIG. 4, it will be seen that for the entry part of the blades, the perpendicular gap between the blades is almost twice the perpendicular gap between the blades at the blade outlet. Debris will therefore start to get stuck within the outlet area of the blades at the inner radius.

At FIG. 11, the plan view of the top edges of the spinner blades is shown. With the centre core in place, anything that could jam within the gap at the root of the blades will be pushed radially outwards by the core to a position where the gap is wider. When there is no core, the debris will not be pushed outwards and away from the smallest gap. If the shortened blades 617 are shaped such that the top edge of the blade finishes radially further inwards than the rest of the blade then debris which could jam will be pushed inwards past the radial position of that pinch point and into the centre passage. If the ongoing edge of these blades is then tapered radially outwards as the gap between the blades tightens, then a shape can be selected whereby the gap between the tightest pinch points downstream of the leading edge of the blade will always be slightly larger than it is at the radially inward end of the blades.

With this feature, this style of blade would then become virtually unblockable except by grossly oversized objects.

Figure 29D:
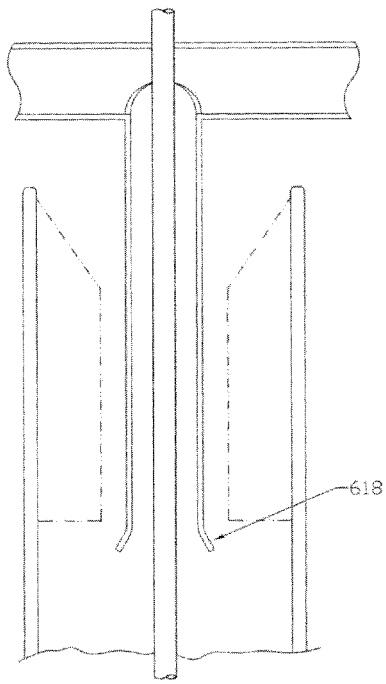

FIG. 29D shows an alternative arrangement where a central through the spinner connection or concentric connections are required. Here, because the gap between the central connections and the blades is likely to represent the tightest gap, the blades are unlikely to require a shaped inner profile similar to the line 617. However, the concept can be adopted here as well, whenever it is appropriate.

It should be noted that for all of the designs shown in FIGS. 29A to 29D, turbulence and viscous drag below the spinner will cause the fluid that bypasses the spinner blades to become part of the overall vortex flow. The area of the centre passageway should always be small relative to the total cross section such that as the part of the total input which bypasses the spinner blades merges into the rest of the flow, it should only cause a small reduction within the tangential velocity.

It should also be noted that for virtually all liquid or liquid mixture inputs, there will be a central gas and/or froth core within the main body of the cyclone tube. This can be arranged to always ensure that any inlet fluid which bypasses the spinner blades via an open centre passageway will be incorporated rapidly into the main vortex spiral within the body of the cyclone tube.

Other methods which will always ensure that any portion of the inlet fluid which bypasses the spinner blades via an open centre passageway will be incorporated rapidly into the main vortex spiral within the body of the cyclone tube include:—
- a) An orientation for the cyclone tube which sets it at least slightly away from the vertical.
- b) A bell mouth style of feature attached to the end of the froth off take connection (as is shown at 618 in FIG. 29D) or to the end of a similar connection for controlling the diameter of the gas core.
- c) An equivalent skirt attached to the feed pipe for the froth washing fluid.

Figure 30A:
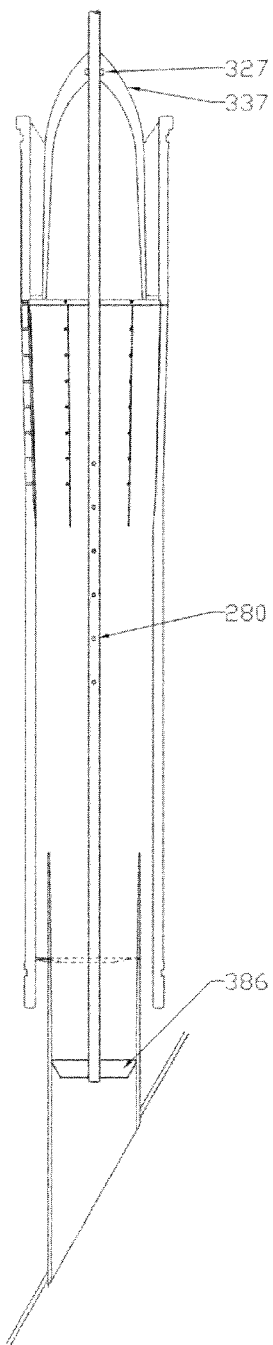
FIGS. 30A, 30B and 30C show arrangements similar to those presented in FIGS. 25A, 25B and 25C but which are more specifically arranged for dispersed gas floatation or for froth floatation and where there is to be no washing or leaching, etc. requirement for the heavy fraction. In this arrangement, the gas inlet section is tapered. The taper enables a more uniform gas pressure to be maintained over the full axial length of each gas cushion despite the effects of viscous and other drag forces upon the rotational velocity of the spiralling liquid mixture.
Figure 30B:
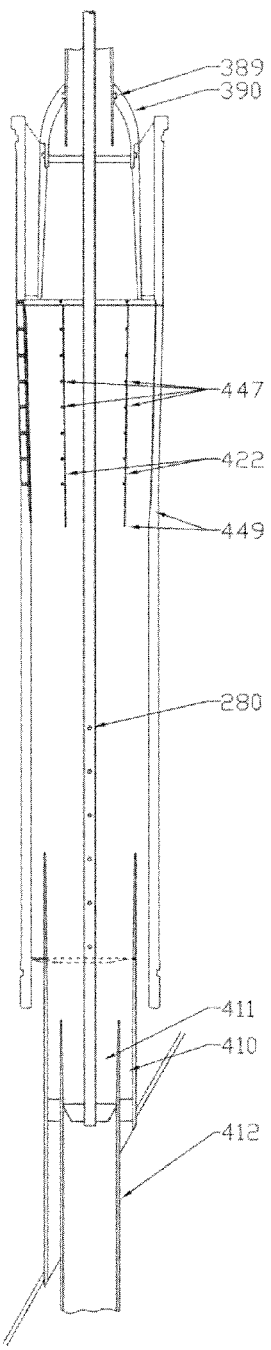
Figure 30C:
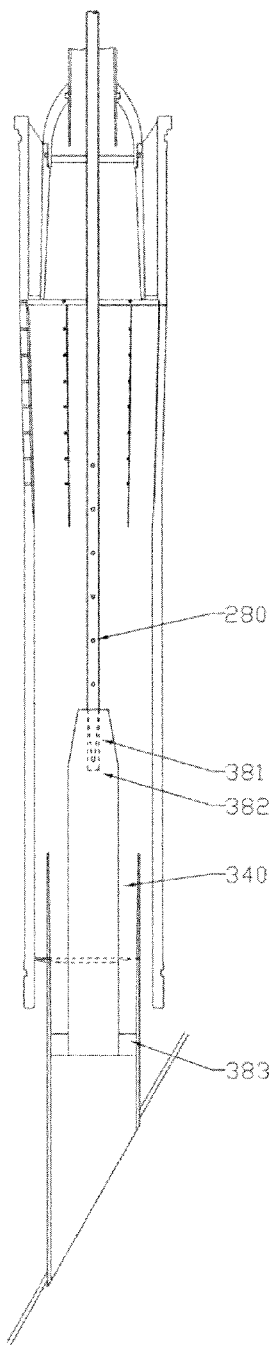

At FIGS. 30A, 30B and 30C the optional designs which were shown at FIGS. 25A, 25B and 25C are shown in a form which has been specifically optimised for operation as a dispersed gas floatation unit or a froth floatation unit and for situations where there are no requirements for washing and/or further processing of the heavier fraction. Within FIGS. 30A, 30B and 30C, the gas inlet zone occupies about one third of the overall length and it is tapered. Also, the spinner section uses a much larger diameter core than is shown in FIGS. 25A, 25B and 25C.

This larger diameter core produces an annulus of spinning inlet liquor with a reduced radial thickness. This means that the gas bubbles have a shorter radial distance to travel within the mixture, as do the particles and droplets which become entrained with the gas bubbles. Similarly, the particles and/or droplets of heavier fraction also have a shorter radial distance to travel. In addition, this radially thinner annulus will create a lower gas phase pressure drop.

However, for this radially thinner annulus, there will be an increase in the ratio between the surface area of the wall of the gas inlet section and the mass of the spinning liquid/liquid mixture that is within that section. This means that the frictional forces that are created at the wall of this section will create a greater deceleration within the spinning vortex per unit length of the gas inlet section than will be the case for a radially thicker annulus with the same inlet velocity.

As the velocity of the spinning vortex is reduced, so the pressure at the cyclone wall that is created by the spinning vortex will also be reduced. This reduced pressure will cause the dispersion gas that has been evenly distributed via the radial holes into the gas cushion to flow along the gas cushion. This will lead to proportionately more of the gas traversing the annulus at the outlet end of the gas inlet section and to proportionately less of the gas traversing the annulus at the spinner end.

For a given liquor flow, a higher gas flow will lead to larger gas bubbles. Larger gas bubbles are in general less effective within a dispersed gas floatation unit than are smaller gas bubbles. Also, within a unit where the gas bubbles are exposed to an increased gravitational field, the velocity of larger gas bubbles through the liquid phase can be too high for some of the droplets and particles that are attached to the gas bubbles to remain attached.

For a typical dispersed gas floatation application, the gas input flow is relatively small in comparison to the typical cross sectional area of the gas cushions. As a result, relatively small pressure differences over the axial extent of each gas cushion can be enough to cause a substantial proportion of the cushion to be starved of gas and for only a small proportion of the cushion to supply most of the gas. This will cause most of the gas feeding section to provide an inadequate supply of very fine gas bubbles or, in the extreme, no bubbles at all, whilst a small section supplies too much gas. This locally excessive gas flow will create gas bubbles which are over-sized and therefore relatively ineffective.

This sort of situation would create a major reduction in the benefits associated with all of the mass transfer, shearing and scraping processes which were referred to earlier. This would be in addition to a substantial reduction in the simple floatation function.

For a given tangential component of the velocity, a reduced radius of rotation increases the radial acceleration and hence the centrifugal forces which are created. Therefore, if the radius of the wall of the unit is reduced in approximate proportion to the amount by which the tangential velocity is reduced, the pressure which that spiralling vortex creates at the wall can be arranged to be constant or almost constant over the whole length of the gas inlet section. The exact calculation is a little more complex than a simple proportionality. This is due to the effects of gravity on the axial component of the velocity and the consequential effects of both this and the reduced diameter on the radial thickness of the annulus. However, the details associated with thus calculation will be familiar to those who are experienced within this field.

The taper over the length of the gas input section that is shown in FIGS. 30A, 30B and 30C is typical for a situation where water is the principal liquid component and where there are relatively few heavy particulates. For this situation, for a nominally 300 mm diameter unit and with a spinner section similar to that which is shown and described herein, the preferred angle relative to the centre line would be within the range of 1° to 2°.

The axial movement of gas along the gas cushions can also be prevented by installing barriers at intervals along each gas cushion or by using a succession of axially short gas cushions rather than a simple array of longer gas cushions. Other options would also be obvious to the reader.

A particular advantage of the tapered option for the gas inlet section is that the taper facilitates relatively easy casting and de-moulding of this section as a single casting.

Froth washing facilities are also shown within FIGS. 30A, 30B and 30C. Many of the comments that were made in relation to FIGS. 25A, 25B and 25C will also apply here. Particularly relevant comments include the need of the washing fluid to have cleared its washings from the froth and/or the lighter fraction (if a lighter fraction is also being separated) before the froth and/or the lighter fraction reaches its respective vortex finder.

Obviously, if froth washing is not required, the washing feature can be omitted.

The unit that is shown in FIG. 30A is designed for the simple floatation of one or more components from the remainder.

The unit that is shown in FIG. 30B has additional connections through both the spinner and the main vortex finder. In general, the connection through the spinner would be used to adjust the gas pressure within the unit and thereby provide some further control over the radial thickness of the spinning annulus. The connection through the vortex finder could be used for the same purpose. This would avoid the need for a through the spinner connection.

Alternatively the connection through the vortex finder can be used within the situation where three fractions are to be recovered; a heavier fraction; a lighter fraction and a froth. The details that are shown in FIG. 30B have assumed this latter requirement and the washing connection and the spray points 280 have been positioned in this example to restrict the froth washings to the lighter fraction only. Alternative froth washing options could also be applied.

Within most froth floatation processes or dispersed gas floatation processes, the floated fraction disengages itself from most of the gas that has been applied to the process. This disengaged gas can be conveniently removed through the spinner connection or it can accompany the floated fraction through the vortex finder connection 412 (FIG. 30B) or it can simply accompany the mixture which is separated by the main vortex finder. In the FIG. 30A example it will have to accompany the mixture which has been separated by the main vortex finder. In the FIG. 30B example it can exit via the spinner connection, or in the absence of a spinner connection, it can exit via the pipe 412.

In the FIG. 30C example, the froth support pillar 340 can be used to assist the disengagement of the gas from the froth. It can also be used to direct the separated gas towards the spinner connection so as to allow a much lower gas content froth to leave via the main vortex finder exit. The froth support pillar 340 can also assist the centering and the stabilising of the froth washing arrangements if they are present.

An appropriately sized froth support pillar could also be added to the FIG. 30B conceptual arrangement so as to assist the gas disengagement and the separate routing of the gas to the spinner connection.

Figures 31A, 31B, 31C:
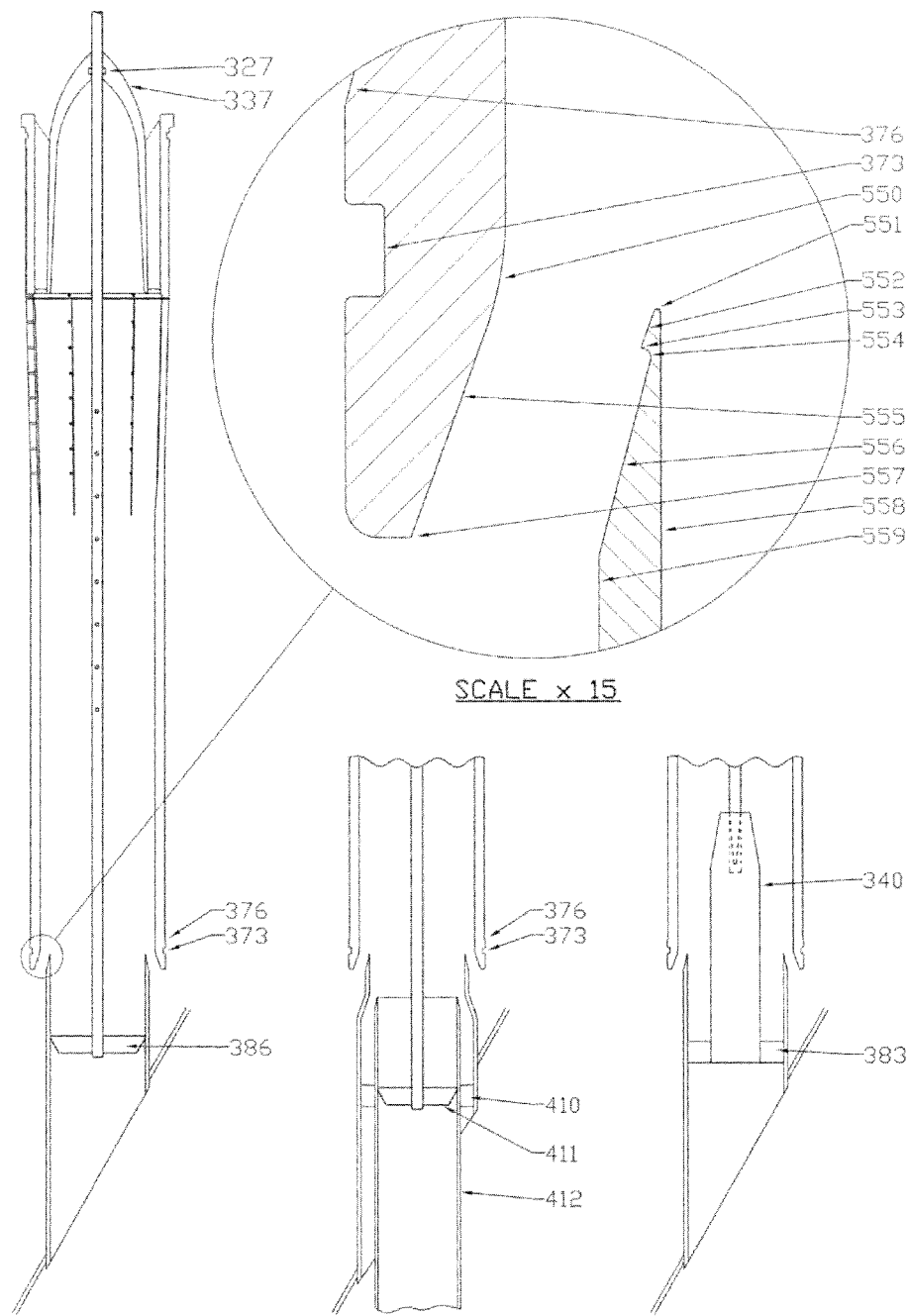
FIGS. 31A, 31B and 31C show an alternative method by which the heavier fraction may be separated from the remainder of the product flow whilst at the same time allowing all of the other features that are presented in FIGS. 30A, 30B and 30C to be maintained.

Within FIG. 31A an alternative arrangement for the removal of the heavier fraction is presented. This arrangement is particularly well suited to floatation applications or to situations where a relatively large diameter gas core is being used. This arrangement also makes use of the whole of the length of the cyclone tube for gas bubble separation. A shorter unit can therefore be achieved for the same degree of separation or better separation can be achieved within the same length of unit.

FIGS. 31B and 31C show how this arrangement can be applied to the previously described FIGS. 30B and 30C arrangements.

The enlarged detail that is associated with FIG. 31A also applies to the FIGS. 31B and 31C arrangements. Within this enlarged detail, the 'O' ring sealing arrangement between the cyclone tube and its punch plate mounting are indicated at 373 and 376. Other appropriate arrangements similar to those that were previously described could also be used.

The end of the cyclone tube is equipped with a conical or bell mouthed surface 555. This should preferably have a sharp or reasonably sharp connection 557 to the face of the end of the tube and a preferably but not necessarily radiussed connection 550 to the inside surface of the cyclonic section. The corner 557 should be reasonably sharp in order to minimise the potential for scale build up or for the accumulation of other deposits on the end of the cyclone tube. The slope of the surface 555 or the curvature of an equivalent curved bell mouth should preferably but not necessarily be arranged so that the combination of the rotational velocity and the axial velocity will cause the liquid or liquid mixture to stay in contact with the surface until it reaches the corner 557. Failure to maintain this contact can lead to an unstable inner surface of the annular flow as the annulus spreads within this expanding profile. This requirement for stability is not particularly relevant to the design that is shown in this enlarged detail, but it is very relevant to the optional arrangements that will be described below in relation to FIGS. 32A, 32B and 32C.

The leading edge 551 of the vortex finder 558 should be positioned so that it divides the annular spiral of liquor into the two product fractions that are required. Ideally, within a floatation process, the leading edge 551 will be positioned such that it collects the froth and the layer of separated material without including any of the main liquor flow. In practice, a small proportion of the main liquor flow should also be collected so as to ensure that none of the floated material is allowed to leave with the main liquor flow.

For optimum flow stability, the surface 552 should be as short as possible and approximately parallel with the opposite portion of the surface 555. A small stepped edge 553 and a curved corner 554 or an equivalent arrangement should then enable gas from the receiving vessel to access the surface of the diverging and expanding liquor flow so that this flow will remain reasonably undisturbed as it expands radially. Preferably the surface 556 should then create an approximately parallel or a diverging passageway for the expanding flow of liquor.

Turbulence suppression and velocity reduction features can be added to the surface 550 or to other convenient downstream areas as appropriate. Providing these or other flow directing arrangements are arranged so that the annular flow regime upstream of the edge 551 is unaffected, alternative designs for this downstream area could also be adopted.

Within FIG. 31B, a similarly arranged leading edge and divergent section is arranged for the entry to the pipe 412. In this arrangement, the leading edge 551 could be positioned to separate the lighter fraction, the float layer and the froth from the heavier fraction. The second leading edge at the entry to pipe 412 could be positioned to separate the float layer and the froth from the lighter fraction.

Another option would be for the pipe 412 to be used to remove the froth from the rest of the float layer.

Clearly, this concept for skimming off the desired fraction from the remainder of the total flow can be used to remove any desired proportion from the main flow. It is also clear that more than two leading edges can be applied within the same unit.

One of the advantages of the diverging section at or just upstream of the edge 551 is that it creates the necessary space for the wall thickness of the conduit 558 with which the edge 551 is associated. Without this diverging section, the wall thickness of the conduit 558 would create a radial obstruction to the flow. This obstruction would require a greater proportion of the outwardly flowing fraction to be incorporated with the float fraction and/or the froth in order to ensure that all of the float fraction and/or the froth will be intercepted.

Figures 32A, 32B, 32C:
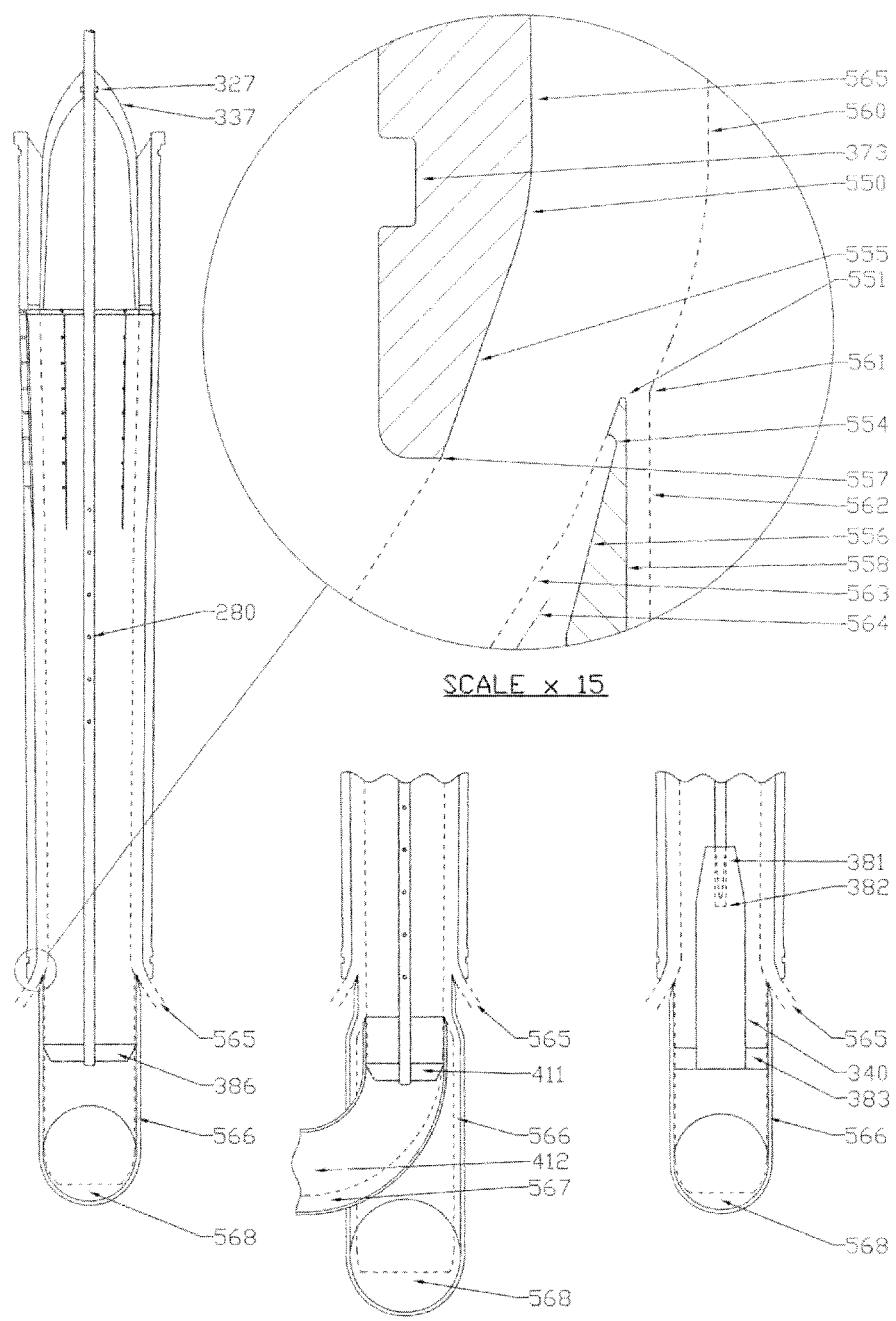
FIGS. 32A, 32B and 32C show how the position of the alternative outlet that is presented in FIGS. 31A, 31B and 31C can be adjusted in an axial direction so that different volumetric splits between the product fractions can be selected. This feature may be arranged so that the volumetric split can be adjusted whilst the equipment is in operation.

A second advantage of the diverging section is illustrated in FIGS. 32A, 32B and 32C. In this optional arrangement, the edge 551 is positioned at a radius which is closer to that of the inside surface 565 of the cyclonic section. The edge 551 is also positioned further away from the Spinner. Also shown (as a dashed line) is the typical position 560 for the surface of the spiralling annulus of liquor as it arrives at the edge 551 and in its subsequent flow profiles. The outer flow profile for the liquor curves around the corner 550 and then follows the surface 555. The inner profile follows an almost parallel shape and at 561, the edge 551 peels off the inside surface layer to create a flow 562 down the inside of the vortex finder and an output flow 565 consisting of the remaining and heavier fraction. The double dot-dash line 564 indicates approximately where the surface of the liquor would have been if it were not for the effect of the edge 551.

By the simple expedient of a small axial adjustment to the position of the edge 551, either a deeper or a shallow layer of liquor can be removed from the inside surface of the diverging flow of the heavier fraction. This adjustment can be used to accommodate the effects of varying feed rates on the radial thickness of the annulus. It can also be used to accommodate different concentrations of the "float" fraction within the feed.

The outlet flow 566 from the vortex finder is shown in FIG. 32A as being connected to a header pipe 568 (or to some form of a flexible pipe connection) which would be arranged so as to facilitate this axial adjustment whilst at the same time maintaining the concentricity of the edge 551.

Alternatively, the vortex finder pipe may be mounted in a manner similar to that which is shown in FIGS. 14 through 21 and where the mounting is arranged to be axially adjustable by appropriate arrangements within the vessel or by using a bellows or other appropriate arrangement within the walls of the vessel.

Within FIG. 32B, the same style of arrangement is used for the second edge for the float layer or froth layer. Whilst a method for adjusting the relative axial position of this second edge relative to that of the edge 551 is not shown here, such a feature should be obvious to the reader. One of the easier ways of achieving an adjustment arrangement for this second edge would be for the outlet pipe 412 to pass through the outlet header 568 before it connects laterally to its own header or to other form of adjustable connection.

Typically, the average angle of divergence between the surface 555 and the centre line should be within the range of 10 to 30°. Preferably, this angle should be within the range of 15 to 25°. For the situation where this angle of divergence is 20°, an axial movement of almost 3 mm is required in order to change the thickness of the cut which is removed by the edge 551 by about 1.0 mm. This means that quite precise control can be achieved over the thickness of the layer which is removed by the edge 551 or by a second similar edge or by any subsequent edges. Obviously, with a shallower angle of divergence a more sensitive adjustment control can be achieved.

In the context of the creation of a dispersion of very small gas bubbles within a liquid mixture, e.g. for the purposes of supplying oxygen to an aerobic waste water treatment plant, it would not be necessary to include the whole of the cyclonic section, nor any of the vortex finder and its associated components. Normally, the above referred cyclonic section would be designed to ensure that all of the gas bubbles would have traversed through the spiralling annular how of liquid mixture at least to the point where all of the bubbles would exit via the vortex finder. At this point, all, or almost all of the gas bubbles will have traveled through the liquid mixture and will have accumulated within the core as a gas or as a combination of gas and froth.

At some point upstream of the vortex finder, the first of the gas bubble will reach the gas core. Normally, for an optimally designed aerator for a waste water treatment plant, this will occur shortly after the liquid mixture has passed the end of the gas inlet steps (449 within FIG. 30B).

If the cyclone section is terminated using a simple open end at or close to this point where the first of the gas bubble reaches the gas core and if this open end is positioned within the normal position for a submerged aerator within a waste water treatment plant reactor (or such other equipment as is appropriate) then the momentum associated with the spinning vortex will disperse the very small gas bubbles into the bulk of the reactor contents in the form of a wide angled conical distribution. Unlike a typical fine bubble aerator, or a venturi aerator, this method of distribution of the gas bubbles will minimise the potential for substantial bubble coalescence as the gas bubbles rise to the surface of the reactor.

It should also be noted that in relation to the creation of small gas bubbles for mass transfer purposes, larger gas bubbles create a substantially smaller surface area for mass transfer per unit volume of gas, relative to that which is created by smaller bubbles. (Doubling the bubble size creates half the surface area for the same gas volume). Also, larger gas bubbles move more quickly under the influence of both centrifugal forces and gravity, relative to smaller bubbles. Whilst an increased velocity increases the mass transfer rate per unit of bubble surface area, this effect is normally more than offset by the reduced contact time that is created by the increased velocity. Very approximately, therefore, if the effective bubble size within the bulk of an aerobic waste water reactor can be halved, it should be possible to almost halve the air flow for the same oxygen demand.

In addition, the liquid mixture that is fed to the unit will be exposed to very intense mass transfer conditions before it is used to disperse all of the small bubbles into the bulk of the reactor. Typically, these mass transfer conditions will greatly exceed the equivalent conditions that are achieved within a venturi aeration unit. Also, the bubble size at the outlet of this shortened cyclonic section can be arranged to be considerably smaller than those which typically exit a venturi aerator or a membrane type of fine bubble aerator. This means that for a given oxygen input to a reactor, much less air will need to be supplied.

Relative to typical fine bubble aerators and venturi aerators, these arrangements will require more mechanical energy to be expended per unit volume of air that is supplied. However, because much less air needs to be supplied per unit of oxygen that is utilised within the reactor, the overall energy requirement will be substantially reduced.

Other applications for style of fine bubble generator will be obvious to the reader.

The invention claimed is:

1. Apparatus for use in the separation and/or processing of a feed material, the apparatus including
   a cylindrical cyclone tube having, at one end thereof, a feed material inlet for receiving feed material;
   and at an opposite end thereof, a first outlet for removing the feed material(s) and/or the remaining separated fractions of the feed material(s);
   a means for imparting tangential velocity to the feed material that is introduced through the inlet and for initiating a vortex spiral within the cyclone tube and where the means for imparting tangential velocity determines a direction of rotation within the vortex spiral;
   one or more steps, axially oriented within the cyclone tube, each step having an upstream surface, a launch edge and an approximately radial face, wherein the radial face is angled at 100° to 45° to the upstream surface of the cyclone tube;
   a corner located between the face of the one or more steps and a wall of the cyclone tube creates a space immediately behind the one or more steps; and
   a row of holes or slots uniformly spaced along the whole or most of the length of the one or more steps for delivering an externally supplied substance(s), into the space immediately behind the one or more steps;
   wherein the vortex spiral creates an annulus whereby higher density material(s) migrate towards the perimeter of the cyclone tube and less dense material(s) migrate towards the core such that separation and/or processing of the feed material is achieved.

2. Apparatus as claimed in claim 1, wherein the row of holes or slots is situated immediately behind the corner of the step.

3. Apparatus as claimed in claim 1, wherein the means for imparting tangential velocity to the feed material(s) consists of a plurality of axial flow spinner blades.

4. Apparatus as claimed in claim 1, wherein the feed material inlet for receiving feed material comprises one or more inlets for receiving and/or removing a second feed material and/or a third feed material and a first outlet for removing separated fractions of the feed material(s).

5. Apparatus as claimed in claim 1, wherein the apparatus includes additional outlets.

6. Apparatus as claimed in claim 1, wherein, within an axial length of the step, the diameter of the cyclone tube is tapered to enable a uniform gas pressure over the axial length of the space immediately behind each step.

7. Apparatus as claimed in claim 1, wherein means are provided such that the externally supplied substance(s) can be added separately via the row of holes or slots at different locations along the length of the step or steps and the relative proportion of said substance(s) can be adjusted.

8. Apparatus as claimed in claim 1, wherein the one or both ends of the cyclone tube is (are) fitted with one or more concentric inlets and/or outlets.

9. A carrier vessel including a plurality of apparatuses as claimed in accordance with claim 1.

* * * * *